United States Patent
Shiota

(10) Patent No.: US 9,897,832 B2
(45) Date of Patent: Feb. 20, 2018

(54) OPTICAL ELEMENT, AND DISPLAY DEVICE, ELECTRONIC APPARATUS, LIGHTING DEVICE USING THE SAME

(71) Applicant: NLT Technologies, Ltd., Kanagawa (JP)

(72) Inventor: Kunihiro Shiota, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 166 days.

(21) Appl. No.: 14/851,880

(22) Filed: Sep. 11, 2015

(65) Prior Publication Data

US 2016/0077364 A1     Mar. 17, 2016

(30) Foreign Application Priority Data

Sep. 12, 2014 (JP) ................................. 2014-186545
Jun. 2, 2015 (JP) ................................. 2015-112070

(51) Int. Cl.
*G02F 1/1335* (2006.01)
*G02F 1/13* (2006.01)
*G02F 1/167* (2006.01)

(52) U.S. Cl.
CPC ............ *G02F 1/1323* (2013.01); *G02F 1/167* (2013.01); *G02F 2001/1672* (2013.01); *G02F 2001/1676* (2013.01)

(58) Field of Classification Search
CPC . G02F 1/1323; G02F 1/167; G02F 2001/1672

USPC ........................................................... 349/62
See application file for complete search history.

(56) References Cited

U.S. PATENT DOCUMENTS

| | | | |
|---|---|---|---|
| 7,751,667 B2 | 7/2010 | Daniel et al. | |
| 2002/0024620 A1* | 2/2002 | Miyamoto | G02F 1/167 349/2 |
| 2003/0210535 A1* | 11/2003 | Gaides | B60K 35/00 362/23.01 |
| 2004/0027642 A1* | 2/2004 | Ahn | G02F 1/167 359/296 |
| 2009/0224246 A1* | 9/2009 | Hwang | H01L 27/12 257/59 |

* cited by examiner

Primary Examiner — Lucy Chien
(74) Attorney, Agent, or Firm — Sughrue Mion, PLLC

(57) ABSTRACT

To provide an optical element capable of stably securing an intermediate mode between two operations modes. The optical element of the present invention includes: a first transparent substrate; a second transparent substrate provided by opposing to the first transparent substrate; a plurality of first conductive patterns and second conductive patterns disposed in parallel to each other on a face of the first transparent substrate opposing to the second transparent substrate; light transmission regions disposed between the first conductive patterns and the second conductive patterns; a transparent conductive film disposed on a face of the second transparent substrate opposing to the first transparent substrate; and an electrophoretic element disposed between the neighboring light transmission regions, which is constituted with light-shielding electrophoretic particles of a specific electric charge and a transmissive dispersion material.

22 Claims, 54 Drawing Sheets

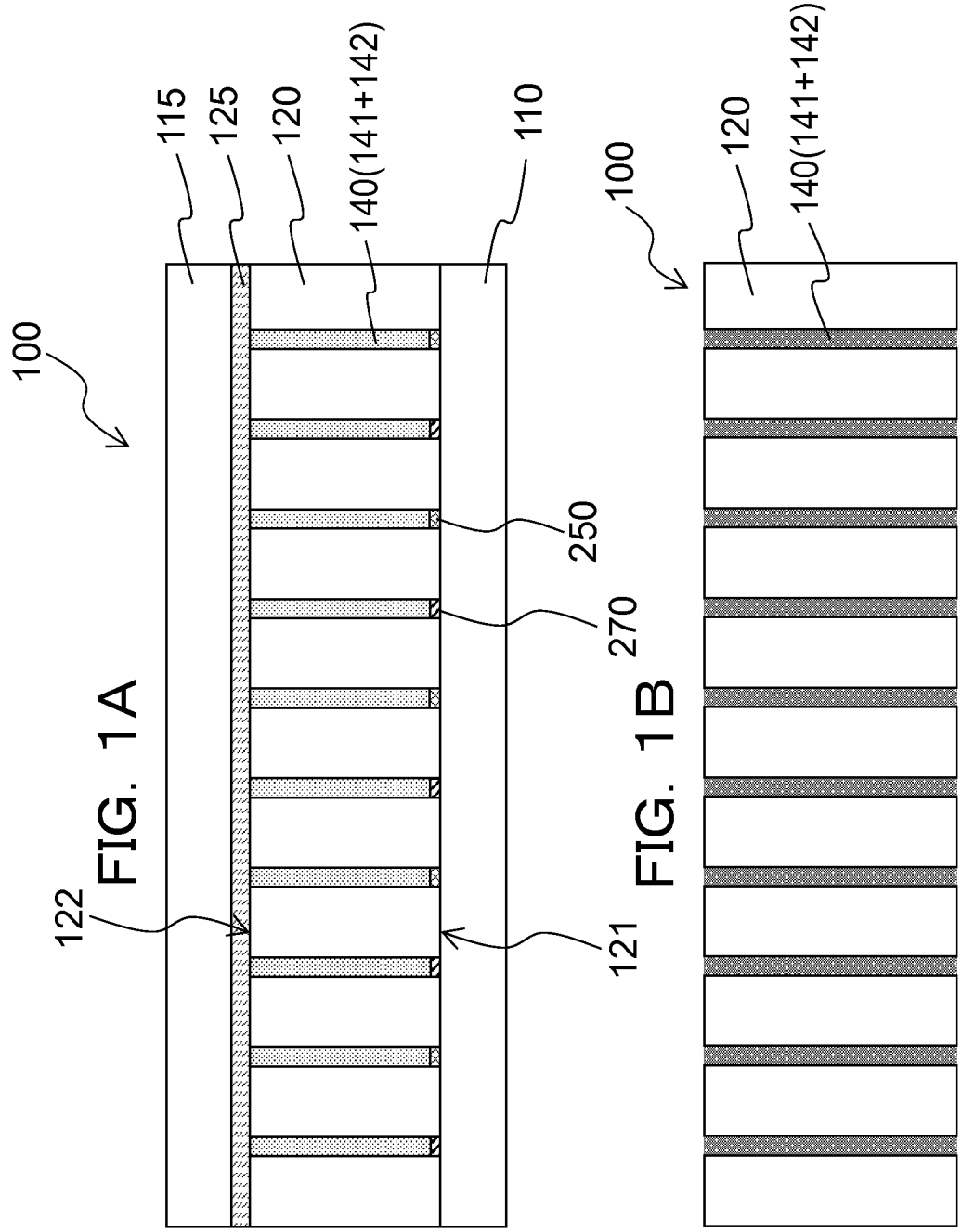

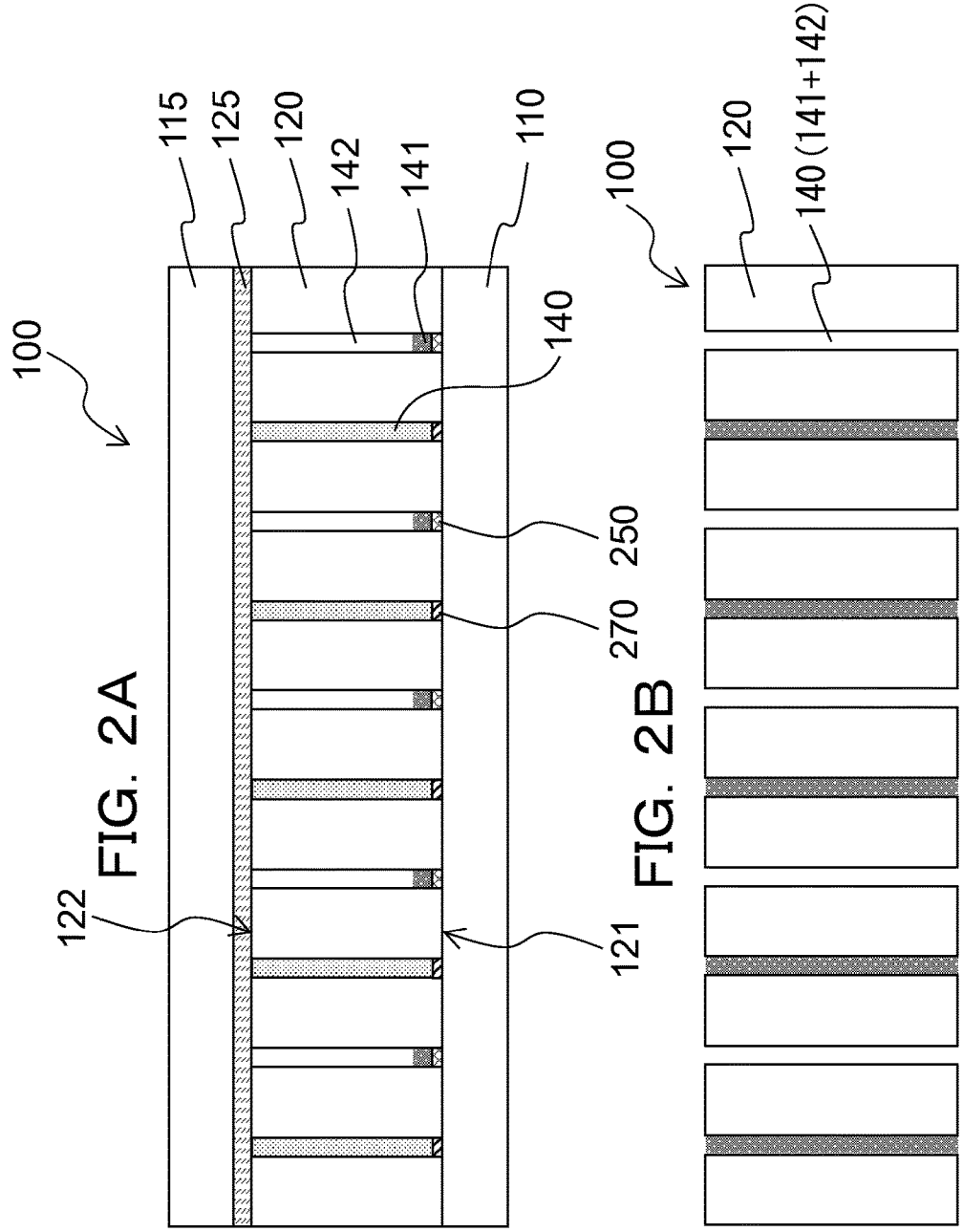

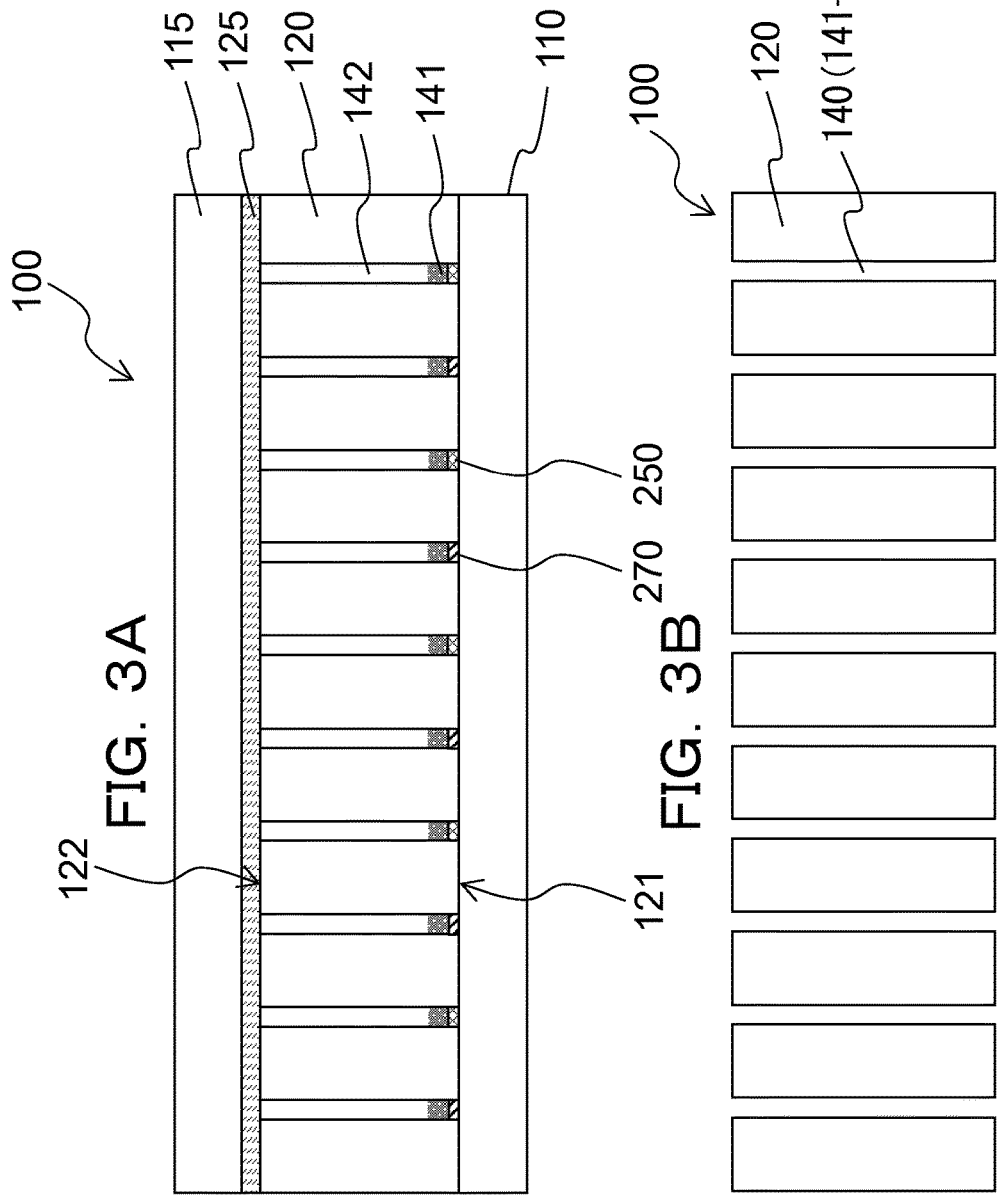

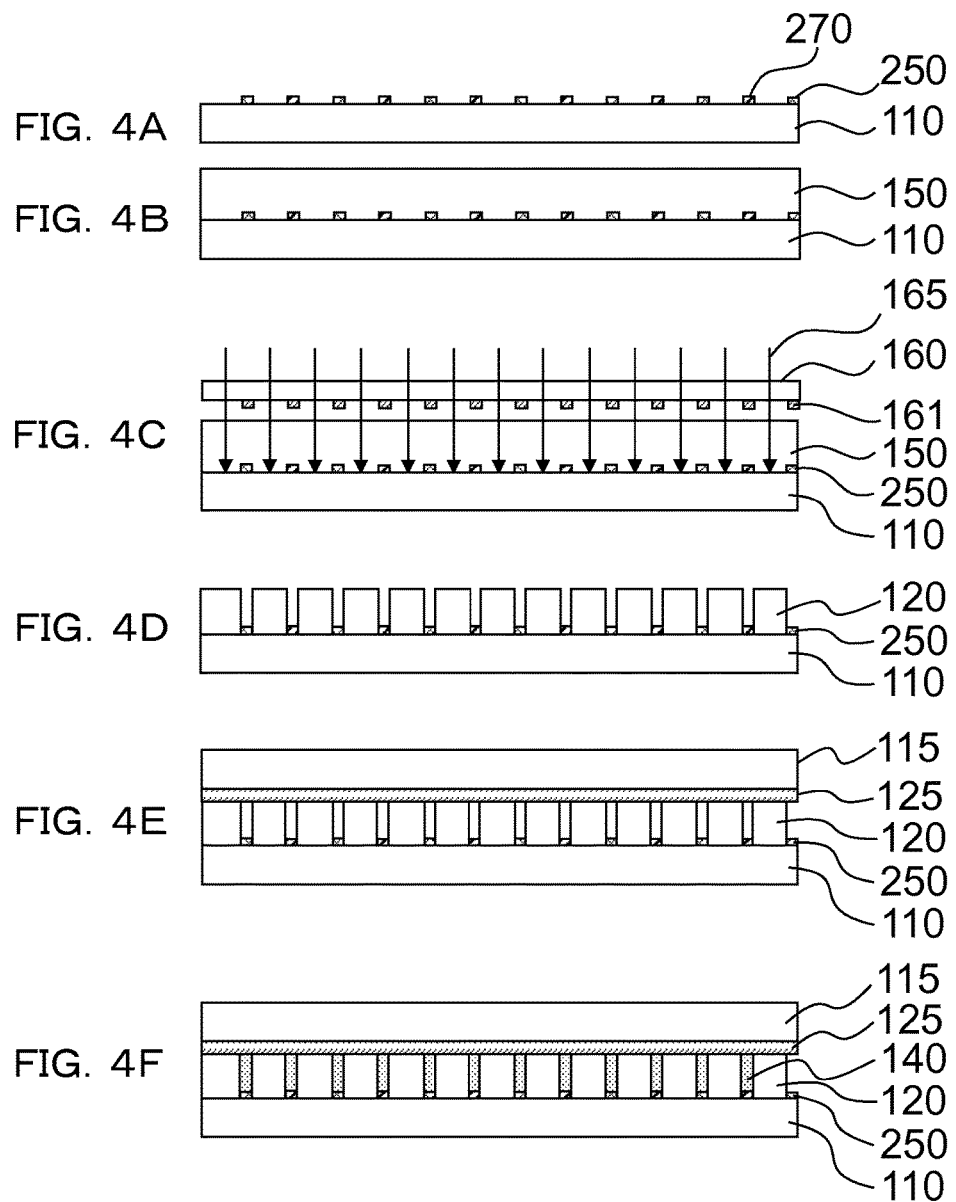

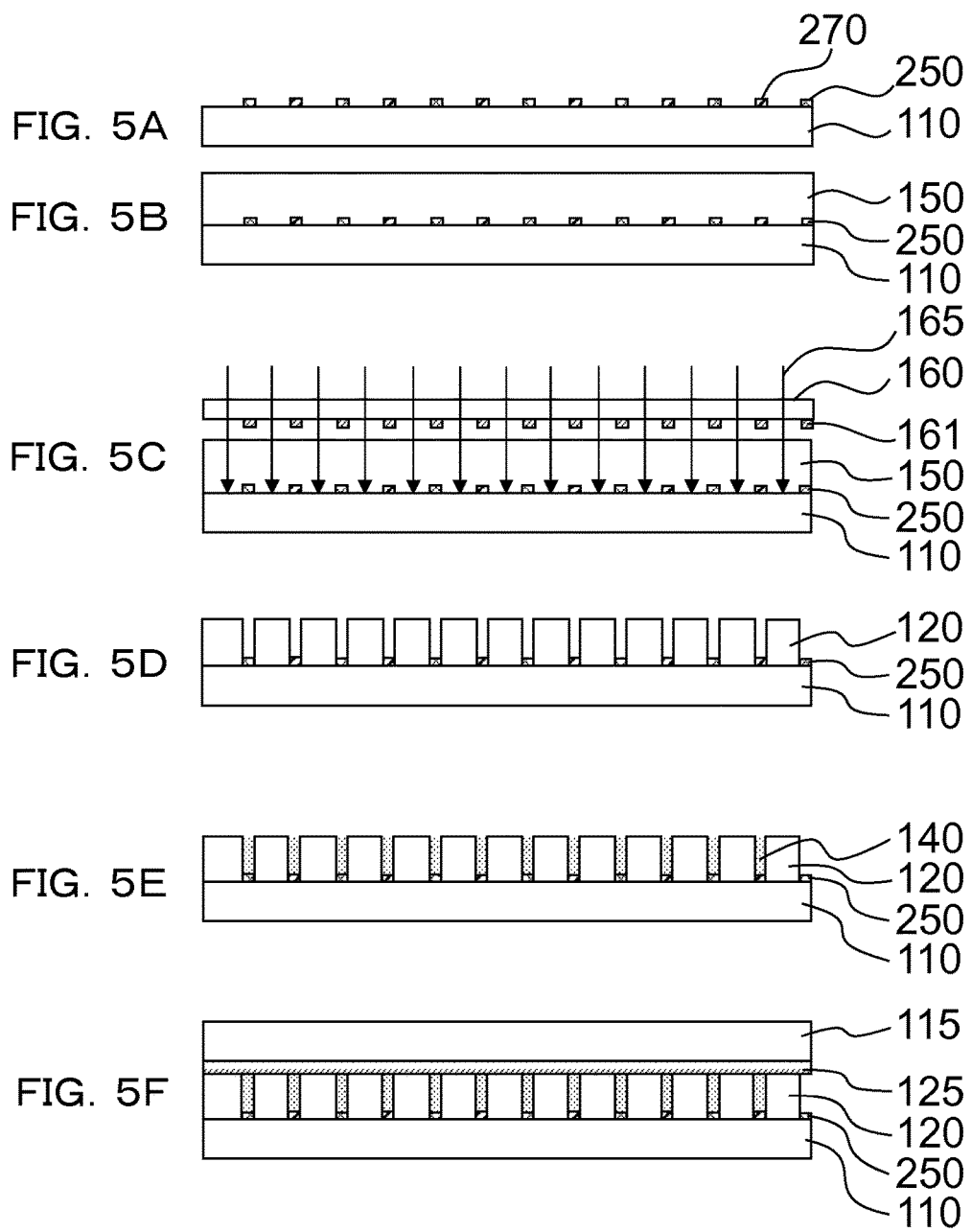

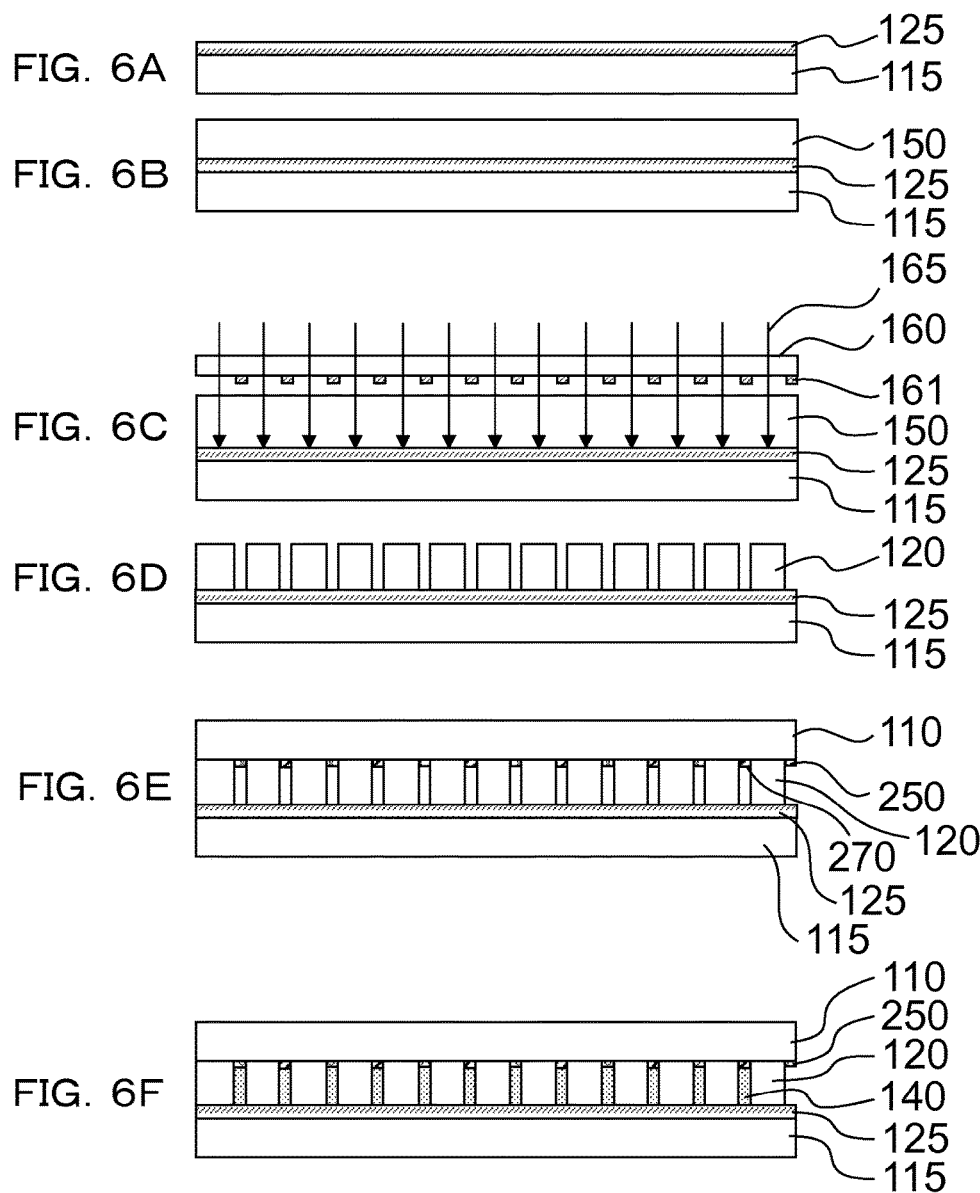

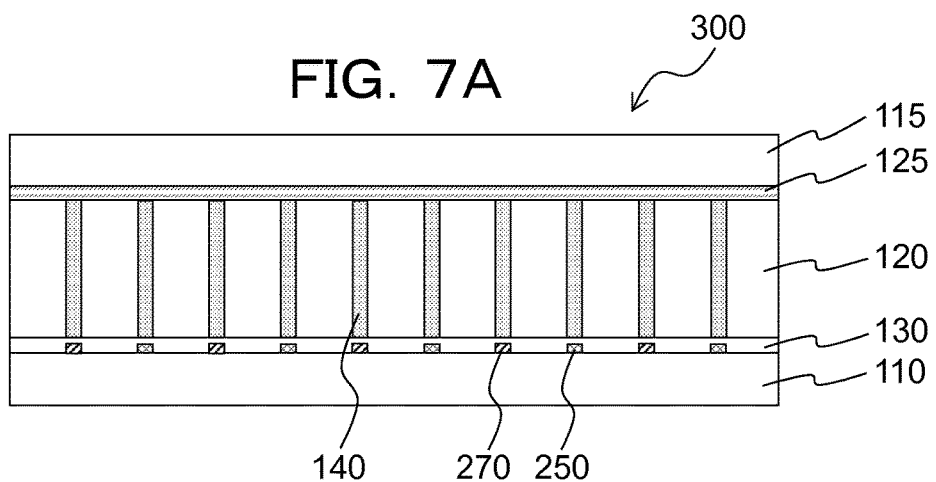
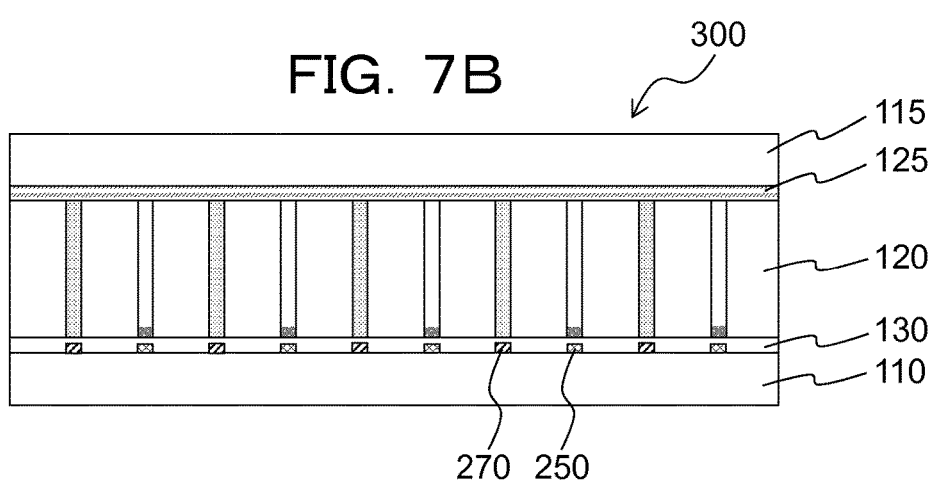
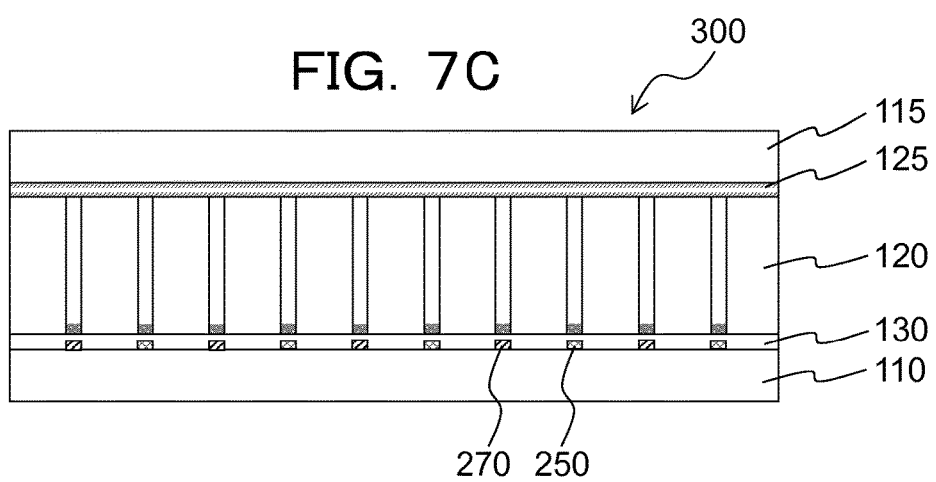

NARROW VIEWING FIELD MODE

INTERMEDIATE MODE

WIDE VIEWING FIELD MODE

NARROW VIEWING FIELD MODE

FIRST INTERMEDIATE MODE

SECOND INTERMEDIATE MODE 290 270   250 290

WIDE VIEWING FIELD MODE

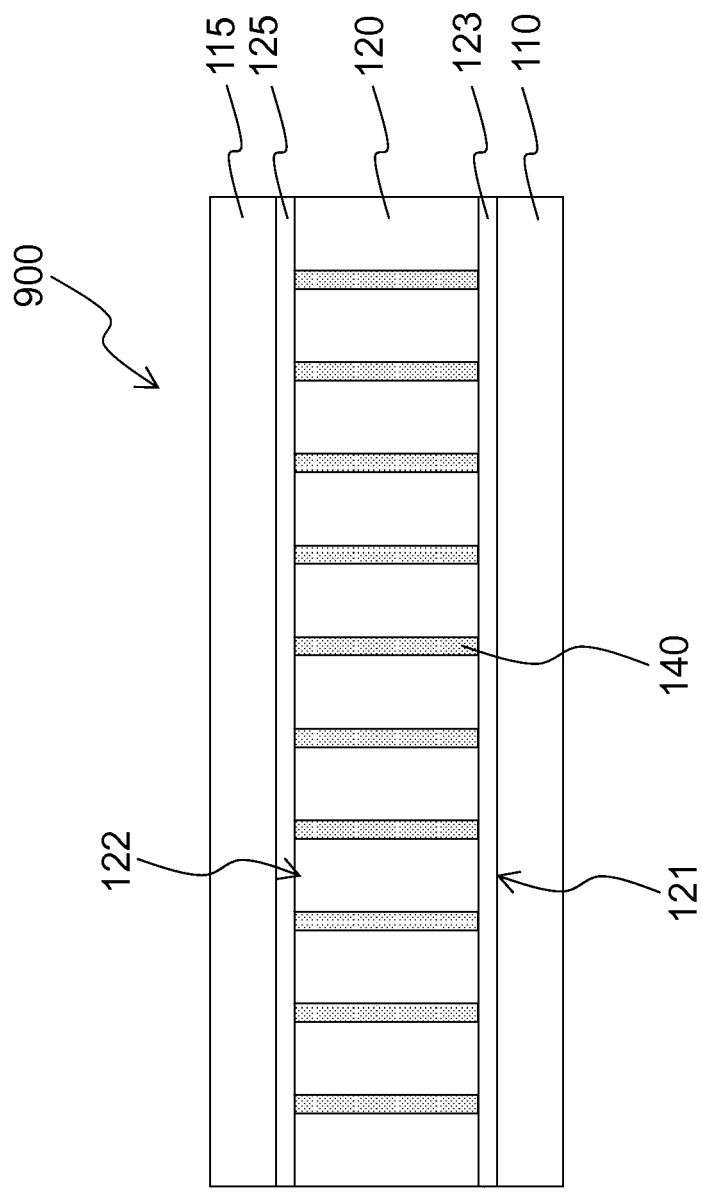

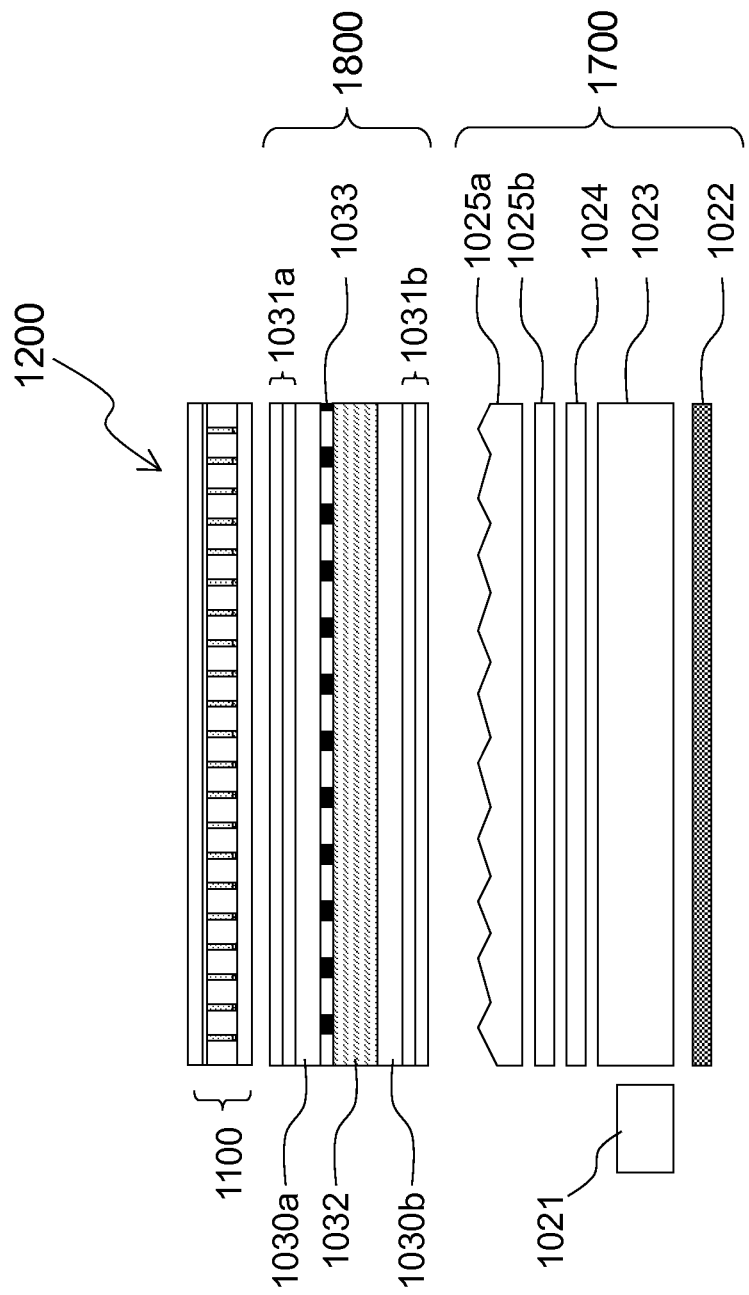

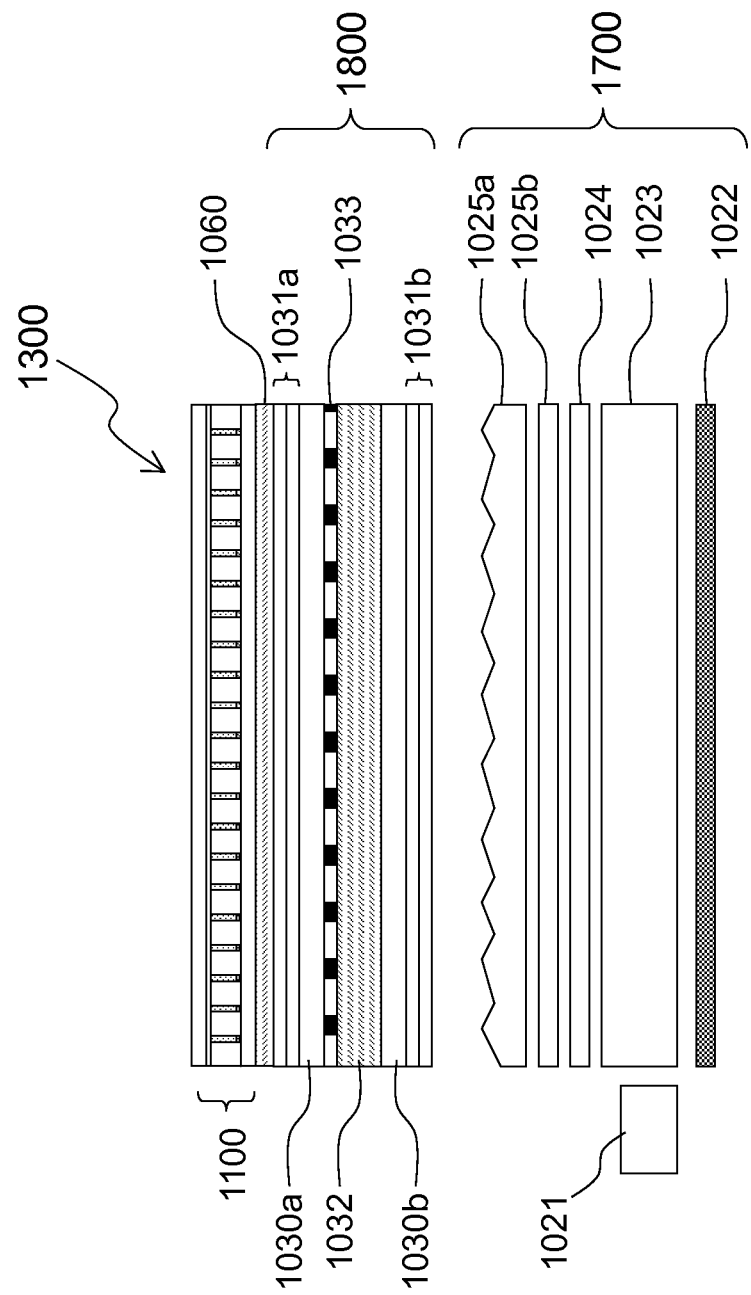

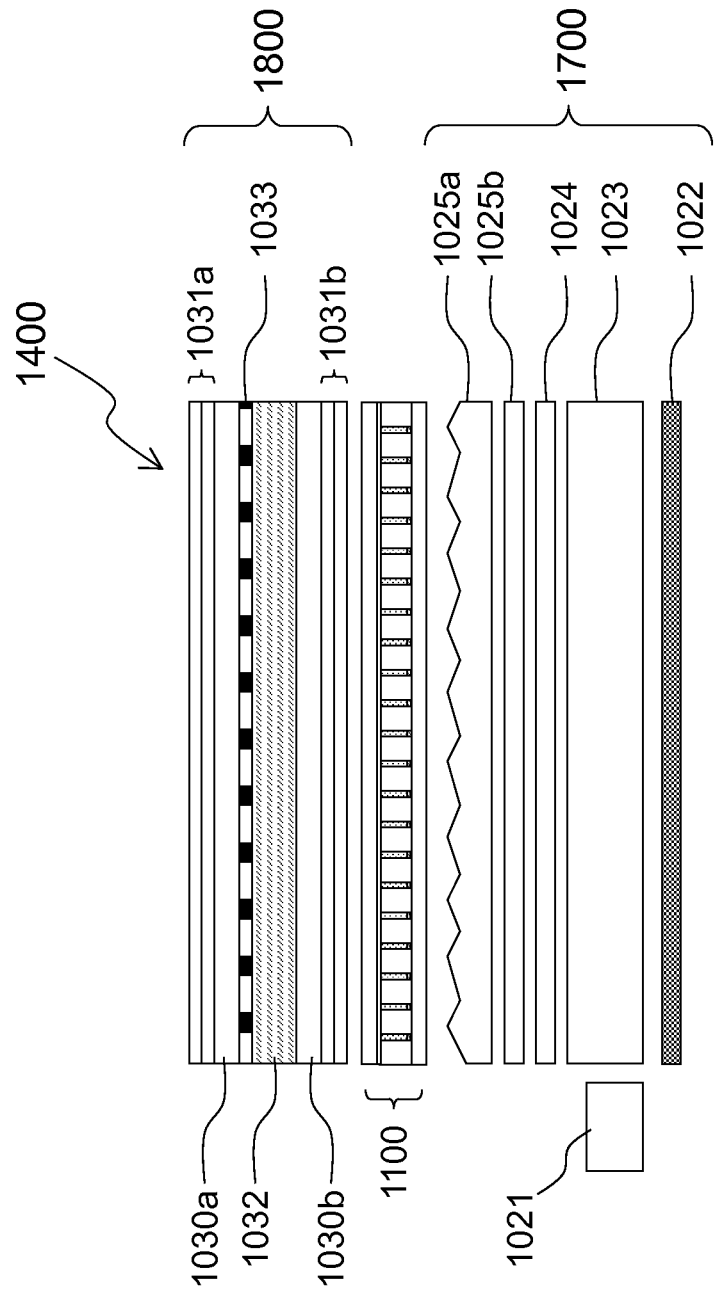

NARROW VIEWING FIELD MODE

INTERMEDIATE STATE ACQUIRED BY STOPPING
IN THE MIDDLE OF MODE TRANSITION

SHIFTED TO NARROW VIEWING FIELD MODE
DUE TO NATURAL DISPERSION
OF ELECTROPHORETIC PARTICLES

WIDE VIEWING FIELD MODE

INTERMEDIATE STATE ACQUIRED BY STOPPING
IN THE MIDDLE OF MODE TRANSITION

SHIFTED TO NARROW VIEWING FIELD MODE
DUE TO NATURAL DISPERSION
OF ELECTROPHORETIC PARTICLES

OPTICAL ELEMENT, AND DISPLAY DEVICE, ELECTRONIC APPARATUS, LIGHTING DEVICE USING THE SAME

CROSS-REFERENCE TO RELATED APPLICATION

This application is based upon and claims the benefit of priority from Japanese patent application No. 2014-186545, filed on Sep. 12, 2014 and Japanese patent application No. 2015-112070, filed on Jun. 2, 2015, the disclosure of which is incorporated herein in its entirety by reference.

BACKGROUND OF THE INVENTION

1. Field of the Invention

The present invention relates to an optical element which variably controls the range of exit directions of transmission light, and to a display device, an electronic apparatus, and a lighting device using the same.

2. Description of the Related Art

Display devices such as liquid crystal display devices, for example, are used as information display modules of various kinds of information processing devices such as television sets, personal computer monitors, notebook personal computers, feature phones, smartphones, tablet PCs, PDAs (Personal Digital Assistants) and ATMs (Automatic Teller Machines).

Further, as the displays are becoming large-scaled and multi-purposed, various luminous intensity distribution characteristics are required for the display devices. Particularly, there are demands for restricting the visible range so that others cannot peep at the display and a demand for not emitting light to undesired directions from the viewpoint of information leakage. For dealing with such demands, an optical film capable of restricting the visible range (or the emission range) of the display device has been proposed and has been put into practical use. However, in a case where the display device is viewed from a plurality of directions simultaneously, it is necessary to take out the optical film every time. Therefore, there is an increasing demand for acquiring states of a wide visible range and a narrow visible range arbitrarily without going through a trouble of taking out the optical film.

For meeting such demand, an optical element capable of switching the visible range of the display device between a wide viewing field mode and a narrow viewing field mode has been proposed.

As shown in FIG. 32, this optical element can arbitrarily acquire two states of a wide viewing field mode (see FIG. 32B) with which light 650 is emitted in a wide range and a narrow viewing field mode (see FIG. 32A) with which the light 650 is emitted in a narrow range by disposing an electrophoretic element 140 that is constituted with a dispersion material 142 and electrophoretic particles 141 between light-transmission regions 120 of high aspect ratio arranged independently on a substrate 110 in a planner manner and controlling the dispersion state of the electrophoretic particles 141 in the electrophoretic element 140 with the electric field generated by the voltage from outside. For example, it is the optical element acquired by: using a transparent substrate; applying, exposing, developing and curing a transparent photosensitive resin layer by applying heat to form the light transmission regions 120; and disposing the electrophoretic element 140 between the light transmission regions.

FIG. 33 is a sectional view showing an optical element 900 of a related art. The optical element 900 includes: a first transparent substrate 110; a transparent conductive film 123 formed on the surface of the transparent substrate 110; a plurality of light transmission regions 120 which are formed on the top face of the transparent conductive film 123 by being isolated from each other; electrophoretic elements 140 disposed between those light transmission regions 120; and a second transparent substrate 115 which is disposed on the light transmission regions 120 and includes another transparent conductive film 125 on the face that is in contact with the light transmission regions 120. The optical element 900 is disclosed in FIG. 8 of U.S. Pat. No. 7,751,667 B2 (Patent Document 1), for example.

However, with the related art disclosed in FIG. 8 of Patent Document 1, both the transparent conductive film 123 and the transparent conductive film 125 are disposed in a planar manner on the element regions of the first transparent substrate 110 and the second transparent substrate 115, so that the electrophoretic particles 141 in the electrophoretic elements 140 migrate simultaneously in a same direction on the transparent conductive film 123 and the transparent conductive film 125. Therefore, operation modes that can be stably achieved are limited to two kinds that are a narrow viewing field mode shown in FIG. 32A and a wide viewing field mode shown in FIG. 32B.

For example, it is possible to acquire a temporal intermediate state through stopping the generation of an electric field by the transparent conductive film 123 and the transparent conductive film 125 in a process of shifting to the wide viewing field mode where the electrophoretic particles 141 in the electrophoretic elements 140 are cohered in the vicinity of the transparent conductive film 123 as shown in FIGS. 42A, 42B from the narrow viewing field mode where the electrophoretic particles 141 in the electrophoretic elements 140 are distributed uniformly as shown in FIGS. 39A, 39B, i.e., in a state where the electrophoretic particles 141 in the electrophoretic elements 140 are distributed in a section from the intermediate position of the transparent conductive film 123 and the transparent conductive film 125 to the transparent conductive film 123 as shown in FIGS. 40A, 40B. However, thereafter, the electrophoretic particles 141 are dispersed spontaneously as shown in FIGS. 41A, 41B, and the mode comes to be shifted to the narrow viewing field mode.

Further, the intermediate state can also be achieved through stopping the generation of an electric field by the transparent conductive film 123 and the transparent conductive film 125 in a process of shifting to the narrow viewing field mode where the electrophoretic particles 141 in the electrophoretic elements 140 are distributed uniformly as shown in FIGS. 39A, 39B from the wide viewing field mode where the electrophoretic particles 141 in the electrophoretic element 140 are cohered in the vicinity of the transparent conductive film 123 as shown in FIGS. 42A, 42B, i.e., in a state where the electrophoretic particles 141 in the electrophoretic elements 140 are distributed in a section from the intermediate position of the transparent conductive film 123 and the transparent conductive film 125 to the transparent conductive film 123 as shown in FIGS. 43A, 43B. However, thereafter, the electrophoretic particles 141 are dispersed spontaneously as shown in FIGS. 44A, 44B, and the mode is also shifted to the narrow viewing field mode.

As described above, the intermediate state between the narrow viewing field mode and the wide viewing field mode can be acquired temporarily in the process of mode shift. However, it is difficult to continuously maintain the photoelectric particles 141 in the intermediate state between the wide viewing field mode and the narrow viewing field mode, so that it is difficult to stably achieve the intermediate mode that is the intermediate state between the narrow viewing field mode and the wide viewing field mode.

It is therefore an exemplary object of the present invention to provide an optical element that is capable of stably achieving, in addition to the narrow viewing field mode and the wide viewing field mode, the intermediate mode that is an intermediate state of the both modes, and to provide a display device, an electronic apparatus, and a lighting device using the same.

In order to achieve the foregoing object, the optical element according to an exemplary aspect of the invention includes: a first transparent substrate; a second transparent substrate provided by opposing to the first transparent substrate; a first conductive pattern and a second conductive pattern disposed on a face of the first transparent substrate opposing to the second transparent substrate; a light transmission region disposed individually between the first conductive pattern and the second conductive pattern to reach a surface of the second transparent substrate from a surface of the first transparent substrate, a pattern thereof transversely crossing an element region; a transparent conductive film disposed on a face of the second transparent substrate opposing to the first transparent substrate; and an electrophoretic element disposed between the neighboring light transmission regions, which is constituted with light-shielding electrophoretic particles of a specific electric charge and a transmissive dispersion material.

As an exemplary advantage according to the invention, the present invention makes it possible to operate the electrophoretic particles for each of the conductive patterns through independently controlling the conductive patterns of a plurality of series that are disposed on the first transparent substrate. Therefore, in addition to the narrow viewing field mode and the wide viewing field mode, it is also possible to stably achieve the intermediate mode exhibiting the intermediate characteristic of the both modes regardless of the time passage.

BRIEF DESCRIPTION OF THE DRAWINGS

FIGS. 1A and 1B show illustrations showing an optical element of a first exemplary embodiment in a narrow viewing field mode, in which FIG. 1A is a longitudinal sectional view showing the optical element that is cut in a face orthogonal to the display face of the optical element and FIG. 1B is a surface view showing the display face from the normal direction;

FIGS. 2A and 2B show illustrations showing the optical element of the first exemplary embodiment in an intermediate mode, in which FIG. 2A is a longitudinal sectional view showing the optical element that is cut in a face orthogonal to the display face of the optical element and FIG. 2B is a surface view showing the display face from the normal direction;

FIGS. 3A and 3B show illustrations showing the optical element of the first exemplary embodiment in a wide viewing field mode, in which FIG. 3A is a longitudinal sectional view showing the optical element that is cut in a face orthogonal to the display face of the optical element and FIG. 3B is a surface view showing the display face from the normal direction;

FIGS. 4A-4F show sectional views of a manufacturing method of the optical element according to the first exemplary embodiment in sequential steps, in which FIG. 4A is a longitudinal sectional view showing a step of forming first conductive patterns and second conductive patterns on the surface of a first transparent substrate in a simplified manner, FIG. 4B is a longitudinal sectional view showing a step of forming a transparent photosensitive resin layer as a negative-type photoresist film to be light transmission regions in a simplified manner, FIG. 4C is a longitudinal sectional view showing a step of exposing the transparent photosensitive resin layer through a photomask in a simplified manner, FIG. 4D is a longitudinal sectional view showing a step of forming the light transmission regions by developing the transparent photosensitive resin layer in a simplified manner, FIG. 4E is a longitudinal sectional view showing a step of disposing a second transparent substrate including a transparent conductive film on the surface of the light transmission regions in a simplified manner, and FIG. 4F is a longitudinal sectional view showing a step of filling electrophoretic elements in the spaces between the first conductive patterns, the second conductive patterns, the transparent conductive film, and the light transmission regions in a simplified manner;

FIGS. 5A-5F show sectional views of another manufacturing method of the optical element according to the first exemplary embodiment in sequential steps, in which FIG. 5A is a longitudinal sectional view showing a step of forming first conductive patterns and second conductive patterns on the surface of a first transparent substrate in a simplified manner, FIG. 5B is a longitudinal sectional view showing a step of forming a transparent photosensitive resin layer as a negative-type photoresist film to be light transmission regions in a simplified manner, FIG. 5C is a longitudinal sectional view showing a step of exposing the transparent photosensitive resin layer through a photomask in a simplified manner, FIG. 5D is a longitudinal sectional view showing a step of forming the light transmission regions by developing the transparent photosensitive resin layer in a simplified manner, FIG. 5E is a longitudinal sectional view showing a step of filling electrophoretic elements in the spaces between the first conductive patterns, the second conductive patterns, the transparent conductive film, and the light transmission regions in a simplified manner, and FIG. 5F is a longitudinal sectional view showing a step of disposing a second transparent substrate including a transparent conductive film on the surface of the light transmission regions in a simplified manner;

FIGS. 6A-6F show sectional views of still another manufacturing method of the optical element according to the first exemplary embodiment in sequential steps, in which FIG. 6A is a longitudinal sectional view showing a step of forming a transparent conductive film on the surface of the second transparent substrate in a simplified manner, FIG. 6B is a longitudinal sectional view showing a step of forming a transparent photosensitive resin layer on the transparent conductive film in a simplified manner, FIG. 6C is a longitudinal sectional view showing a step of patterning the transparent photosensitive resin layer by using a mask pattern in a simplified manner, FIG. 6D is a longitudinal sectional view showing a step of performing exposure, development, and annealing processing in a simplified manner, FIG. 6E is a longitudinal sectional view showing a step of disposing a first transparent substrate including first conductive patterns and second conductive patterns on the light transmission regions in a simplified manner, and FIG. 6F is a longitudinal sectional view showing a step of filling electrophoretic elements in the space between the first transparent substrate and the second transparent substrate in a simplified manner;

FIGS. 7A-7C show illustrations of an optical element according to a third exemplary embodiment, in which FIG. 7A is a longitudinal sectional view showing the optical element in a narrow viewing field mode, FIG. 7B is a longitudinal sectional view showing the optical element in an intermediate mode, and FIG. 7C is a longitudinal sectional view showing the optical element in a wide viewing field mode;

FIGS. 8A-8C show illustrations of an optical element according to a fourth exemplary embodiment, in which FIG. 8A is a longitudinal sectional view showing the optical element in a narrow viewing field mode, FIG. 8B is a longitudinal sectional view showing the optical element in an intermediate mode, and FIG. 8C is a longitudinal sectional view showing the optical element in a wide viewing field mode;

FIGS. 9A-9C show operation principle charts showing a state of the optical element of the first exemplary embodiment when the narrow viewing field mode is selected, in which FIG. 9A is a plan view showing a dispersion state of the electrophoretic particles in the electrophoretic element, FIG. 9B is a longitudinal sectional view thereof, and FIG. 9C is a chart showing a relation between the emission angles and the luminance by corresponding to the dispersion state of the electrophoretic particles;

FIGS. 10A-10C show operation principle charts showing a state of the optical element of the first exemplary embodiment when the intermediate mode is selected, in which FIG. 10A is a plan view showing a dispersion state of the electrophoretic particles in the electrophoretic element, FIG. 10B is a longitudinal sectional view thereof, and FIG. 10C is a chart showing a relation between the emission angles and the luminance by corresponding to the dispersion state of the electrophoretic particles;

FIGS. 11A-11C show operation principle charts showing a state of the optical element of the first exemplary embodiment when the wide viewing field mode is selected, in which FIG. 11A is a plan view showing a dispersion state of the electrophoretic particles in the electrophoretic element, FIG. 11B is a longitudinal sectional view thereof, and FIG. 11C is a chart showing a relation between the emission angles and the luminance by corresponding to the dispersion state of the electrophoretic particles;

FIGS. 12A and 12B show positional relations of the light transmission regions, the first conductive patterns and the second conductive patterns of the optical element of the first exemplary embodiment, in which FIG. 12A is a plan view thereof and FIG. 12B is a perspective view thereof;

FIGS. 14A-14F show sectional views of a manufacturing method of the optical element according to the second exemplary embodiment in sequential steps, in which FIG. 14A is a longitudinal sectional view showing a step of forming first conductive patterns and second conductive patterns on the surface of a first transparent substrate in a simplified manner, FIG. 14B is a longitudinal sectional view showing a step of forming a transparent photosensitive layer on the surface of the first transparent substrate in a simplified manner, FIG. 14C is a longitudinal sectional view showing a step of patterning the transparent photosensitive resin layer through irradiating exposure light from the back face side of the first transparent substrate by using the first conductive light-shielding patterns and the second conductive light-shielding patterns as the photomask in a simplified manner, FIG. 14D is a longitudinal sectional view showing a step of forming light transmission regions by developing the transparent photosensitive layer in a simplified manner, FIG. 14E is a longitudinal sectional view showing a step of disposing a second transparent substrate including a transparent conductive film on the surface of the light transmission regions in a simplified manner, and FIG. 14F is a longitudinal sectional view showing a step of filling electrophoretic elements in the spaces between the first conductive patterns, the second conductive patterns, the transparent conductive film, and the light transmission regions in a simplified manner;

FIGS. 19A-19C show operation principle charts showing a state of the optical element of the fifth exemplary embodiment when the narrow viewing field mode is selected, in which FIG. 19A is a plan view showing a dispersion state of the electrophoretic particles in the electrophoretic element, FIG. 19B is a longitudinal sectional view thereof, and FIG. 19C is a chart showing a relation between the emission angles and the luminance by corresponding to the dispersion state of the electrophoretic particles;

FIGS. 20A-20C show operation principle charts showing a state of the optical element of the fifth exemplary embodiment when the first intermediate mode is selected, in which FIG. 20A is a plan view showing a dispersion state of the electrophoretic particles in the electrophoretic element, FIG. 20B is a longitudinal sectional view thereof, and FIG. 20C is a chart showing a relation between the emission angles and the luminance by corresponding to the dispersion state of the electrophoretic particles;

FIGS. 21A-21C show operation principle charts showing a state of the optical element of the fifth exemplary embodiment when the second intermediate mode is selected, in which FIG. 21A is a plan view showing a dispersion state of the electrophoretic particles in the electrophoretic element, FIG. 21B is a longitudinal sectional view thereof, and FIG. 21C is a chart showing a relation between the emission angles and the luminance by corresponding to the dispersion state of the electrophoretic particles;

FIGS. 22A-22C show operation principle charts showing a state of the optical element of the fifth exemplary embodiment when the wide viewing field mode is selected, in which FIG. 22A is a plan view showing a dispersion state of the electrophoretic particles in the electrophoretic element, FIG. 22B is a longitudinal sectional view thereof, and FIG. 22C is a chart showing a relation between the emission angles and the luminance by corresponding to the dispersion state of the electrophoretic particles;

FIGS. 23A and 23B show positional relations of the light transmission regions, the first conductive patterns and the second and third conductive patterns of the optical element of the fifth exemplary embodiment, in which FIG. 23A is a plan view thereof and FIG. 23B is a perspective view thereof;

FIGS. 32A and 32B show longitudinal sectional views of the principle of the actions of the optical element of a related art, in which FIG. 32A shows a state of electrophoretic elements in a narrow viewing field mode and FIG. 32B shows a state of the electrophoretic elements in a wide viewing field mode;

FIG. 33 is a longitudinal sectional view showing the structure of the optical element of the related art;

FIG. 34 is a sectional view showing the structure of a display device which includes an optical element according to another exemplary embodiment being provided to a display screen;

FIG. 35 is a sectional view showing the structure of a display device which includes the optical element according to another exemplary embodiment being fixed to the display screen;

FIG. 36 is a sectional view showing the structure of a display device which includes the optical element according to another exemplary embodiment loaded inside thereof;

FIGS. 39A and 39B show operation principle charts showing a state of the optical element of a related art when a narrow viewing field mode is selected, in which FIG. 39A is a longitudinal sectional view showing a dispersion state of the electrophoretic particles in the electrophoretic element and FIG. 39B is a chart showing a relation between the emission angles and the luminance by corresponding to the dispersion state of the electrophoretic particles;

FIGS. 40A and 40B show operation principle charts showing a state of the optical element of the related art in an intermediate state when transiting from the narrow viewing field mode to the wide viewing field mode, in which FIG. 40A is a longitudinal sectional view showing a dispersion state of the electrophoretic particles in the electrophoretic element and FIG. 40B is a chart showing a relation between the emission angles and the luminance by corresponding to the dispersion state of the electrophoretic particles;

FIGS. 41A and 41B show operation principle charts showing behaviors of the electrophoretic particles of the optical element of the related art when generation of an electric field is stopped in the intermediate state when transiting from the narrow viewing field mode to the wide viewing field mode, in which FIG. 41A is a longitudinal sectional view showing a dispersion state of the electrophoretic particles in the electrophoretic element and FIG. 41B is a chart showing a relation between the emission angles and the luminance by corresponding to the dispersion state of the electrophoretic particles;

FIGS. 42A and 42B show operation principle charts showing a state of the optical element of the related art when selecting the wide viewing field mode, in which FIG. 42A is a longitudinal sectional view showing a dispersion state of the electrophoretic particles in the electrophoretic element and FIG. 42B is a chart showing a relation between the emission angles and the luminance by corresponding to the dispersion state of the electrophoretic particles;

FIGS. 43A and 43B show operation principle charts showing a state of the optical element of the related art in an intermediate state when transiting from the wide viewing field mode to the narrow viewing field mode, in which FIG. 43A is a longitudinal sectional view showing a dispersion state of the electrophoretic particles in the electrophoretic element and FIG. 43B is a chart showing a relation between the emission angles and the luminance by corresponding to the dispersion state of the electrophoretic particles;

FIGS. 44A and 44B show operation principle charts showing behaviors of the electrophoretic particles of the optical element of the related art when generation of an electric field is stopped in the intermediate state when transiting from the wide viewing field mode to the narrow viewing field mode, in which FIG. 44A is a longitudinal sectional view showing a dispersion state of the electrophoretic particles in the electrophoretic element and FIG. 44B is a chart showing a relation between the emission angles and the luminance by corresponding to the dispersion state of the electrophoretic particles;

FIGS. 45A-45C show longitudinal sectional views showing states of potentials of the first, second conductive patterns and the transparent conductive film in the optical element of the first exemplary embodiment, in which FIG. 45A shows a state of the narrow viewing field mode, FIG. 45B shows a state of the intermediate mode, and FIG. 45C shows a state of the wide viewing field mode;

FIGS. 46A and 46B show illustrations of electronic apparatuses according to another exemplary embodiment, in which FIG. 46A is an apparatus in which a touch panel is used for input and FIG. 46B is an apparatus in which a touch panel, a keyboard, and a mouse are used for input;

FIGS. 48A-48D show longitudinal sectional view showing states of potentials of the first, second, and third conductive patterns and the transparent conductive film in the optical element of the fifth exemplary embodiment, in which FIG. 48A shows a state of the narrow viewing field mode, FIG. 48B shows a state of the first intermediate mode, FIG. 48C shows a state of the second intermediate mode, and FIG. 48D shows a state of the wide viewing field mode;

FIGS. 52A and 53B show illustrations of a structure where both ends of the stripe-form light transmission regions in the optical element of the first exemplary embodiment are entirely sealed by a resin, in which FIG. 52A is a plan view thereof and FIG. 52B is a perspective view thereof;

FIGS. 54A and 54B show illustrations of a structure where the light transmission regions are disposed to reach the surface of the second transparent substrate from the surface of the first transparent substrate in all the element regions where the first conductive patterns and the second conductive patterns are not disposed in the optical element of a sixth exemplary embodiment, in which FIG. 54A is a plan view thereof and FIG. 54B is a perspective view thereof.

DETAILED DESCRIPTION OF THE PREFERRED EMBODIMENTS

Figure 8A:
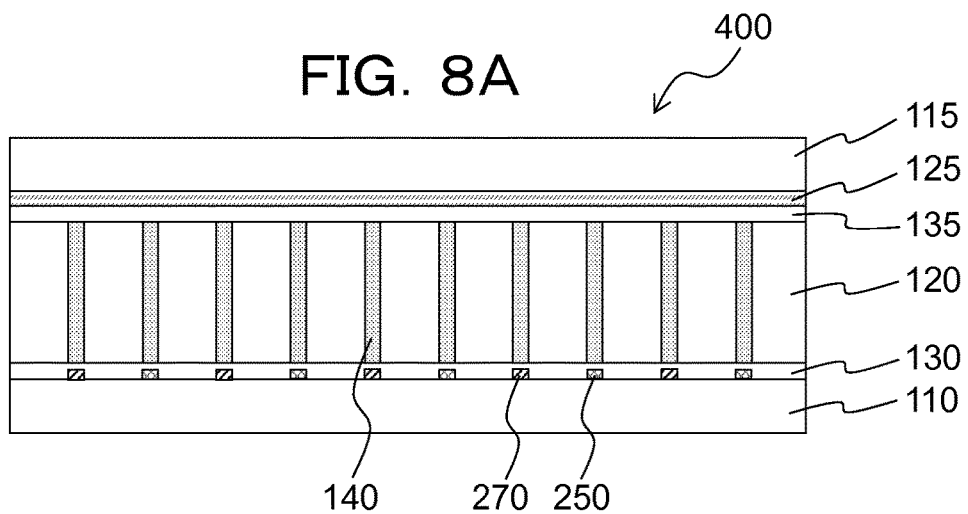

Hereinafter, modes for embodying the present invention (referred to as "exemplary embodiments" hereinafter) will be described by referring to the accompanying drawings. Same reference numerals are used for substantially same structural elements in the current Specification and the Drawings. It is to be noted that the dimensions and ratios of the shapes drawn in the Drawings are not necessarily consistent with the actual ones.

First Exemplary Embodiment

FIGS. 1A and 1B show illustrations of an optical element of a first exemplary embodiment in a narrow viewing field mode, in which FIG. 1A is a longitudinal sectional view showing the optical element that is cut in a face orthogonal to the display face of the optical element and FIG. 1B is a surface view showing the display face from the normal direction. FIGS. 2A and 2B show illustrations of the optical element of the first exemplary embodiment in an intermediate state (referred to as an intermediate mode hereinafter) between the narrow viewing field mode and a wide viewing field mode, in which FIG. 2A is a longitudinal sectional view showing the optical element that is cut in a face orthogonal to the display face of the optical element and FIG. 2B is a surface view showing the display face from the normal direction. FIGS. 3A and 3B show illustrations of the optical element of the first exemplary embodiment in the wide viewing field mode, in which FIG. 3A is a longitudinal sectional view showing the optical element that is cut in a face orthogonal to the display face of the optical element and FIG. 3B is a surface view showing the display face from the normal direction. The details of the optical element according to the first exemplary embodiment will be described hereinafter. While the case where the surface charge of the electrophoretic particles is (−) will be described hereinafter, it is also possible to deal with the case where the surface charge is (+) by inverting the polarity of the electrode.

The optical element 100 of the first exemplary embodiment includes: a first transparent substrate 110; a second transparent substrate 115 provided by opposing to the first transparent substrate 110; first conductive patterns 250 and second conductive patterns 270 disposed on a face of the first transparent substrate 110 opposing to the second transparent substrate 115; light transmission regions 120 disposed individually between the first conductive pattern 250 and the second conductive pattern 270 to reach the surface of the second transparent substrate 115 from the surface of the first transparent substrate 110, the pattern thereof transversely crossing the element region; a transparent conductive film 125 disposed on the face of the second transparent substrate 115 opposing to the first transparent substrate 110; and an electrophoretic element 140 disposed between the neighboring light transmission regions 120, which is a mixture of light-shielding electrophoretic particles 141 of a specific electric charge and a transmissive dispersion material 142.

The light transmission region 120 is a structural body (transparent resin pattern) in which a bottom face 121 thereof and a top face 122 thereof are provided to reach the first transparent substrate 110 and the second transparent substrate 115, respectively. The shape of the light transmission region 120 in the longitudinal direction is continuous in the lateral direction of the element region, i.e., in the perpendicular direction of the paper face of FIG. 1A or over the entire region in the vertical direction of FIG. 1B, and the end of the pattern is the same as the end of the element region. There is no problem even when the end of the pattern is extended to the outer side than the end of the element region. This is also the same in the following exemplary embodiments.

The first conductive patterns 250 and the second conductive patterns 270 are also continuous in the lateral direction of the element regions over the entire regions as in the case of the light transmission regions 120.

More specifically, the optical element 100 of the first exemplary embodiment includes: the first transparent substrate 110; the second transparent substrate 115 provided by opposing to the first transparent substrate 110 with a space provided therebetween; the first conductive patterns 250 and the second conductive patterns 270 which are disposed in parallel and alternately on the face of the first transparent substrate 110 opposing to the second transparent substrate 115 in such a manner that the both transversely cross the element regions; the light transmission regions 120 disposed between the first conductive pattern 250 and the second conductive pattern 270 to reach the surface of the second transparent substrate 115 from the surface of the first transparent substrate 110 to transversely cross the element region; the transparent conductive film 125 disposed over the entire region of the face of the second transparent substrate 115 opposing to the first transparent substrate 110; and the electrophoretic element 140 disposed between the neighboring light transmission regions 120, which is a mixture of the light-shielding electrophoretic particles 141 of a specific electric charge and the transmissive dispersion material 142.

Figure 9A:
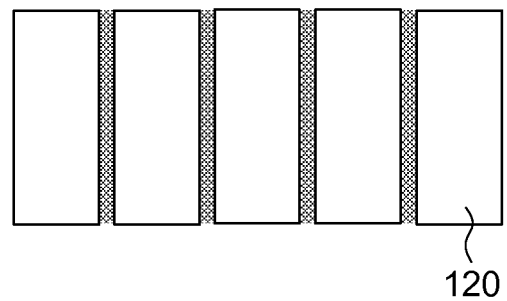
Figure 9B:
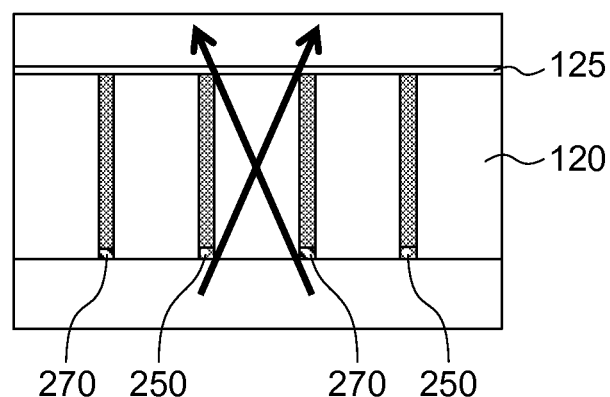
Figure 9C:
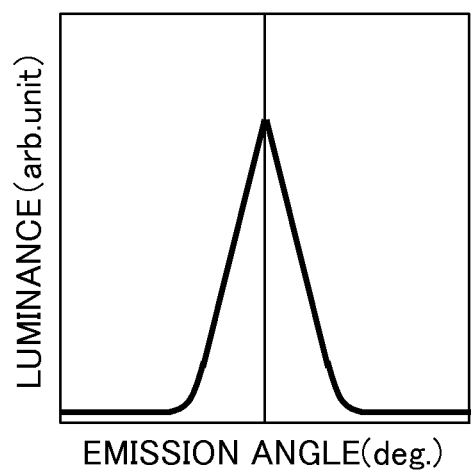
Figure 45A:
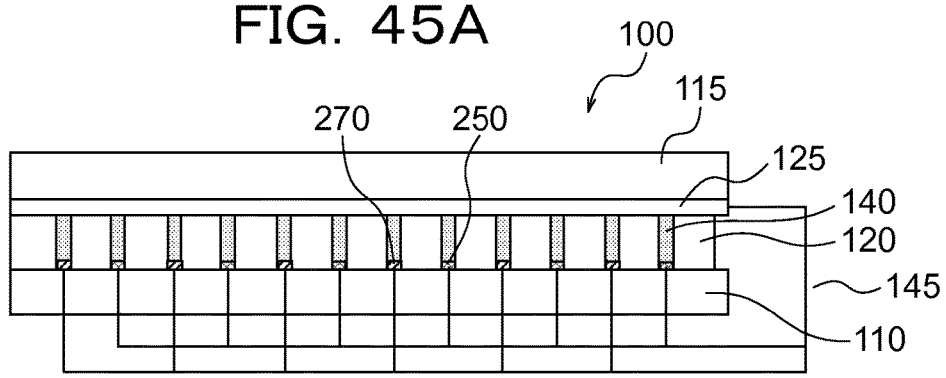

The narrow viewing field mode shown in FIG. 1A and FIG. 1B is achieved by dispersing electrophoretic particles 141 in the electrophoretic elements 140 disposed in the spaces between each of the light transmission regions 120 uniformly within the dispersion material 142 by setting the first conductive patterns 250, the second conductive patterns 270, and the transparent conductive film 125 to be in a same potential, respectively, by operating a voltage apply control module 145 (see FIG. 45A). In the narrow viewing field mode, as shown in FIGS. 9A and 9B, the electrophoretic particles 141 are dispersed uniformly within the dispersing material 142 in all the spaces between the transparent conductive film 125 and the first conductive patterns 250 and between the transparent conductive film 125 and the second conductive patterns 270, so that the spaces between the neighboring light transmission regions 120 are all shielded from light. Thus, as shown in FIGS. 9B and 9C, the narrowest visible range can be achieved.

Figure 10A:
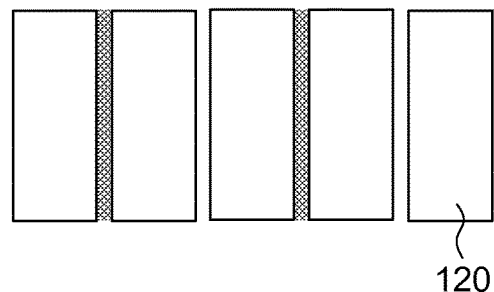
Figure 10B:
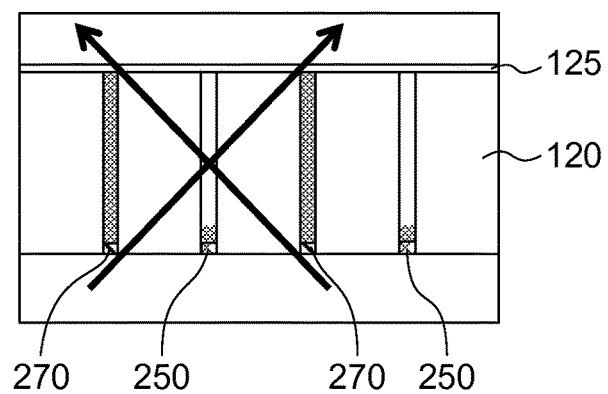
Figure 10C:
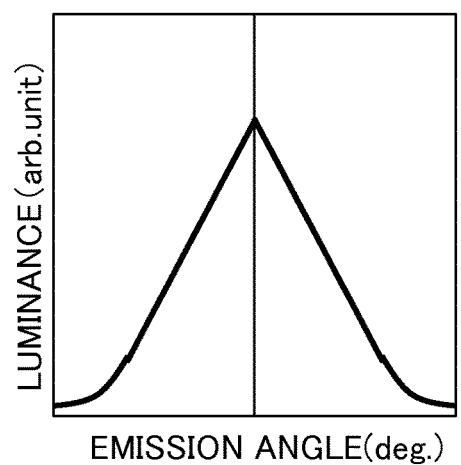
Figure 45B:
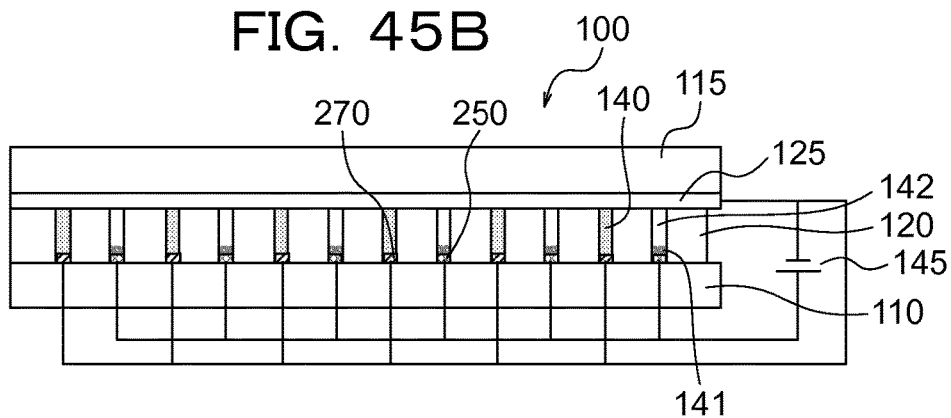

In the meantime, the intermediate mode shown in FIG. 2A and FIG. 2B is achieved by setting the relative potential of the transparent conductive film 125 with respect to the first conductive patterns 250 to be in a same polarity as that of the surface charge of the electrophoretic particles 141 to cohere the electrophoretic particles 141 in the vicinity of the surface of the first conductive patterns 250 by operating the voltage apply control module 145 (see FIG. 45B). At this time, the second conductive patterns 270 and the transparent conductive film 125 are in a same potential (see FIG. 45B). Between the transparent conductive film 125 and the second conductive patterns 270, as shown in FIGS. 10A and 10B, the electrophoretic particles 141 are dispersed within the dispersing material 142 uniformly. Thus, light can transmit through the electrophoretic element 140 obliquely in a proportion of 1 column out of 2 columns in a space between the neighboring light transmission regions 120. Therefore, as shown in FIGS. 10B and 10C, a wider visible range than the narrow viewing field mode can be achieved.

Figure 11A:
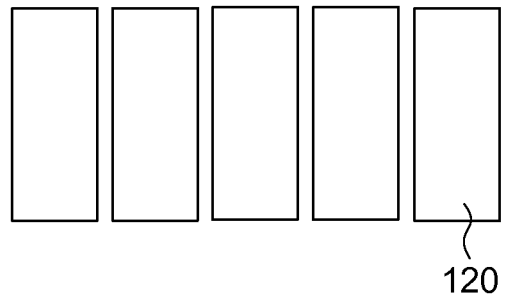
Figure 11B:
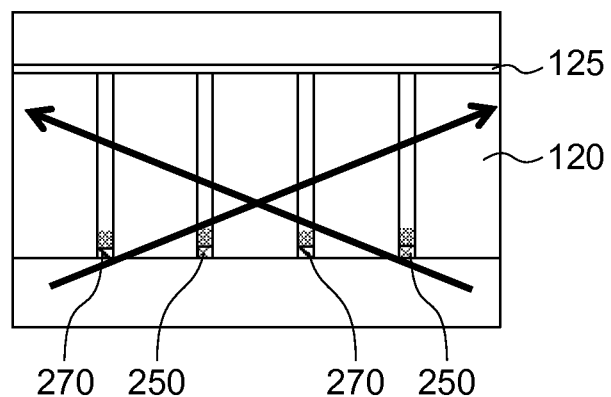
Figure 11C:
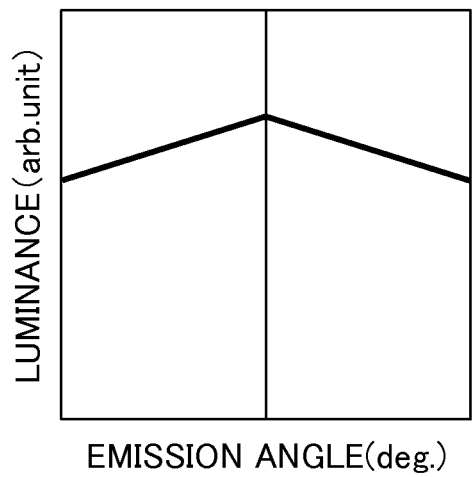

Further, the wide viewing field mode shown in FIG. 3A and FIG. 3B is achieved by cohering the electrophoretic particles 141 in the vicinity of the surfaces of the first conductive patterns 250 and the second conductive patterns 270 by operating the voltage apply control module 145 (see FIGS. 11A and 11B). At this time, the first conductive patterns 250 and the second conductive patterns 270 are in a same potential (see FIG. 45C), the relative potential of the transparent conductive film 125 with respect to the first conductive patterns 250 and the second conductive patterns 270 is the same polarity as that of the surface charge of the electrophoretic particles 141 (see FIG. 45C), the electrophoretic particles 141 are cohered to the first conductive patterns 250 in the dispersing material 142 between the transparent conductive film 125 and the first conductive patterns 250, and the electrophoretic particles 141 are also cohered to the second conductive patterns 270 in the dispersing material 142 between the transparent conductive film 125 and the second conductive patterns 270. Thus, light can transmit obliquely in the all spaces between the neighboring light transmission regions 120 in the wide viewing field mode. Therefore, as shown on FIGS. 11A and 11B, a still wider visible range than the intermediate mode can be achieved.

Figure 45C:
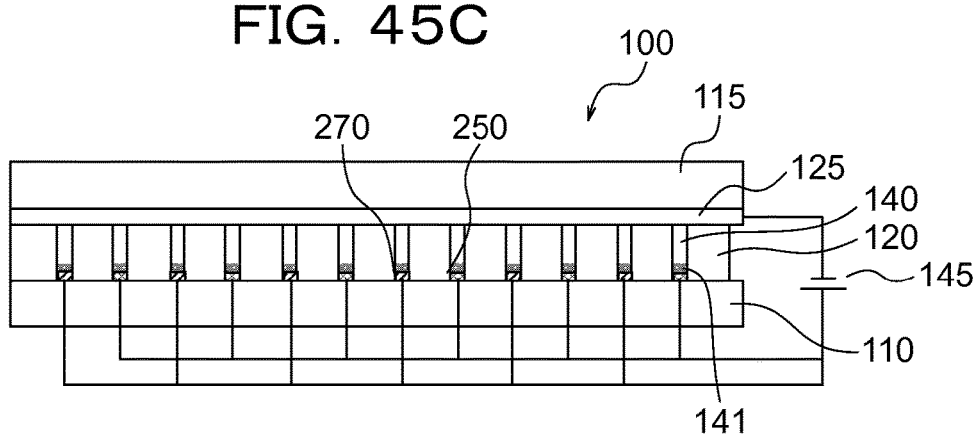

As described, display of the narrow viewing field mode, the intermediate mode, and the wide viewing field mode can be achieved through controlling the potentials of the first conductive patterns 250, the second conductive patterns 270, and the transparent conductive film 125 by the voltage apply control module 145 shown in FIGS. 45A, 45B, and 45C. The voltage apply control module 145 is a means for changing the polarities of each of the first conductive patterns 250, the second conductive patterns 270, and the transparent conductive film 125 by adjusting the voltages to be applied to the first conductive patterns 250, the second conductive patterns 270, and the transparent conductive film 125 according to signals from outside.

As described above, the two types of conducive patterns such as the first conductive patterns 250 and the second conductive patterns 270 are disposed on the surface of the first transparent substrate 110 in parallel and alternately, and the potential differences between the transparent conductive film 125 and each of the types of the conductive patterns 250, 270 are controlled independently by the voltage apply control module 145.

Thereby, in the narrow viewing field mode shown in FIGS. 1A and 1B, as shown in FIG. 45A, the first conductive patterns 250, the second conductive patterns 270, and the transparent conductive film 125 are all set to be in a same potential so that the state where the electrophoretic particles 141 in all the electrophoretic elements 140 are dispersed uniformly can be achieved.

Further, in the intermediate mode shown in FIGS. 2A and 2B, as shown in FIG. 45B, the relative potential of the transparent conductive film 125 with respect to the first conductive patterns 250 is set to be in a same polarity as that of the surface charge of the electrophoretic particles 141 to cohere the electrophoretic particles 141 in the electrophoretic element 140 between the first conductive pattern 250 and the transparent conductive film 125 in the vicinity of the surface of the conductive patterns 250 while the second conductive patterns 270 and the transparent conductive film 125 are set to be in a same potential so that the electrophoretic particles 141 in the electrophoretic element 140 between the second conductive patterns 270 and the transparent conductive film 125 are dispersed within the entire dispersing material 142 so as to achieve the state where the electrophoretic particles 141 are cohered to the conductive patterns and are dispersed in every other column in the columns of the patterns constituted with the first conductive patterns 250 and the second conductive patterns 270.

Further, in the wide viewing field mode shown in FIGS. 3A and 3B, as shown in FIG. 45C, the first conductive patterns 250 and the second conductive patterns 270 are set to be in a same potential and the relative potential of the transparent conductive film 125 with respect to the first conductive patterns 250 and the second conductive patterns 270 is set to be in a same polarity as that of the surface charge of the electrophoretic particles 141 to achieve the state where the electrophoretic particles 141 are cohered in the vicinity of the surfaces of the conductive patterns 250 and the second conductive patterns 270 in all the electrophoretic elements 140 between the first conductive patterns 250, the second conductive patterns 270, and the transparent conductive film 125, i.e., the state where the electrophoretic particles 141 are cohered to the conductive patterns in all the columns of the patterns constituted with the first conductive patterns 250 and the second conductive patterns 270.

Figure 40A:
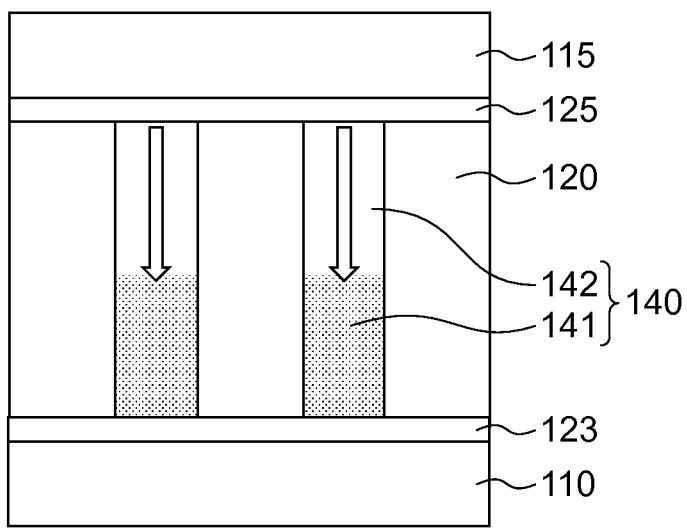
Figure 40B:
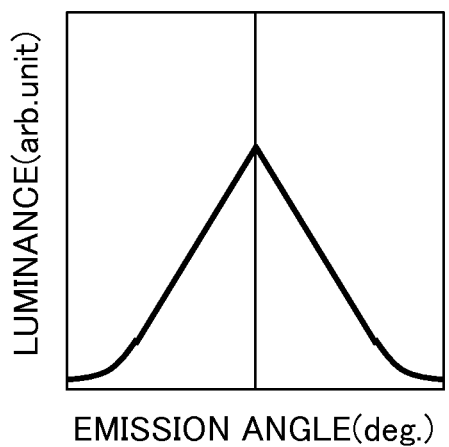
Figure 41A:
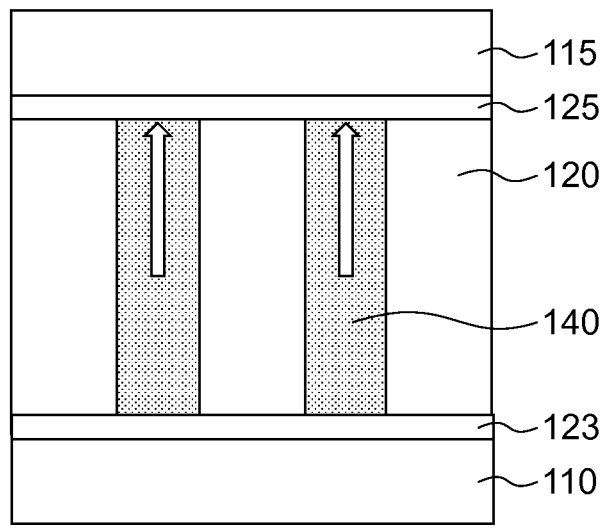
Figure 41B:
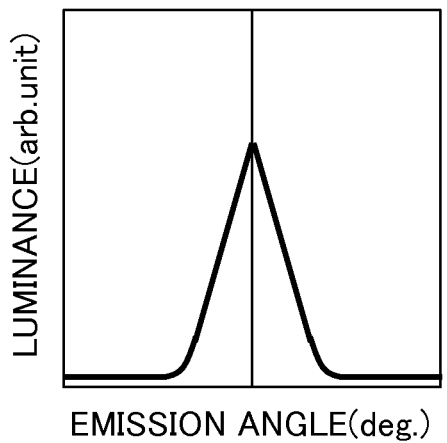
Figure 42A:
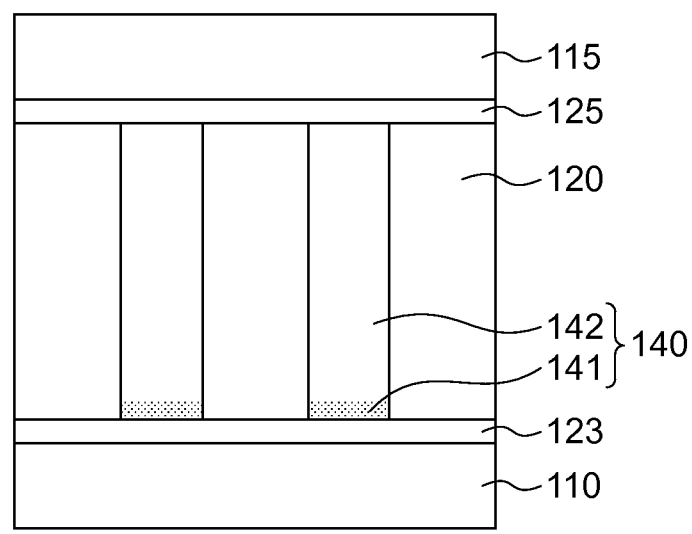
Figure 42B:
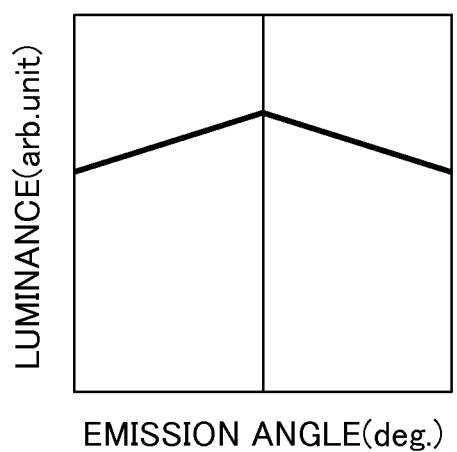
Figure 43A:
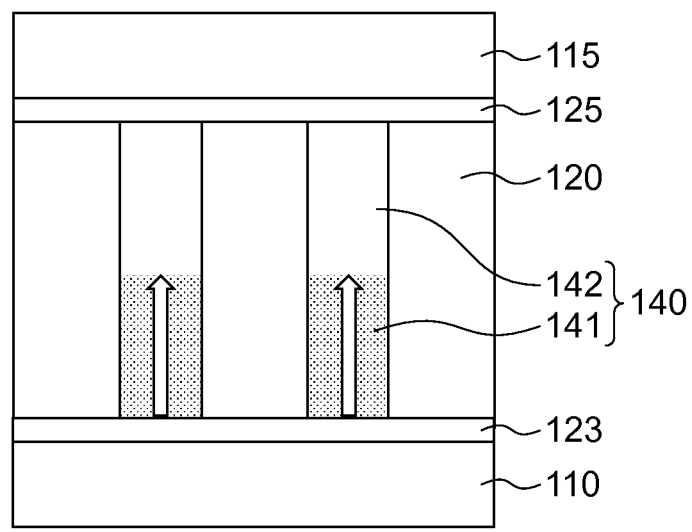
Figure 43B:
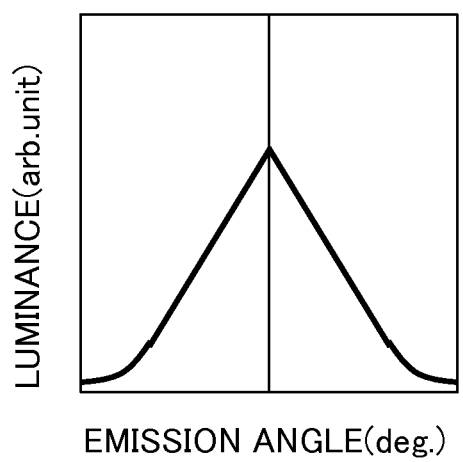
Figure 44A:
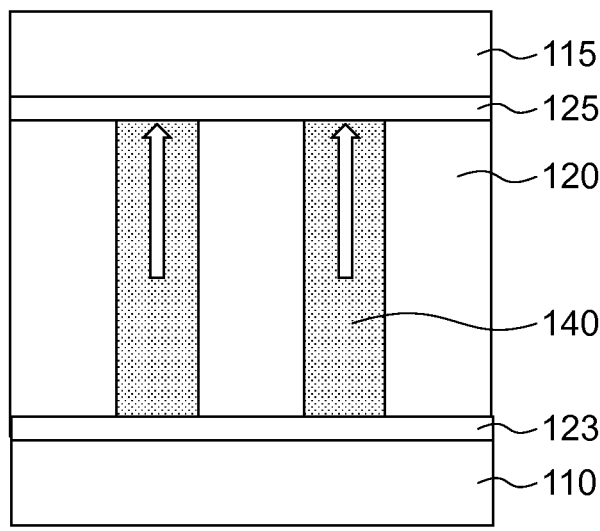
Figure 44B:
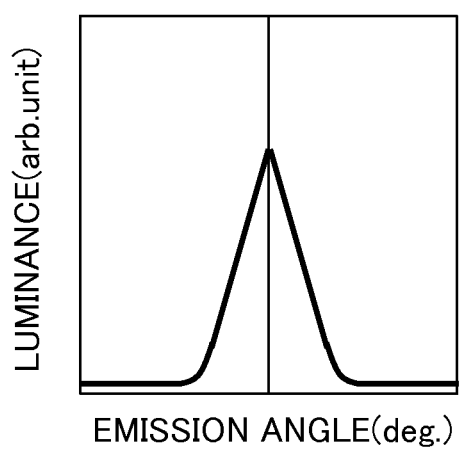

As described above, unlike the related art shown in FIG. 40A and FIG. 43A, in the optical element 100 of the first exemplary embodiment, such well-known technical spirit that the electrophoretic particles 141 are retained in the section from the intermediate point between the transparent conductive film 123 and the transparent conductive film 125 to the transparent conductive film 123, i.e., the technical spirit assuming that the intermediate mode is achieved by changing the height of the light shielding module (the part of the dispersing material 142 where the electrophoretic particles 141 are dispersed) for shielding the section between the neighboring light transmission regions 120, is revised.

Either a state where the electrophoretic particles 141 existing between the first conductive pattern 250 and the transparent conductive film 125 are completely dispersed between the first conductive pattern 250 and the transparent conductive film 125, i.e., a state where the light transmission regions 120 sandwiching the first conductive pattern 250 are light-shielded by the light shielding module (the electrophoretic particles 141 dispersed over the entire region of the dispersing material 142) or a state where the electrophoretic particles 141 existing between the first conductive pattern 250 and the transparent conductive film 125 are cohered in the vicinity of the first conductive patterns 250, i.e., a state where the light shielding module between the light transmission regions 120 sandwiching the first conductive pattern 250 is eliminated, is selected.

In the meantime, either a state where the electrophoretic particles 141 existing between the second conductive pattern 270 and the transparent conductive film 125 are completely dispersed between the second conductive pattern 270 and the transparent conductive film 125, i.e., a state where the light transmission regions 120 sandwiching the second conductive pattern 270 are light-shielded by the light shielding module (the electrophoretic particles 141 disposed over the entire region of the dispersing material 142) or a state where the electrophoretic particles 141 existing between the second conductive pattern 270 and the transparent conductive film 125 are cohered in the vicinity of the second conductive patterns 270, i.e., a state where the light shielding module between the light transmission regions 120 sandwiching the second conductive pattern 270 is eliminated, is selected.

The embodiment is structured to adjust the angles of the light that can pass through the optical element 100 obliquely by changing the interval of existence of the light shielding module (the electrophoretic particles 141 disposed over the entire region of the dispersing material 142) for sectioning and light-shielding a series of the light transmission regions 120 through changing combination modes of the two sets of selecting states. Thus, in addition to the narrow viewing field mode and the wide viewing field mode, it is especially possible to stably maintain the intermediate mode regardless of the time passage.

It is because there is no change in the state due to dispersion of the electrophoretic particles 141 even when the time passes.

In short, it is possible to operate the electrophoretic particles 141 for each of the conductive patterns 250 and 270 by independently controlling the first conductive pattern 250 and the second conductive patterns 270 which are plural-type conductive patterns disposed on the first transparent substrate 110. Thus, the angles of the light that can pass through the optical element 100 obliquely can be adjusted by variously changing the interval of existence of the light shielding module (the electrophoretic particles 141 disposed over the entire region of the dispersing material 142) for sectioning and light-shielding a series of the light transmission regions 120 without dispersing the electrophoretic particles 141 in a halfway state. Therefore, in addition to the narrow viewing field mode and the wide viewing field mode, it is especially possible to stably maintain the intermediate mode regardless of the time passage.

The optical element 100 shown in FIG. 1 to FIG. 3 is a structure that is capable of restricting the visible angles in two directions (e.g., in left and right directions) in the narrow viewing field mode. In a case where it is required to restrict the visible angles in four directions (e.g., in top-and-bottom and left-and-right directions) in the narrow viewing field mode, one of the structures shown in FIG. 49 to FIG. 51 may be employed.

Figure 49:
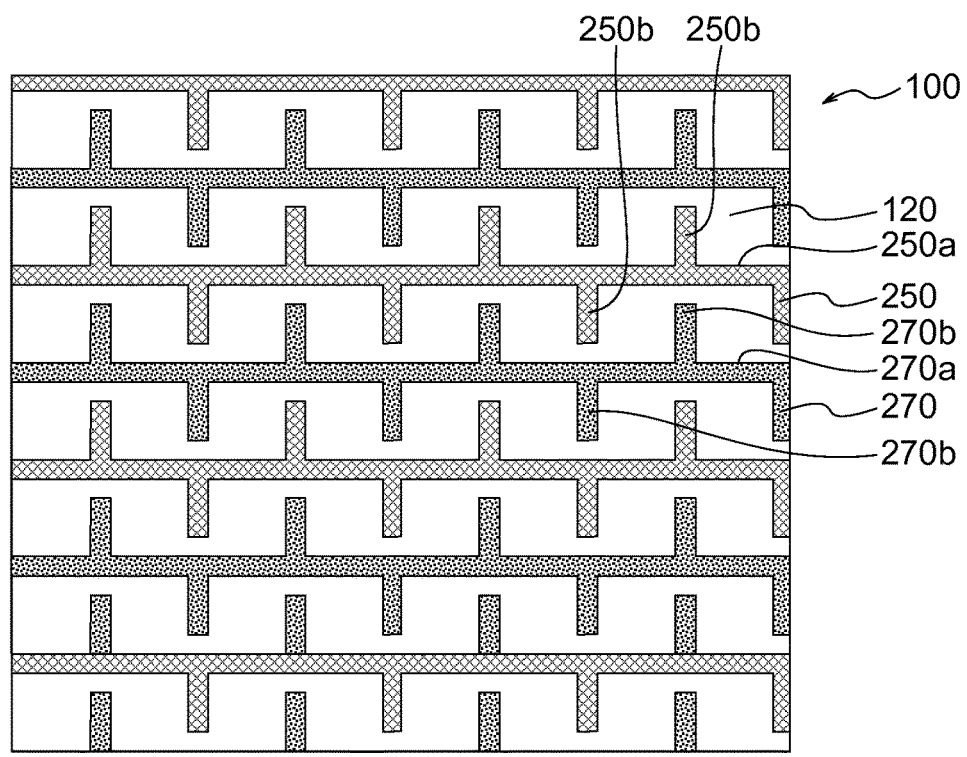
FIG. 49 is a surface view showing another structural example of the optical element from the normal direction of the display face in a case where restriction of visible angles in the four directions of the top-and-bottom and left-and-right directions is achieved by applying the layout of the first conductive patterns, the second conductive patterns, and the light transmission regions in the optical element of the first exemplary embodiment.

FIG. 49 is a case where: each of the first conductive patterns 250 and the second conductive patterns 270 includes main sections 250a, 270a which transversely cross the element region and a plurality of subsidiary sections 250b, 270b which are formed on both sides of the main sections 250a, 270a in a specific pitch to line on a straight-line form along the extending directions of the main sections 250a, 270a by shifting the pitch by being connected to the main sections 250a, 270a orthogonally and extended from the main sections 250a, 270a to the closest regions of the main sections 270a, 250a adjacent to the main sections 250a, 270a; and the subsidiary section 250b of the first conductive pattern 250 and the subsidiary section 270b of the second conductive pattern 270 neighboring to each other are disposed to line on a straight-line form in parallel and alternately.

Figure 50:
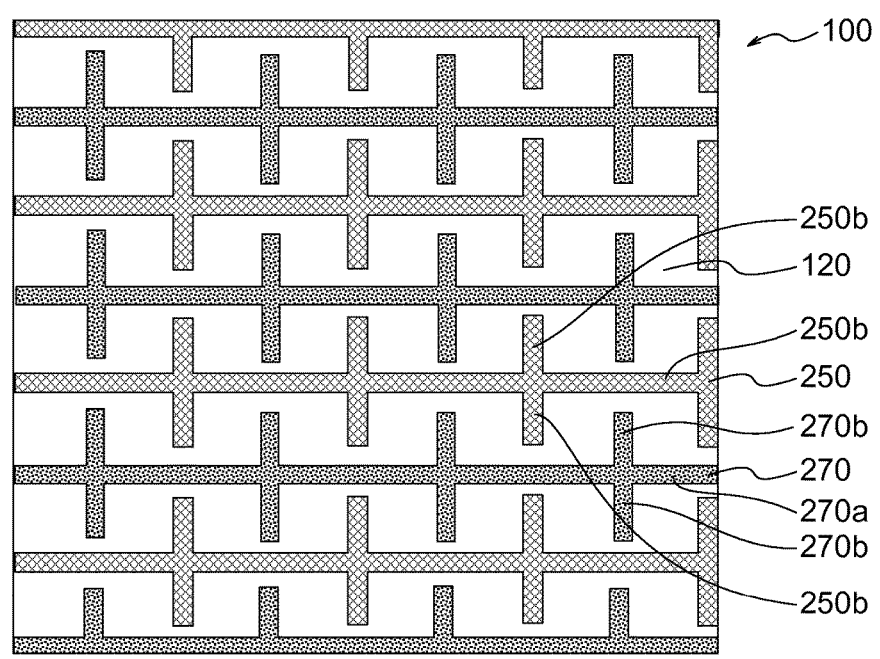
FIG. 50 is a surface view showing still another structural example of the optical element from the normal direction of the display face in a case where restriction of visible angles in the four directions of the top-and-bottom and left-and-right directions is achieved by applying the layout of the first conductive patterns, the second conductive patterns, and the light transmission regions in the optical element of the first exemplary embodiment.

FIG. 50 is a case where: each of the first conductive patterns 250 and the second conductive patterns 270 includes main sections 250a, 270a which transversely cross the element region and a plurality of subsidiary sections 250b, 270b which are formed on both sides of the main sections 250a, 270a in a specific pitch to line on a straight-line form along the extending directions of the main sections 250a, 270a without shifting the pitch by being connected to the main sections 250a, 270a orthogonally and extended from the main sections 250a, 270a to the closest regions of the main sections 270a, 250a adjacent to the main sections 250a, 270a; and the subsidiary section 250b of the first conductive pattern 250 and the subsidiary section 270b of the second conductive pattern 270 neighboring to each other are disposed to line on a straight-line form in parallel and alternately.

Figure 51:
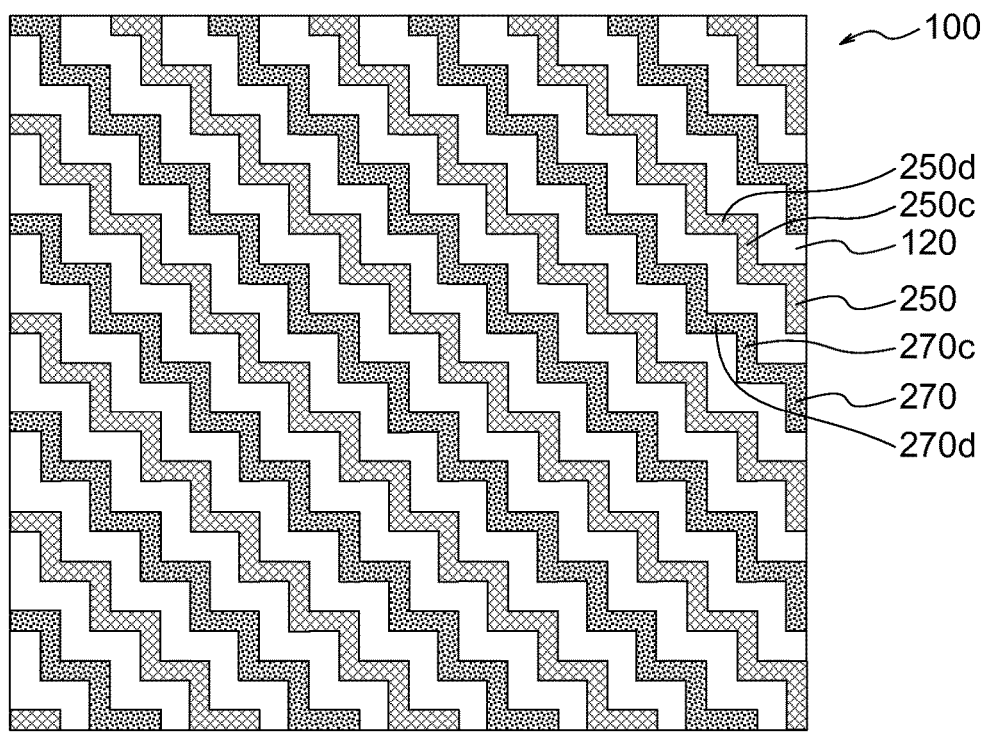
FIG. 51 is a surface view showing yet another structural example of the optical element from the normal direction of the display face in a case where restriction of visible angles in the four directions of the top-and-bottom and left-and-right directions is achieved by applying the layout of the first conductive patterns, the second conductive patterns, and the light transmission regions in the optical element of the first exemplary embodiment.

FIG. 51 is a case where: each of the first conductive patterns 250 and the second conductive patterns 270 is constituted with repetition of first straight-line sections 250c, 270c which are extended to the direction that transversely crosses the element regions and second straight-line sections 250d, 270d which are extended in a direction orthogonal to the first straight-line sections 250c, 270c; and the length of the first straight-line section 250c of the first conductive pattern 250, the length of the first straight-line section 270c of the second conductive pattern 270, the length of the second straight-line section 250d of the first conductive pattern 250, the length of the second straight-line section 270d of the second conductive pattern 270 are same.

As in the case of the optical element 100 shown in FIG. 1 to FIG. 3, in the cases shown in FIG. 49 and FIG. 50 out of the above-described cases, the main sections 250a of the first conductive patterns 250 and the main sections 270a of the second conductive patterns 270 are disposed in parallel and alternately to transversely cross the element regions at a specific interval, and the subsidiary sections 250b of the first conductive patterns 250 and the subsidiary sections 270b of the second conductive patterns 270 are disposed in parallel and alternately to vertically cross the element regions in a direction orthogonal to the main sections 250a and the main sections 270a. Thus, in the narrow viewing field mode, it is possible to restrict the visible angles in the two directions of top-and-bottom directions by a combination of the main sections 250a and the main sections 270a in parallel to each other and in the two directions of left-and-right directions by a combination of the subsidiary sections 250b and subsidiary sections 270b in parallel to each other, i.e., in the four directions in total.

Further, in the case shown in FIG. 51, the first straight-line section 250c constituting a part of the first conductive pattern 250 and the first straight-line section 270c constituting a part of the second conductive pattern 270 are disposed in parallel and alternately to transversely cross the element region at a specific interval, and the second straight-line section 250d constituting a part of the first conductive pattern 250 and the second straight-line section 270d constituting a part of the second conductive pattern 270 are disposed in parallel and alternately in a direction orthogonal to the first straight-line section 250c constituting a part of the first conductive pattern 250 and the first straight-line section 270c constituting a part of the second conductive pattern 270. Therefore, it is possible to restrict the visible angles in the two directions of top-and-bottom directions by a combination of the first straight-line sections 250c and the first straight-line sections 270c in parallel to each other and in the two directions of left-and-right directions by a combination of the second straight-line sections 250d and the second straight-line sections 270d in parallel to each other, i.e., in the four directions in the narrow viewing field mode.

FIG. 4 is a sectional view showing a manufacturing method of the optical element 100 according to the first exemplary embodiment. Hereinafter, the outline of an example of the method for manufacturing the optical element 100 according to the first exemplary embodiment will be described.

The manufacturing method of the optical element 100 according to the first exemplary embodiment includes following steps.

A step of forming each of the conductive patterns 250 and the second conductive patterns 270 on the surface of the first transparent substrate 110 (see FIG. 4A).

A step of forming a transparent photosensitive resin layer 150 as a negative photoresist film to be the light transmission regions 120 (see FIG. 4B).

A step of exposing the transparent photosensitive resin layer 150 through irradiating exposure light 165 to the transparent photosensitive resin layer 150 through a photomask 160 that is provided with a mask pattern 161 (see FIG. 4C). At this time, the positions of the photomask 160 and the transparent substrate 110 are controlled so that each of the positions of the conductive patterns 250 and the second conductive patterns 270 overlap with the mask pattern 161.

A step of forming a plurality of the light transmission regions 120 which are isolated from each other by developing the exposed transparent photosensitive resin layer 150 (see FIG. 4D).

A step of disposing the second transparent substrate 115 which includes the transparent conductive film 125 to be closely fitted to the surface of the light transmission regions 120 (see FIG. 4E).

Further, a step of filling the electrophoretic elements 140 in the spaces between the conductive patterns 250, the second conductive patterns 270, the transparent conductive film 125, and the light transmission regions 120 (see FIG. 4F).

Among those, the orders of the step of disposing the second transparent substrate 115 including the transparent conductive film 125 on the surface of the light transmission regions 120 and the step of filling the electrophoretic elements 140 in the spaces between the first conductive patterns 250, the second conductive patterns 270, the transparent conductive film 125, and the light transmission regions 120 may be inverted.

In this case, after performing the steps of FIG. 4A to FIG. 4D, as shown in FIG. 5, a step of filling the electrophoretic elements 140 between the light transmission regions 120 is performed (FIG. 5E). Then, a step of disposing the second transparent substrate 115 including the transparent conductive film 125 on the surfaces of the light transmission regions 120 and the electrophoretic elements 140 is performed (FIG. 5F).

Figure 47:
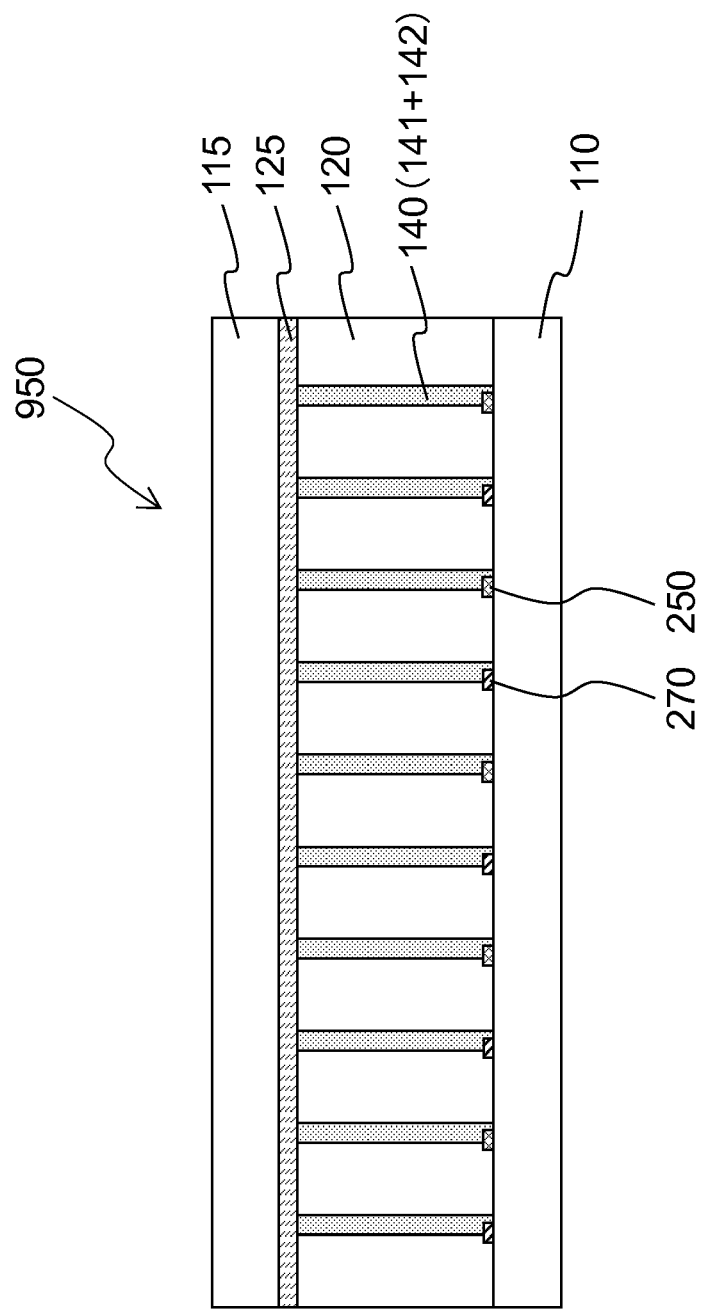
FIG. 47 is a longitudinal sectional view showing a case where the relative positions of the first and second conductive patterns and the light transmission regions are shifted in the optical element of the first exemplary embodiment.

Further, in a case where the position of the mask pattern 161 is shifted from the first conductive patterns 250 and the second conductive patterns 270 at the time of exposing the transparent photosensitive resin layer 150 by using the photomask 160 as described above, formed thereby is an optical element 950 in which a part of the first conductive pattern 250 and a part of the second conductive pattern 270 are disposed to overlap with a part of the light transmission region 120 on a plan view (see FIG. 47).

In this case, it is also possible to perform actions since a part of the first conductive pattern 250 and a part of the second conductive pattern 270 are disposed to be exposed from the light transmission region 120, i.e., a part of the first conductive pattern 250 and a part of the second conductive pattern 270 are disposed to overlap with a part of the light transmission region 120 on a plan view when viewed from the normal direction of the display face of the optical element 950.

Next, the optical element 100 will be described in more details.

As shown in FIG. 1A and FIG. 1B, the optical element 100 includes the first transparent substrate 110. The first transparent substrate 110 is made of glass, PET (Poly Ethylen Terephthalate), PC (Poly Carbonate), PEN (Poly Ethylene Naphthalate), or the like.

The first conductive patterns 250 and the second conductive patterns 270 are formed on the first transparent substrate 110. The first conductive patterns 250 and the second conductive patterns 270 are constituted with a conductive material such as aluminum, chrome, copper, chrome oxide, or carbon nanotube or a transparent conductive material such as ITO, ZnO, IGZO, or a conductive nanowire.

The light transmission region 120 is formed between the first conductive patterns 250 and the second conductive patterns 270 on the first transparent substrate 110.

The electrophoretic element 140 that is a mixture of the electrophoretic particles 141 and the dispersion material 142 is disposed between each of the light transmission regions 120.

The height of the light transmission region 120 is appropriate to be fall within a range of 30 μm to 300 μm, and it is 60 μm in the first exemplary embodiment. The width of the light transmission region 120 is appropriate to be fall within a range of 1 μm to 150 μm, and it is 20 μm in the first exemplary embodiment.

Further, the width of the space between each of the light transmission regions 120 is appropriate to be fall within a range of 0.25 µm to 40 µm, and it is 5 µm in the first exemplary embodiment. Furthermore, the film thickness of the first conductive pattern 250 and the second conductive pattern 270 is appropriate to fall within a range of 10 nm to 1000 nm, and it is 300 nm in the first exemplary embodiment.

Figure 12A:
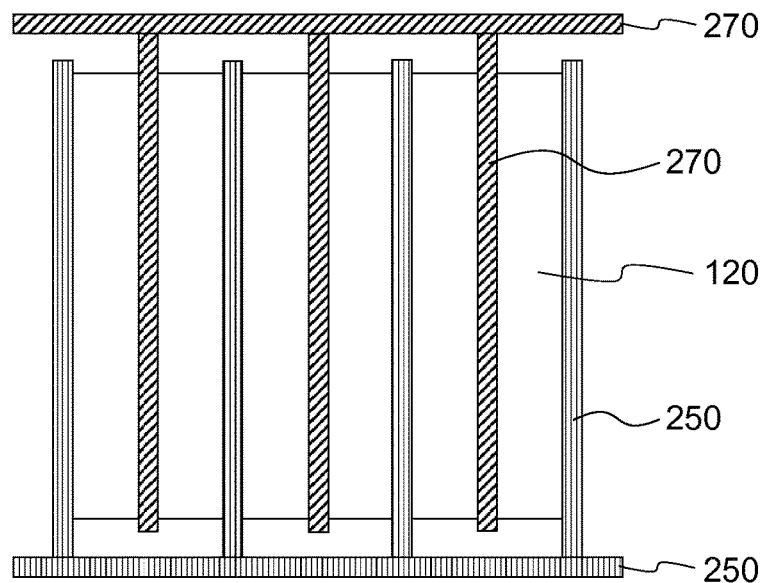
Figure 12B:
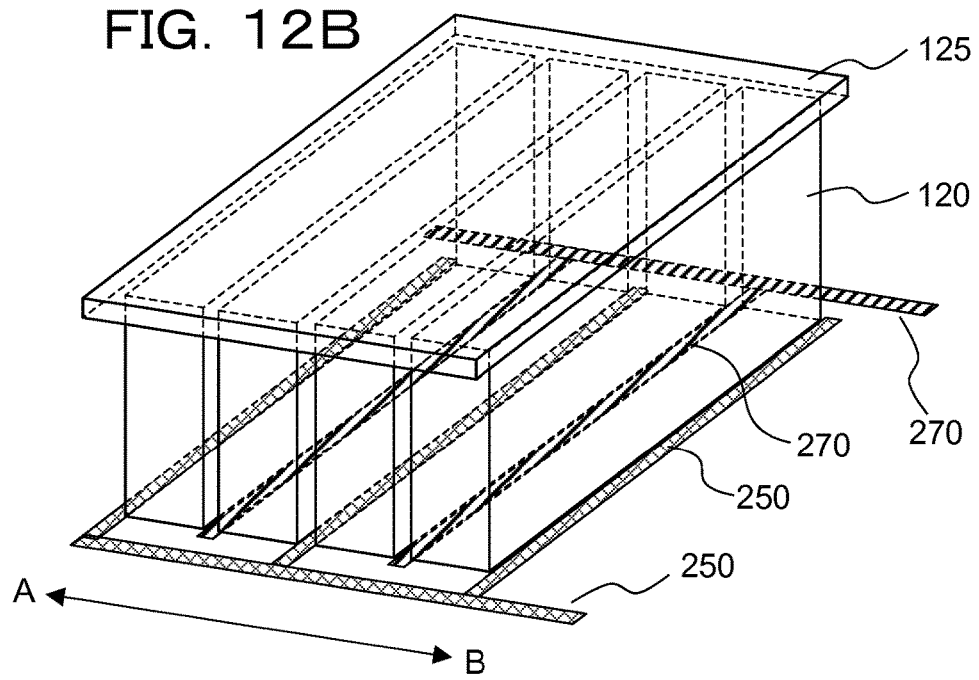

Layout examples of the light transmission regions 120 and the conductive patterns 250, 270 are shown in FIGS. 12A and 12B. The light transmission regions 120 are formed in a stripe form.

Note that the visible angles in the narrow viewing field mode in the A-B direction shown in FIG. 12B is limited to about ±30 degrees.

Figure 52A:
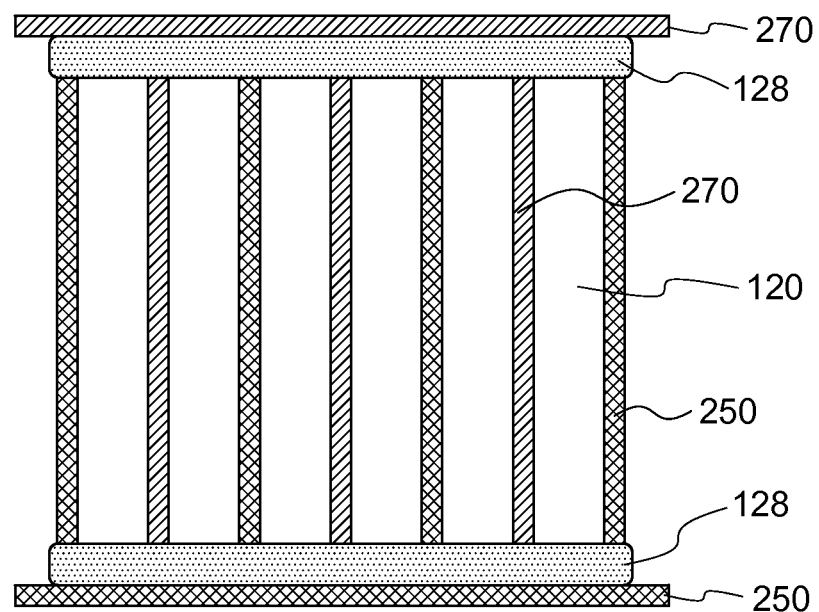
Figure 52B:
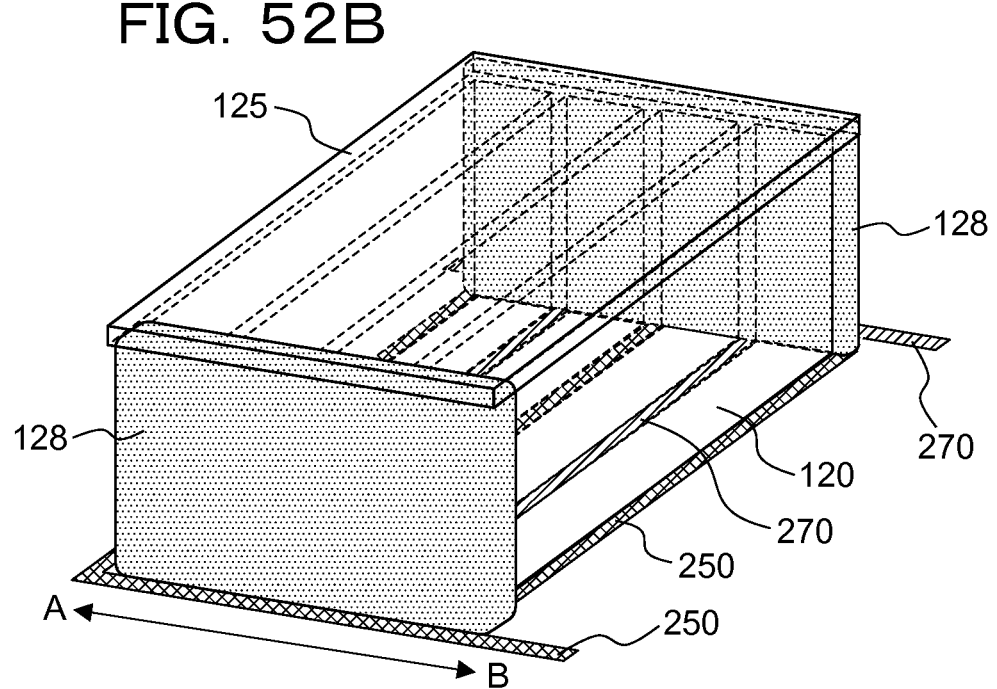
Figure 53:
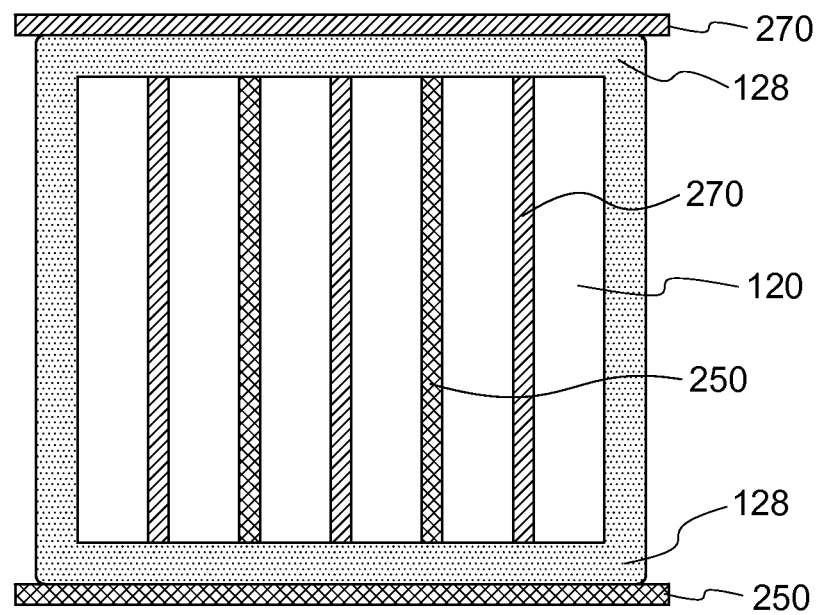
FIG. 53 shows illustrations of a structure where the entire outer circumference of the stripe-form light transmission regions in the optical element of the first exemplary embodiment is sealed by a resin.

Further, in the structure shown in FIGS. 12A and 12B, a resin 128 is disposed to entirely seal the both ends of the spaces between the neighboring stripe-form light transmission regions 120 as shown in FIGS. 52A and 52B. Through entirely sealing the both ends of the spaces between the neighboring stripe-form light transmission regions 120 in this manner, the electrophoretic elements 140 disposed on the first conductive patterns 250 and the second conductive patterns 270 are completely isolated from each other. Thus, when the electrophoretic elements 140 are driven by one of the conductive patterns, direct influences to the electrophoretic elements 140 on the other conductive patterns can be prevented. As shown in FIG. 53, the resin 128 may be disposed not only in the both ends of the stripe-form light transmission regions 120 but in the entire circumference of the light transmission regions 120.

Next, steps of manufacturing the optical element 100 according to the first exemplary embodiment will be described in more details by referring to FIG. 4.

First, the first conductive patterns 250 and the second conductive patterns 270 are formed on the surface of the first transparent substrate 110 that is constituted with glass, PET, PC, or PEN (see FIG. 4A), and the transparent photosensitive resin layer 150 is formed thereon (see FIG. 4B). The first conductive patterns 250 and the second conductive patterns 270 can be formed by using a conductive material such as aluminum, chrome, copper, chrome oxide, or carbon nanotube, or by using a transparent conductive material such as ITO, ZnO, IGZO, or conductive nanowire. In the first exemplary embodiment, ITO is used.

As a method for forming the transparent photosensitive layer 150, it is possible to use any of depositing methods such as slit die coater, wire coater, applicator, dry film transcription, spray application, and screen printing, for example. The thickness of the transparent photosensitive resin layer 150 is preferable to be within a range of 30 µm to 300 µm, and it is 60 µm in the first exemplary embodiment. A transparent photosensitive resin used for the transparent photosensitive resin layer 150 is a chemical amplification type photoresist (product name "SU-8") of Microchem, for example.

Features of the transparent photosensitive resin are as follows.

It is a negative resist of epoxy (specifically bisphenol A novolac glycidyl ether derivative) which polymerizes a curing monomer by using proton acid which is generated by photoinitiator when ultraviolet ray is irradiated.

It exhibits an extremely high transparent characteristic in a visible light region.

The molecule amount of the curing monomer contained in the transparent photosensitive resin before being cured is relatively small, so that it is dissolved extremely easily in a solvent such as cyclopentanon, propylene glycol methyl ether acetate (PEGMEA), gamma butyrolactone (GBL), or methyl isobutyl ketone (MIBK). Thus, it is easy to be formed in a thick film.

The light transmission property thereof is extremely good even for the wavelength of the near ultraviolet region, so that ultraviolet rays can be transmitted even when formed in a thick film.

It is possible to form patterns with a high aspect ratio of 3 or more due to the above-described features.

There are many functional groups in the curing monomer, so that the curing monomer after being cured becomes an extremely high density cross-linkage, which is extremely stable thermally and chemically. As a result, processing after forming the patterns can be done easily.

Needless to mention that the transparent photosensitive resin layer 150 is not limited only to the transparent photosensitive resin (product name "SU-8") but any photocurable materials may be used as long as the materials exhibit the similar characteristics.

Subsequently, the transparent photosensitive resin layer 150 is patterned by using the mask pattern 161 of the photomask 160 (see FIG. 4C). The light 165 used for exposure is parallel light. A UV light source is used for the light source, and UV light with wavelength of 365 nm is irradiated as the exposure light 165. The exposure amount at this time is appropriate to be within a range of 50 mJ/cm$^2$ to 1000 mJ/cm$^2$, and it is 200 mJ/cm$^2$ in the first exemplary embodiment.

Development is performed after the exposure. Then, thermal annealing is performed at 120 degrees for thirty minutes to form the light transmission regions 120 (see FIG. 4D). The refractive index of the light transmission regions 120 formed with SU-8 is 1.5 to 1.6.

Subsequently, the second transparent substrate 115 including the transparent conductive film 125 is formed on the light transmission regions 120 (see FIG. 4E). The second transparent substrate 115 is fixed by tightly fitting the top face of the light transmission regions 120 and the transparent conductive film 125 and by further gluing/sealing the outer circumference part of the first transparent substrate 110 by a resin, not shown. The adhesive used at this time may be of a thermal setting type or a UV curable type.

At last, the electrophoretic elements 140 are filled in the space between the first transparent substrate 110 and the second transparent substrate 115 (see FIG. 4F). The electrophoretic element 140 is a mixture of the electrophoretic particles 141 and the dispersion material 142.

As described above, the orders of performing disposure of the second transparent substrate 115 including the other transparent conductive film 125 shown in FIG. 4E and filling of the electrophoretic elements 140 in the spaces between each of the light transmission regions 120 shown in FIG. 4F may be inverted (see FIG. 5).

FIG. 6 is a sectional view showing still other manufacturing steps of the optical element 100 according to the first exemplary embodiment. Hereinafter, the still other manufacturing steps of the optical element 100 will be described in more details.

First, the transparent conductive film 125 is formed on the surface of the second transparent substrate 115 that is made of glass, PET, PC, or PEN (see FIG. 6A). The transparent photosensitive resin layer 150 is formed thereon (see FIG. 6B).

Subsequently, the transparent photosensitive resin layer 150 is patterned by using the mask pattern 161 of the photomask 160 (see FIG. 6C). Development is performed after the exposure. Then, thermal annealing is performed at 120 degrees for thirty minutes to form the light transmission regions 120 (see FIG. 6D).

Subsequently, the first transparent substrate 110 including the first conductive patterns 250 and the second conductive patterns 270 is disposed on the light transmission regions 120 (see FIG. 6E). At last, the electrophoretic elements 140 are filled in the space between the first transparent substrate 110 and the second transparent substrate 115 (see FIG. 6F). At this time, the position of the transparent substrate 110 is controlled so that at least a part of the conductive patterns 250 and a part of the second conductive patterns 270 are exposed towards the spaces between the light transmission regions 120 from the light transmission regions 120.

The orders of performing disposure of the first transparent substrate 110 including the first and second transparent conductive patterns 250 and 270 shown in FIG. 6E and filling of the electrophoretic elements 140 in the spaces between each of the light transmission regions 120 shown in FIG. 6F may be inverted.

Second Exemplary Embodiment

Figure 13:
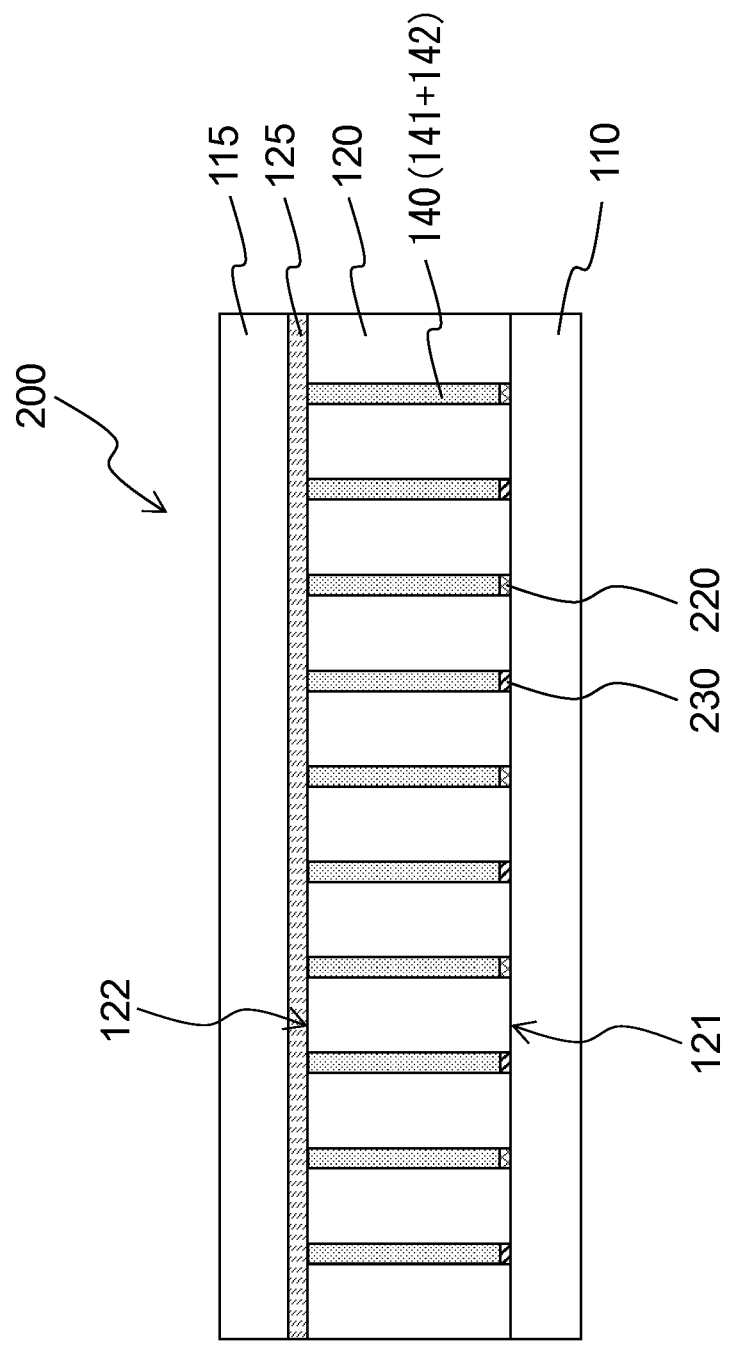
FIG. 13 is a longitudinal sectional view showing an optical element of a second exemplary embodiment in a narrow viewing field mode.

FIG. 13 is a sectional view showing an optical element 200 of a second exemplary embodiment. Hereinafter details of the optical element 200 of the second exemplary embodiment will be described.

As shown in FIG. 13, in the second exemplary embodiment, first conductive light-shielding patterns 220 and second conductive light-shielding patterns 230 are disposed on the surface of the first transparent substrate 110. The film thickness of the first conductive light-shielding patterns 220 and the second conductive light-shielding patterns 230 is preferable to be within a range of 10 nm to 1000 nm, and it is 300 nm in the second exemplary embodiment. As the structural material of the first conductive light-shielding patterns 220 and second conductive light-shielding patterns 230, aluminum, chrome, copper, chrome oxide, carbon nanotube, or the like may be used. In the second exemplary embodiment, aluminum is used.

Figure 14:
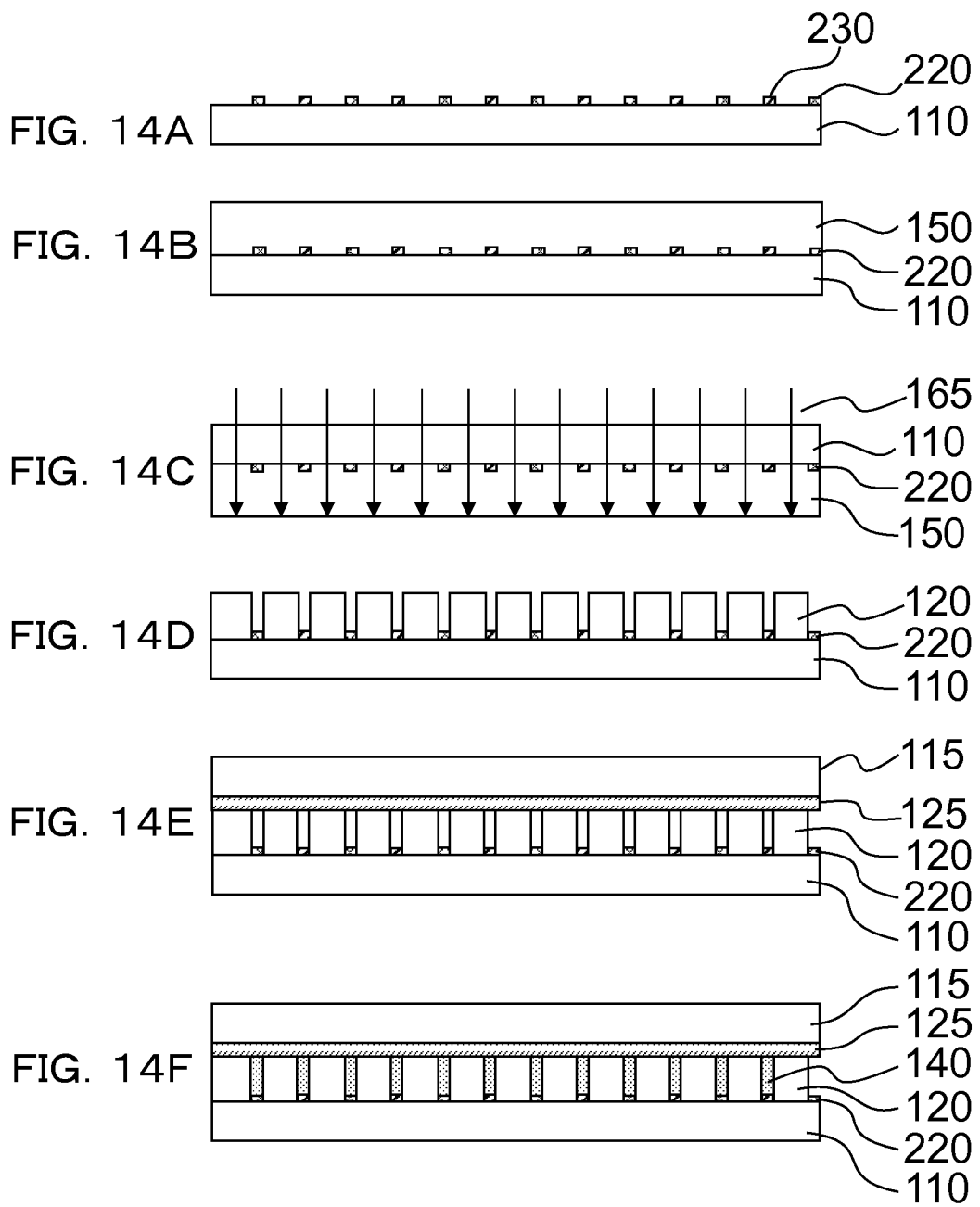

A method for forming the light transmission regions 120 in the second exemplary embodiment is different from that of the first exemplary embodiment. FIG. 14 is a sectional view showing a manufacturing method of the optical element 200 according to the second exemplary embodiment. First, the first conductive patterns 220 and the second conductive patterns 230 are formed on the surface of the first transparent substrate 110 that is constituted with glass, PET, PC, or PEN (see FIG. 14A), and the transparent photosensitive resin layer 150 is formed thereon (see FIG. 14B). Then, patterning of the transparent photosensitive resin layer 150 is performed by irradiating the exposure light 165 from the back face side of the first transparent substrate 110 by using the first conductive light-shielding patterns 220 and the second conductive light-shielding patterns 230 as the photomask (see FIG. 14C). The exposure amount at this time is appropriate to be within a range of 100 mJ/cm$^2$ to 1000 mJ/cm$^2$, and it is 200 mJ/cm$^2$ in the second exemplary embodiment.

Through forming the pattern of the transparent photosensitive resin layer 150 by using the first conductive light-shielding patterns 220 and the second conductive light-shielding patterns 230 as the photomask, it is possible to acquire such effect that the relative positions of the light transmission regions 120 and the first conductive light-shielding patterns 220 as well as the second conductive light-shielding patterns 230 come to be in a mutually complementary relation naturally. As a result, it is possible to secure a state where the first conductive light-shielding patterns 220 and the second conductive light-shielding patterns 230 are completely exposed from the light transmission regions 120 towards the spaces between the light transmission regions 120.

Other structures, operations, and effect of the second exemplary embodiment are the same as those described in the first exemplary embodiment.

Third Exemplary Embodiment

FIGS. 7A-7C show longitudinal sectional views of an optical element 300 according to a third exemplary embodiment, in which FIG. 7A is a longitudinal sectional view showing a state of the optical element 300 in a narrow viewing field mode, FIG. 7B is a longitudinal sectional view showing a state of the optical element 300 in an intermediate mode, and FIG. 7C is a longitudinal sectional view showing a state of the optical element 300 in a wide viewing field mode. In FIGS. 7A, 7B, and 7C, same reference numerals as those of FIGS. 1A, 2A, and 3A are applied to the elements same as those of FIGS. 1A, 2A, and 3A. Hereinafter, details of the optical element 300 according to the third exemplary embodiment will be described.

As shown in FIGS. 7A, 7B, and 7C, in the third exemplary embodiment, a protection cover film 130 is disposed between the first transparent substrate 110 on which the first conductive patterns 250 and the second conductive patterns 270 are disposed and the light transmission regions 120. The film thickness of the protection cover film 130 is appropriate to fall within a range of 10 nm to 1000 nm, and it is 300 nm in the third exemplary embodiment. As the structural material used for the protection cover film 130 may be a silicon oxide film, a silicon nitride film, a silicon oxynitride film, or the like, and used in the third exemplary embodiment is a silicon oxide film. Further, while the protection cover film 130 is formed on the entire surface of the first transparent substrate 110 where the first conductive patterns 250 and the second conductive patterns 270 are disposed in FIGS. 7A, 7B, and 7C, it is not essential. It is simply required to cover the surfaces of the first conductive patterns 250 and the second conductive patterns 270. With the above-described structure, contact between the first conductive patterns 250 as well as the second conductive patterns 270 and the electrophoretic elements 140 can be prevented since the first conductive patterns 250 and the second conductive patterns 270 are covered by the protection cover film 130. Thus, deterioration or the like in the operation does that may be cause by attachment of the electrophoretic elements 140 to the conductive patterns 250 and the second conductive patterns 270 does not occur, so that a visible range control with a fine operation stability can be achieved. Further, as the environment for keeping the electrophoretic elements 140, the air-tightness can be improved by adding the protection cover film to the structure of the first exemplary embodiment. This makes it possible to achieve the optical element 300 with fine reliability.

Other structures, operations, and effect of the third exemplary embodiment are the same as those described in the first and second exemplary embodiments.

Fourth Exemplary Embodiment

Figure 8B:
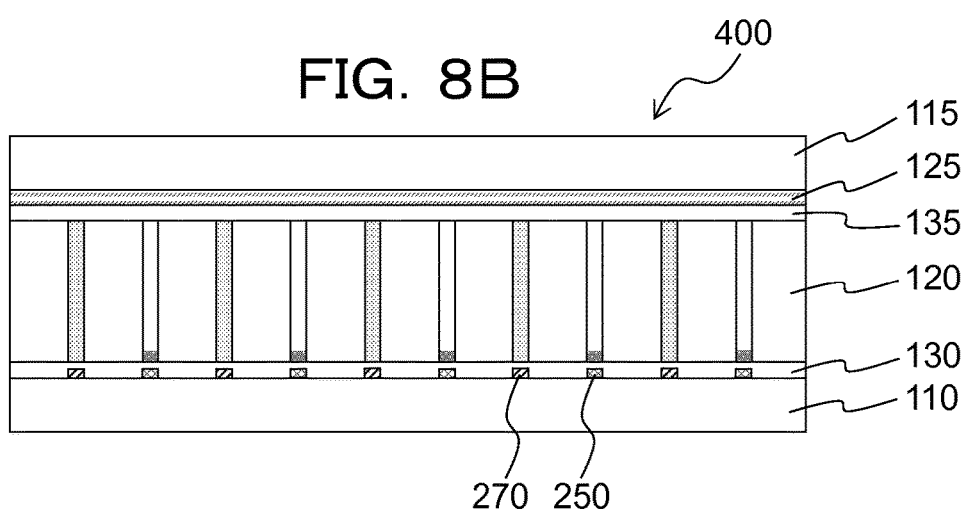
Figure 8C:
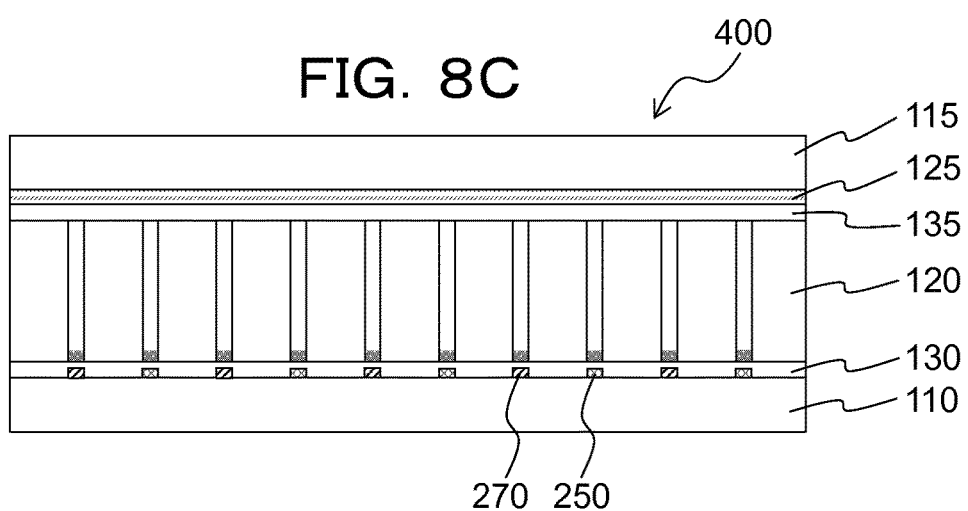

FIGS. 8A-8C show longitudinal sectional views of an optical element 400 according to a fourth exemplary embodiment, in which FIG. 8A is a longitudinal sectional view showing a state of the optical element 400 in a narrow viewing field mode, FIG. 8B is a longitudinal sectional view showing a state of the optical element 400 in an intermediate mode, and FIG. 8C is a longitudinal sectional view showing a state of the optical element 400 in a wide viewing field mode. In FIGS. 8A, 8B, and 8C, same reference numerals as those of FIG. 1A, FIG. 2A, and FIG. 3A are applied to the elements that are same as those in FIG. 1A, FIG. 2A, and FIG. 3A. Hereinafter, details of the optical element 400 according to the fourth exemplary embodiment will be described.

As shown in FIGS. 8A, 8B, and 8C, in the fourth exemplary embodiment, the first conductive patterns 250, the second conductive patterns 270, the protection cover film 130, and the light transmission regions 120 are formed on the first transparent substrate 110 as in the case of the third exemplary embodiment, and a second transparent substrate 115 including a second protection cover film 135 stacked on the surface of the transparent conductive film 125 is disposed on the top face of the light transmission regions 120.

The film thickness of the second protection cover film 135 is appropriate to fall within a range of 10 nm to 1000 nm, and it is 300 nm in the fourth exemplary embodiment. As the structural material used for the second protection cover film 135 may be a silicon oxide film, a silicon nitride film, a silicon oxynitride film, or the like, and used in the fourth exemplary embodiment is a silicon oxide film. Further, while the second protection cover film 135 is also formed between the transparent conductive film 125 and the light transmission regions 120 in FIGS. 8A, 8B, and 8C, it is not essential. It is simply required to cover the region of the transparent conductive film 125 not in contact with the light transmission regions 120.

With the above-described structure, contact between the transparent conductive film 125 and the electrophoretic elements 140 can be prevented. Thus, attachment and the like of the electrophoretic elements 140 to the transparent conductive film 125 do not occur, so that a visible range control with a fine operation stability can be achieved. Further, as the environment for keeping the electrophoretic elements 140, the air-tightness can be improved further by adding the second protection cover film 135 to the structure of the third exemplary embodiment. This makes it possible to achieve the optical element 400 with fine reliability.

Other structures, operations, and effect of the fourth exemplary embodiment are the same as those described in the first, second, and third exemplary embodiments.

Fifth Exemplary Embodiment

Figure 15:
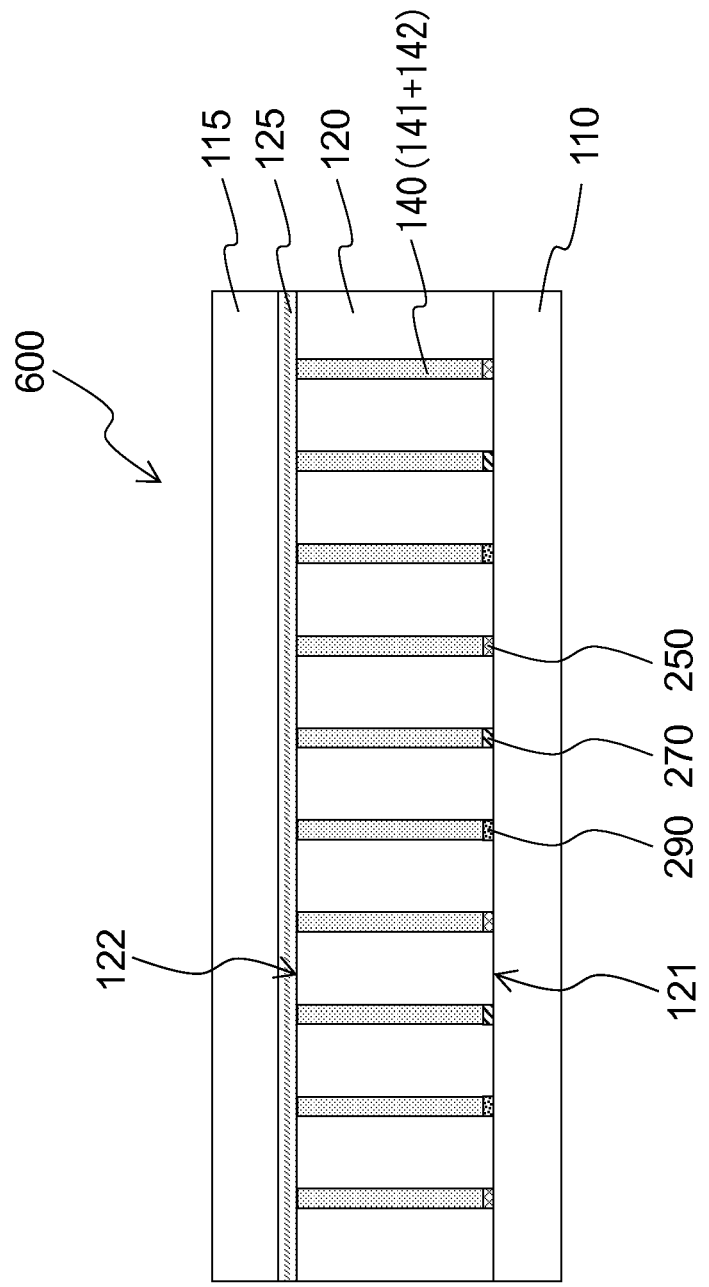
FIG. 15 is a longitudinal sectional view showing an optical element of a fifth exemplary embodiment in a narrow viewing field mode.
Figure 16:
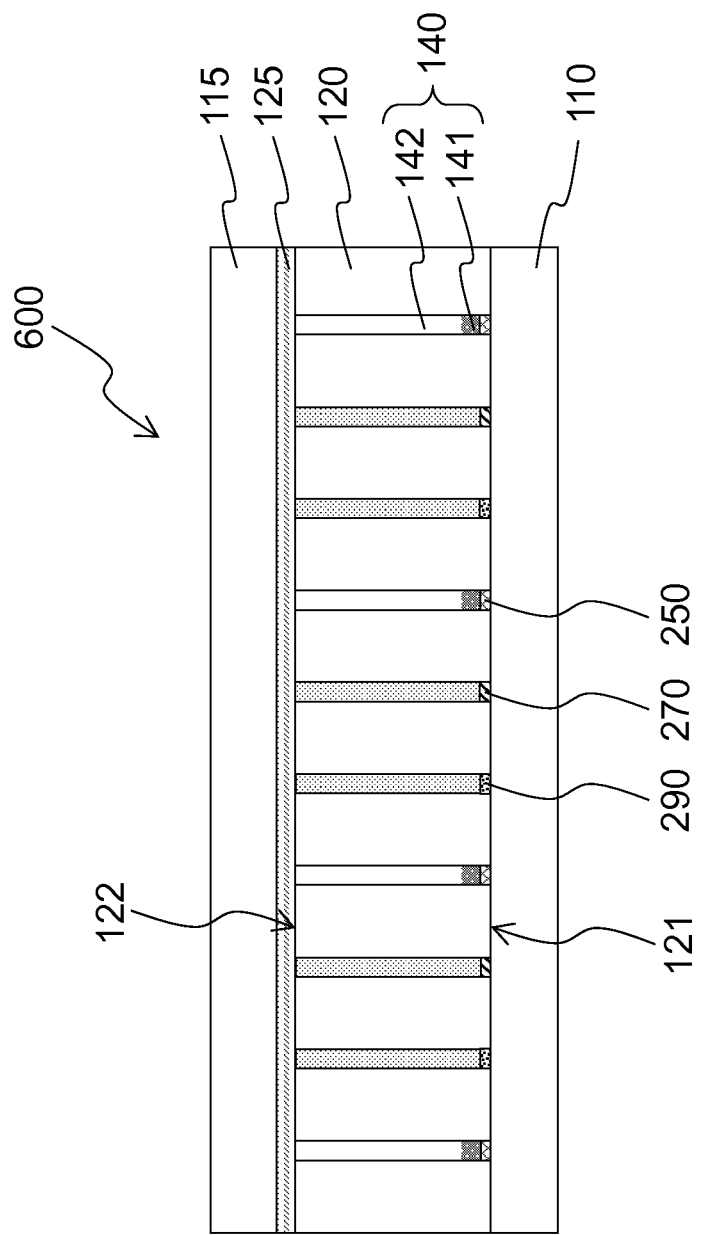
FIG. 16 is a longitudinal sectional view showing the optical element of the fifth exemplary embodiment in a first intermediate mode.
Figure 17:
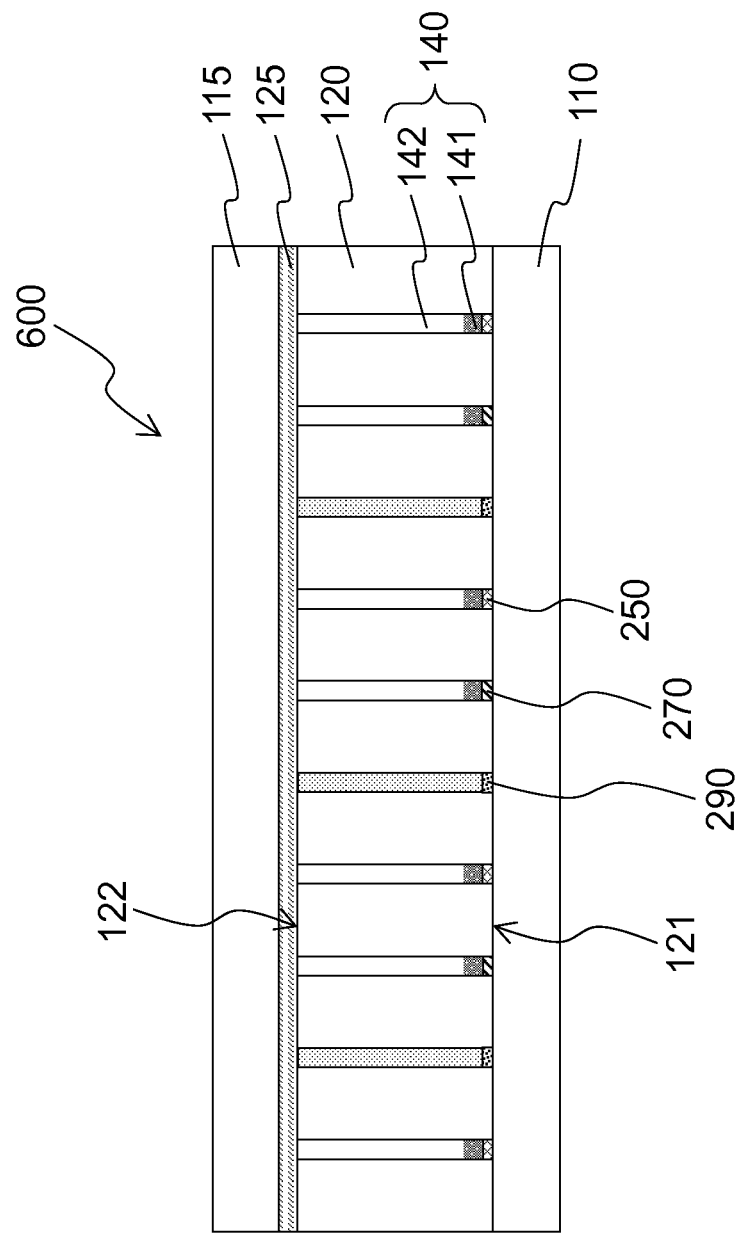
FIG. 17 is a longitudinal sectional view showing the optical element of the fifth exemplary embodiment in a second intermediate mode.
Figure 18:
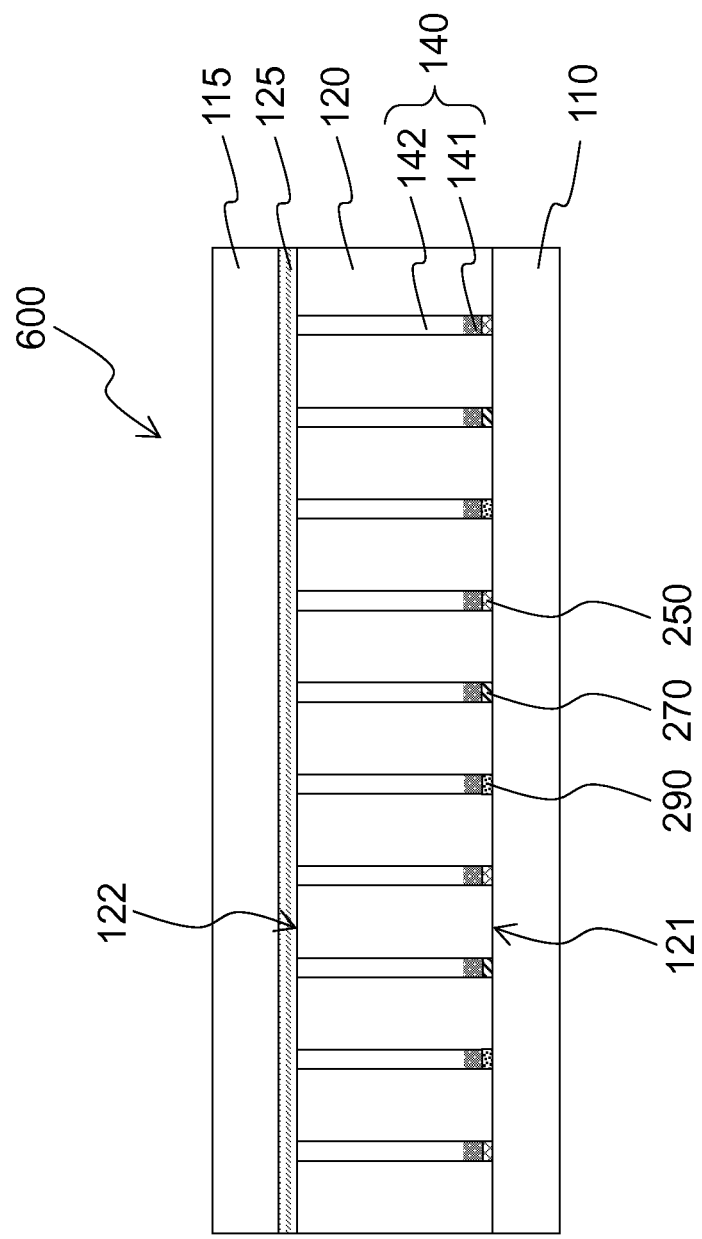
FIG. 18 is a longitudinal sectional view showing the optical element of the fifth exemplary embodiment in a wide viewing field mode.
Figure 23A:
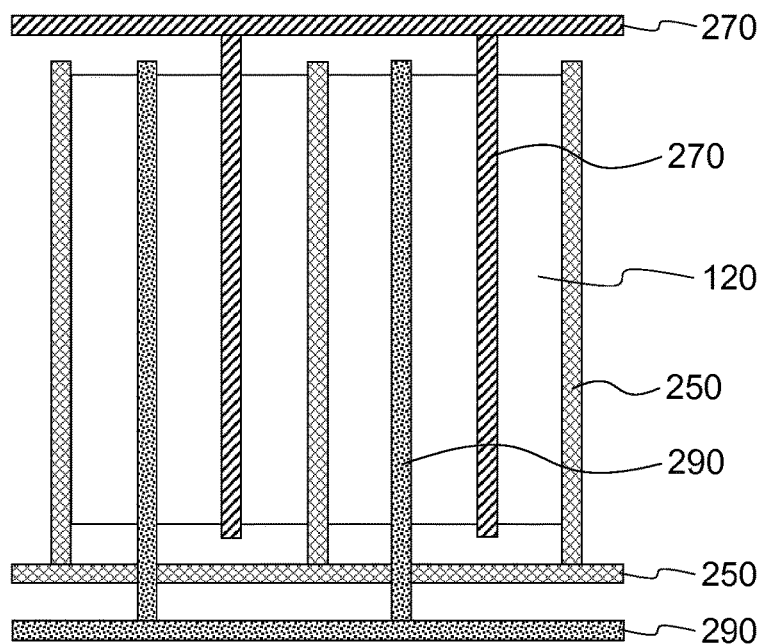
Figure 23B:
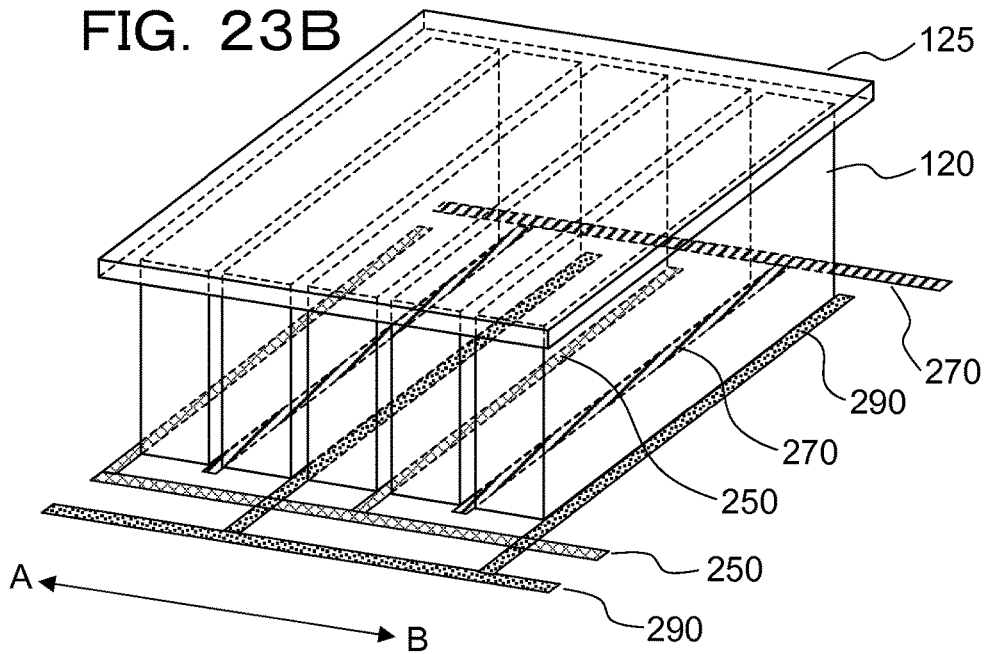

FIG. 15 to FIG. 18 are illustrations showing an optical element 600 of a fifth exemplary embodiment. FIG. 15 is a longitudinal sectional view showing a state of the optical element 600 in a narrow viewing field mode, FIG. 16 is a longitudinal sectional view showing a state of the optical element 600 in a first intermediate mode, FIG. 17 is a longitudinal sectional view showing a state of the optical element 600 in a second intermediate mode, and FIG. 18 is a longitudinal sectional view showing a state of the optical element 600 in a wide viewing field mode. Further, FIGS. 23A and 23B show positional relations of the light transmission regions 120, the first conductive patterns 250, the second conductive patterns 270, and third conductive patterns 290 of the optical element 600 of the fifth exemplary embodiment, in which FIG. 23A is a plan view thereof and FIG. 23B is a perspective view thereof. In FIG. 15 to FIG. 18 and FIGS. 23A, 23B, same reference numerals as those of FIG. 1A, FIG. 2A, FIG. 3A and FIGS. 12A, 12B are applied to the elements that are same as those in FIG. 1A, FIG. 2A, FIG. 3A and FIGS. 12A, 12B. Hereinafter, details of the optical element 600 according to the fifth exemplary embodiment will be described.

The optical element 600 of the fifth exemplary embodiment includes: the first transparent substrate 110; the second transparent substrate 115 provided by opposing to the first transparent substrate 110; the first conductive patterns 250, the second conductive patterns 270, and the third conductive patterns 290 disposed on a face of the first transparent substrate 110 opposing to the second transparent substrate 115; the light transmission regions 120 disposed individually between the first conductive pattern 250, the second conductive pattern 270, and the third conductive patterns 290 to reach the surface of the second transparent substrate 115 from the surface of the first transparent substrate 110, the pattern thereof transversely crossing the element region; the transparent conductive film 125 disposed on the face of the second transparent substrate 115 opposing to the first transparent substrate 110; and the electrophoretic element 140 disposed between the neighboring light transmission regions 120, which is a mixture of the light-shielding electrophoretic particles 141 of a specific electric charge and the transmissive dispersion material 142.

More specifically, the optical element 600 of the fifth exemplary embodiment includes: the first transparent substrate 110; the second transparent substrate 115 provided by opposing to the first transparent substrate 110 with a space provided therebetween; the first conductive patterns 250, the second conductive patterns 270, and the third conductive patterns 290 which are disposed in parallel and repeatedly with a specific interval in an orderly manner on the face of the first transparent substrate 110 opposing to the second transparent substrate 115 to transversely cross the element regions; the light transmission regions 120 disposed between the first conductive pattern 250 and the second conductive pattern 270, between the second conductive pattern 270 and the third conductive pattern 290, and between the third conductive pattern 290 and the first conductive pattern 250 to reach the surface of the second transparent substrate 115 from the surface of the first transparent substrate 110 to transversely cross the element region; the transparent conductive film 125 disposed over the entire region of the face of the second transparent substrate 115 opposing to the first transparent substrate 110; and the electrophoretic elements 140 disposed between the neighboring light transmission regions 120, which is a mixture of the light-shielding electrophoretic particles 141 of a specific electric charge and the transmissive dispersion material 142.

Figure 19A:
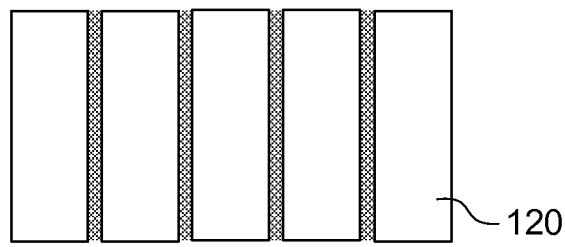
Figure 19B:
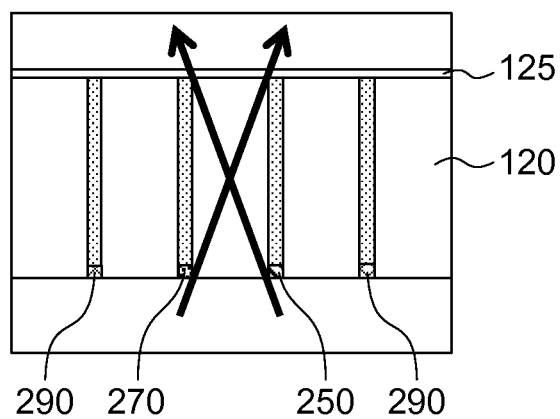
Figure 19C:
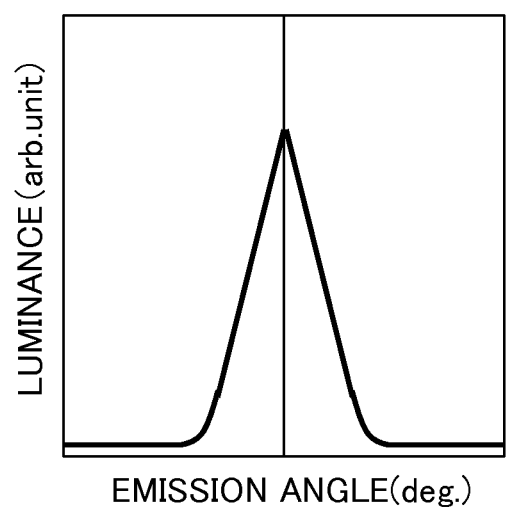
Figure 48A:
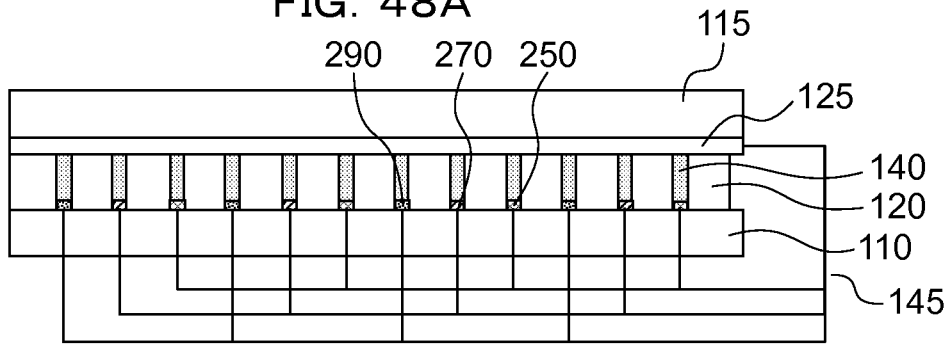

The narrow viewing field mode shown in FIG. 15 is achieved by dispersing electrophoretic particles 141 in the electrophoretic elements 140 disposed in the spaces between each of the light transmission regions 120 uniformly within the dispersion material 142 by setting the first conductive patterns 250, the second conductive patterns 270, the third conductive patterns 290, and the transparent conductive film 125 to be in a same potential, respectively, by operating a voltage apply control module 145 (see FIG. 48A). In the narrow viewing field mode, as shown in FIGS. 19A and 19B, the electrophoretic particles 141 are dispersed uniformly within the dispersing material 142 in all the spaces between the transparent conductive film 125 and the first conductive patterns 250, between the transparent conductive film 125 and the second conductive patterns 270, and between the transparent conductive film 125 and the third conductive patterns 290, so that the spaces between the neighboring light transmission regions 120 are all shielded from light. Thus, as shown in FIGS. 19B and 19C, the narrowest visible range can be achieved.

Figure 20A:
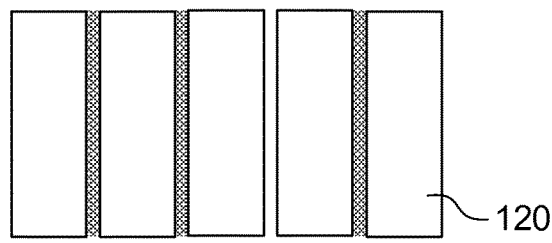
Figure 20B:
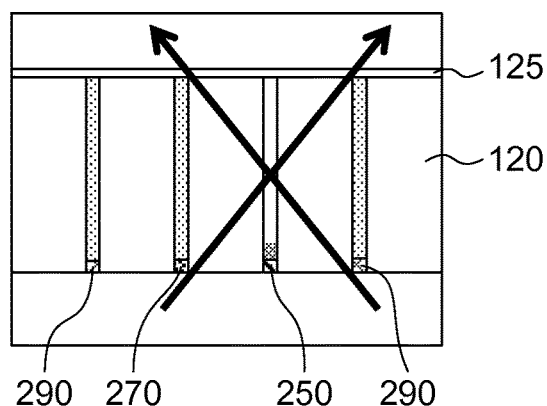
Figure 20C:
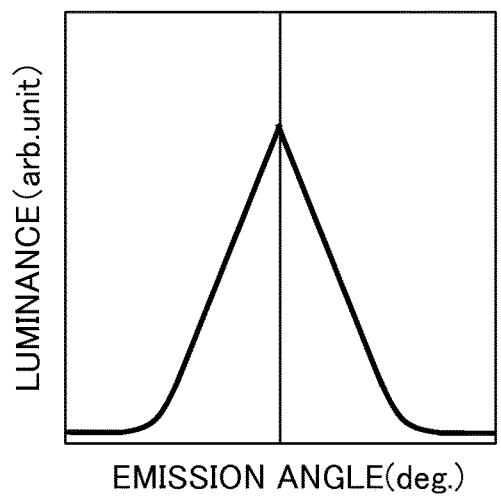

In the meantime, the first intermediate mode shown in FIG. 16 is achieved by setting the relative potential of the transparent conductive film 125 with respect to the first conductive patterns 250 to be in a same polarity as that of the surface charge of the electrophoretic particles 141 (see FIG. 48B) to cohere only the electrophoretic particles 141 between the transparent conductive film 125 and the first conductive patterns 250 in the vicinity of the surface of the first conductive patterns 250 by operating the voltage apply control module 145. At this time, the second conductive patterns 270 as well as the third conductive patterns 290 and the transparent conductive film 125 are in a same potential (see FIG. 48B). Between the transparent conductive film 125 and the second conductive patterns 270 and between the transparent conductive film 125 and the third conductive patterns 290, as shown in FIGS. 20A and 20B, the electrophoretic particles 141 are dispersed within the dispersing material 142 uniformly. Thus, light can transmit through the electrophoretic element 140 obliquely in a proportion of 1 column out of 3 columns in a space between the neighboring light transmission regions 120. Therefore, as shown in FIGS. 20B and 20C, a wider visible range than the narrow viewing field mode can be achieved.

Figure 21A:
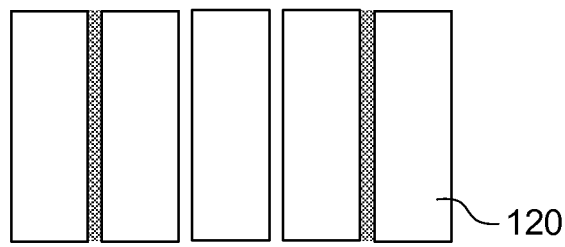
Figure 21B:
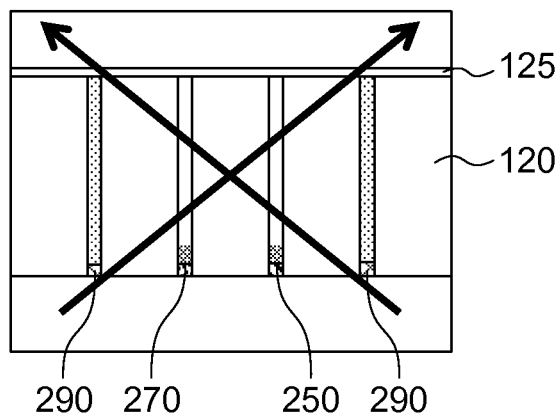
Figure 21C:
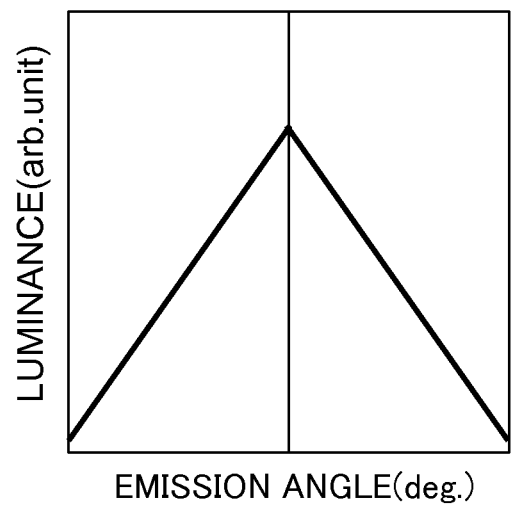

Further, the second intermediate mode shown in FIG. 17 is achieved by setting the first conductive patterns 250 and the second conductive patterns 270 to be in a same potential and setting the relative potential of the transparent conductive film 125 with respect to the first conductive patterns 250 and the second conductive patterns 270 to be in a same polarity as that of the surface charge of the electrophoretic particles 141 (see FIG. 48C) to cohere the electrophoretic particles 141 between the transparent conductive film 125 and the first conductive patterns 250 in the vicinity of the surface of the first conductive patterns 250 by operating the voltage apply control module 145 and to cohere the electrophoretic particles 141 between the transparent conductive film 125 and the second conductive patterns 270 in the vicinity of the surface of the second conductive patterns 270. At this time, the third conductive patterns 290 and the transparent conductive film 125 are in a same potential (see FIG. 48C). Between the transparent conductive film 125 and the third conductive patterns 290, as shown in FIGS. 21A and 21B, the electrophoretic particles 141 in the electrophoretic element 140 are dispersed within the dispersing material 142 uniformly. Thus, light can transmit through the electrophoretic element 140 obliquely in a proportion of 2 columns out of 3 columns in a space between the neighboring light transmission regions 120. Therefore, as shown on FIGS. 21B and 21C, a still wider visible range than the first intermediate mode can be achieved.

Figure 22A:
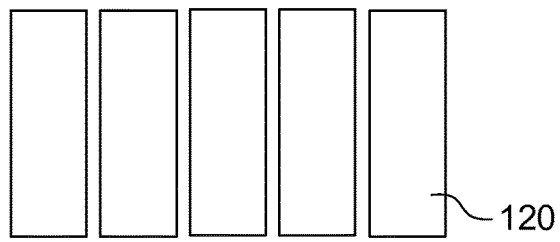
Figure 22B:
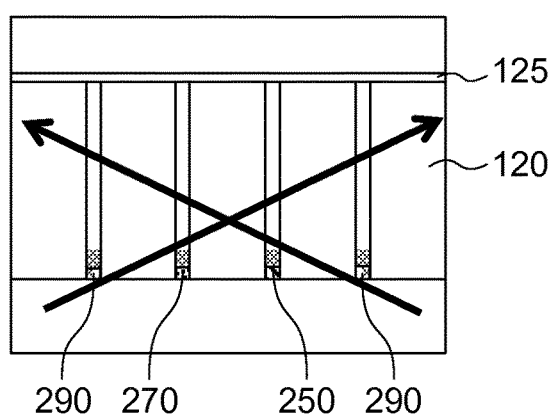
Figure 22C:
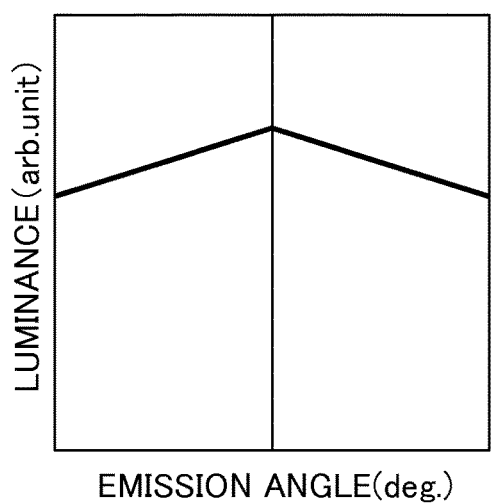

Further, the wide viewing field mode shown in FIG. 18 is achieved by setting the first conductive patterns 250 and the second conductive patterns 270 to be in a same potential and setting the relative potential of the transparent conductive film 125 with respect to the first conductive patterns 250, the second conductive patterns 270, and the third conductive pattern 290 to be in a same polarity as that of the surface charge of the electrophoretic particles 141 (see FIG. 48D) to cohere the electrophoretic particles 141 between the transparent conductive film 125 and the first conductive patterns 250 in the vicinity of the surface of the first conductive patterns 250 by operating the voltage apply control module 145, to cohere the electrophoretic particles 141 between the transparent conductive film 125 and the second conductive patterns 270 in the vicinity of the surface of the second conductive patterns 270, and to cohere the electrophoretic particles 141 between the transparent conductive film 125 and the third conductive patterns 290 in the vicinity of the surface of the third conductive patterns 290 (see FIGS. 22A, 22B). In the wide viewing field mode, light can transmit in the oblique directions in all the spaces between the neighboring light transmission regions 120. Therefore, as shown on FIGS. 22B and 22C, a still wider visible range than the second intermediate mode can be achieved.

As described, display of the narrow viewing field mode, the intermediate mode, and the wide viewing field mode can be achieved through controlling the potentials of the first conductive patterns 250, the second conductive patterns 270, the third conductive patterns 290, and the transparent conductive film 125 by the voltage apply control module 145 shown in FIGS. 48A, 48B, 48C, and 48D. The voltage apply control module 145 is a means for changing the polarities of each of the first conductive patterns 250, the second conductive patterns 270, the third conductive patterns 290, and the transparent conductive film 125 by adjusting the voltages to be applied to the first conductive patterns 250, the second conductive patterns 270, the third conductive patterns 290, and the transparent conductive film 125 according to signals from outside.

As described above, unlike the related art shown in FIG. 40A and FIG. 43A, in the optical element 600 of the fifth exemplary embodiment, such well-known technical spirit that the electrophoretic particles 141 are retained in the section from the intermediate point between the transparent conductive film 123 and the transparent conductive film 125 to the transparent conductive film 123, i.e., the technical spirit assuming that the intermediate mode is achieved by changing the height of the light shielding module (the part of the dispersing material 142 where the electrophoretic particles 141 are dispersed) for shielding the section between the neighboring light transmission regions 120, is revised.

Either a state where the electrophoretic particles 141 between the first conductive pattern 250 and the transparent conductive film 125 are completely dispersed between the first conductive pattern 250 and the transparent conductive film 125, i.e., a state where the light transmission regions 120 sandwiching the first conductive pattern 250 are light-shielded by the light shielding module (the electrophoretic particles 141 disposed over the entire region of the dispersing material 142) or a state where the electrophoretic particles 141 existing between the first conductive pattern 250 and the transparent conductive film 125 are cohered in the vicinity of the first conductive patterns 250, i.e., a state where the light shielding module between the light transmission regions 120 sandwiching the first conductive pattern 250 is eliminated, is selected.

In the meantime, either a state where the electrophoretic particles 141 between the second conductive pattern 270 and the transparent conductive film 125 are completely dispersed between the second conductive pattern 270 and the transparent conductive film 125, i.e., a state where the light transmission regions 120 sandwiching the second conductive pattern 270 are light-shielded by the light shielding module (the electrophoretic particles 141 disposed over the entire region of the dispersing material 142) or a state where the electrophoretic particles 141 existing between the second conductive pattern 270 and the transparent conductive film 125 are cohered in the vicinity of the second conductive patterns 270, i.e., a state where the light shielding module between the light transmission regions 120 sandwiching the second conductive pattern 270 is eliminated, is selected.

Further, either a state where the electrophoretic particles 141 between the third conductive pattern 290 and the transparent conductive film 125 are completely dispersed between the third conductive pattern 290 and the transparent conductive film 125, i.e., a state where the light transmission regions 120 sandwiching the third conductive pattern 290 are light-shielded by the light shielding module (the electrophoretic particles 141 disposed over the entire region of the dispersing material 142) or a state where the electrophoretic particles 141 existing between the third conductive pattern 290 and the transparent conductive film 125 are cohered in the vicinity of the third conductive patterns 290, i.e., a state where the light shielding module between the light transmission regions 120 sandwiching the third conductive pattern 290 is eliminated, is selected.

The embodiment is structured to adjust the angles of the light that can pass through the optical element 600 obliquely by changing the interval of existence of the light shielding module (the electrophoretic particles 141 disposed over the entire region of the dispersing material 142) for sectioning and light-shielding a series of the light transmission regions 120 through changing combination modes of the three sets of selecting states. Thus, in addition to the narrow viewing field mode and the wide viewing field mode, it is especially possible to stably maintain the first intermediate mode and the second intermediate regardless of the time passage.

It is because there is no change in the state due to dispersion of the electrophoretic particles 141 even when the time passes.

In short, it is possible to operate the electrophoretic particles 141 for each of the conductive patterns 250, 270, and 290 by independently controlling the first conductive pattern 250, the second conductive patterns 270, and the third conductive patterns 290 which are plural-type conductive patterns disposed on the first transparent substrate 110. Thus, the angles of the light that can pass through the optical element 600 obliquely can be adjusted by variously changing the interval of existence of the light shielding module (the electrophoretic particles 141 disposed over the entire region of the dispersing material 142) for sectioning and light-shielding a series of the light transmission regions 120 without dispersing the electrophoretic particles 141 in a halfway state. Therefore, in addition to the narrow viewing field mode and the wide viewing field mode, it is especially possible to stably maintain the intermediate mode that achieve the intermediate characteristic of the both modes, i.e., the first intermediate mode and the second intermediate mode in this case, regardless of the time passage.

Other structures, operations, and effect of the fifth exemplary embodiment are the same as those described in the first exemplary embodiment.

Further, it is also possible to employ an optical element 700 in which the protection cover film 130 is formed on the first conductive patterns 250, the second conductive patterns 270, and the third conductive patterns 290 as shown in FIG. 24 to FIG. 27. Furthermore, it is also possible to employ an optical element 800 in which the second protection cover film 135 is formed on the surface of the transparent conductive film 125 as shown in FIG. 28 to FIG. 31. Operations and effects thereof are as described in the third exemplary embodiment and the fourth exemplary embodiment, respectively.

Sixth Exemplary Embodiment

Figure 54A:
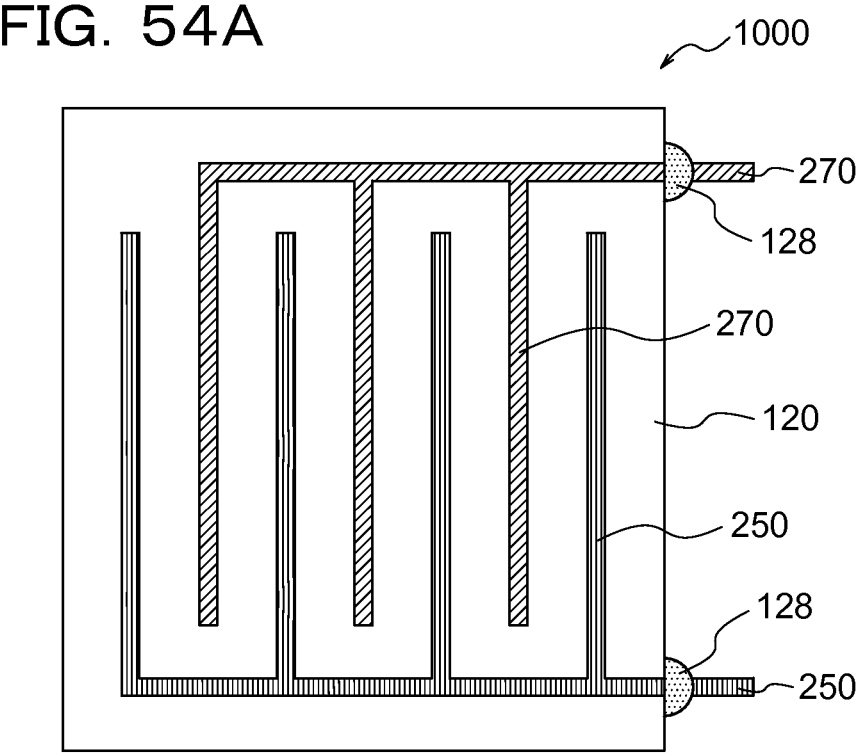
Figure 54B:
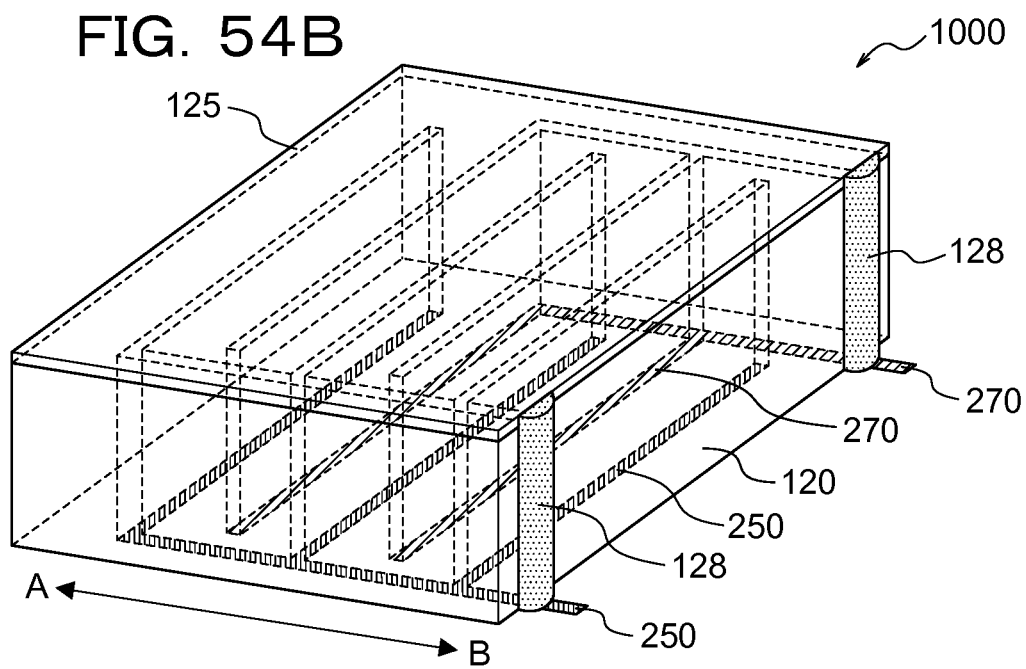

FIGS. 54A and 54B are illustrations showing an optical element 1000 of a sixth exemplary embodiment. FIG. 54A is a plan view showing the positional relation of the light transmission regions 120, the first conductive patterns 250, the second conductive patterns 270, and the resin 128 of the optical element 1000, and FIG. 54B is a perspective view of the optical element 1000. The light transmission regions 120 are constituted with a single pattern, and the first conductive patterns 250 and the second conductive patterns 270 are separated by the light transmission regions 120. Thus, the resin 128 may simply be formed in the taken-out sections of the first conductive patterns 250 and the second conductive patterns 270, so that the use amount of the resin 128 can be decreased.

Other Exemplary Embodiments

The optical elements of the present invention described above can be applied not only to a liquid crystal display device but also to other display devices including a display face (display panel) for displaying videos, e.g., display devices including a display such as an organic EL display, an inorganic EL display, an LED display, a plasma display, a field emission display (FED), a cathode-ray tube, a fluorescent display tube, or the like.

Further, as the modes for using the optical elements of the present invention, there may be various modes such as a mode in which the optical element is used by being directly pasted on the surface of a display panel, a mode in which the optical element is loaded inside a display device, and the like.

Hereinafter, structural examples of each of the use modes will be described in a specific manner. Note that explanations will be provided by referring to a case of using the optical element 100 of the first exemplary embodiment as the optical element.

First, a display device including the optical element of the present invention loaded inside thereof will be described.

FIG. 36 shows a structural example of a display device 1400 which includes the optical element of the present invention loaded inside thereof. The display device 1400 is constituted with: an optical control element 1800 functioning as a display; a lighting optical device 1700 functioning as a backlight for lighting the optical control element 1800; and an optical element 1100 provided between the optical control element 1800 and the lighting optical device 1700.

As described in the first exemplary embodiment, the optical element 1100 is a microlouver which can achieve the narrow viewing field mode, the intermediate mode, and the wide viewing field mode. The lighting optical device 1700 is constituted with: a light source 1021 typically a cold cathode-ray tube shown in FIG. 36; a reflection sheet 1022; a light guiding plate 1023; a diffusing plate 1024; a prism sheet 1025a; and a prism sheet 1025b. The light transmitted through the prism sheets 1025a and 1025b is irradiated to the optical control element 1800 via the optical element 1100.

The light guiding plate 1023 is formed with an acryl resin or the like, and it is structured in such a manner that light from the light source 1021 makes incident on one end face and the incident light propagates within the light guiding plate and exits uniformly from the surface (a prescribed side face) side. On the back face side of the light guiding plate 1023, the reflection sheet 1022 which reflects the light emitted from the back face towards the surface direction is provided. Although not shown, a reflection module is also provided to the other end face and the side face of the light guiding plate 1023.

The light emitted from the surface of the light guiding plate 1023 makes incident on the optical control element

1800 via the diffusing plate 1024 and the prism sheets 1025a, 1025b. The diffusing plate 1024 is for diffusing the light that makes incident from the light guiding plate 1023. The luminance of the emitted light varies between the left and right ends of the light guiding plate 1023 because of its structure. Therefore, the light from the light guiding plate 1023 is diffused by the diffusing plate 1024.

The prism sheets 1025a and 1025b improve the luminance of the light that makes incident from the light guiding plate 1023 via the diffusing plate 1024. The prism sheet 1025a is constituted with a plurality of prisms that are disposed in a prescribed direction at a prescribed period. The prism sheet 1025b is in a same structure. However, the orderly layout direction of the prisms thereof is designed to cross with the orderly layout direction of the prisms of the prism sheet 1025a. By the prism sheets 1025a and 1025b, the directivity of the light diffused by the diffusing plate 1024 can be increased.

While the cold cathode-ray tube is used as the light source for describing the exemplary embodiment shown in FIG. 36, the light source is not limited only to that. A white LED, a tricolor LED, or the like may also be used as the light source. Further, while a side-light type light source is used for describing the exemplary embodiment, the light source is not limited only to that. A direct type light source may be used as well.

The optical control element 1800 has a structure in which a liquid crystal layer 1032 is clamped by two substrates 1030a and 1030b. The substrate 1030a includes a color filter 1033 formed on one of the faces (the face on the liquid crystal layer 1032 side), and includes a polarization plate/phase difference plate 1031a provided on the other face. A polarization plate/phase difference plate 1031b is provided on the face opposite from the liquid crystal layer 1032 side of the substrate 1030b. In the color filter 1033, filters of R (red), G (green), and B (blue) are disposed in matrix in the regions sectioned by a black matrix constituted with a layer that absorbs light. Each color filter corresponds to a pixel and the pitch thereof is constant. The liquid crystal layer 1032 is capable of switching a transparent state and a light-shielding state by a unit of pixel according to control signals form a control device, not shown. By switching the states, the incident light is modulated spatially.

In the display device 1400 shown in FIG. 36, the light transmitted through the prism sheets 1025a and 1025b makes incident on the polarization plate/phase difference plate 1031b. The light transmitted through the polarization plate/phase difference plate 1031b makes incident on the liquid crystal layer 1032 via the substrate 1030b, and spatial modulation is performed therein by a unit of pixel. The light (modulated light) transmitted through the liquid crystal layer 1032 transmits through the color filter 1033 and the substrate 1030a in order and makes incident on the polarization plate/phase difference plate 1031a. The light transmitted through the polarization plate/phase difference plate 1031a is emitted via the optical element 1100. While the polarization plate/phase difference plates 1031a and 1031b are used as the optical control element in FIG. 36, the optical control element is not limited only to those. It is also possible to employ a structure which includes only the polarization plate.

With the above-described display device 1400, it is possible to converge or not to converge the light for lighting the optical control element 1800 to the screen front face direction by the optical element 1100. Thus, the state of narrow viewing angle and the state of wide viewing angle can be selected as appropriate depending on the preference of the observer. Further, as in a display device 1500 shown in FIG. 37, the optical element 1100 may be pasted to the polarization plate/phase difference plate 1031b of the optical control element 1800 by using a transparent adhesive layer 1060. Generation of scattering light between the both can be suppressed through pasting the optical element 1100 to the optical control element 1800, so that the transmittance can be improved. Therefore, it is possible to achieve a display device with a still higher luminance.

Next, a mode of a display device which uses the optical element of the present invention by disposing it on the surface of a display panel will be described.

FIG. 34 shows a structural example of a display device 1200 in which the optical element of the present invention is provided to the display screen. Referring to FIG. 34, the display device 1200 is constituted with the optical control element 1800 functioning as a display, the lighting optical device 1700 functioning as a backlight, and the optical element 1100.

As described in the first exemplary embodiment, the optical element 1100 is a microlouver which can achieve the narrow viewing field mode, the intermediate mode, and the wide viewing field mode.

The lighting optical device 1700 is constituted with: the light source 1021; the reflection sheet 1022; the light guiding plate 1023; the diffusing plate 1024; and the prism sheets 1025a and 1025b. The light transmitted through the prism sheets 1025a and 1025b is lighted to the optical control element. Note here that a hard coat layer for preventing scratches and a reflection preventing layer for preventing glare may also be formed on the surface of the optical element 1100.

With the above-described display device 1200, at the forefront face of the display device 1200, it is possible to converge or not to converge the light emitted from the optical control element 1800 to the screen front face direction by the optical element 1100. Thus, the light transmitted through the optical element 1100 can directly reach the observer. Therefore, scattering, refraction, reflection, and the like of the light emitted from the optical element 1100 can be suppressed compared to the case of the display device that includes the optical element 1100 loaded inside thereof, so that clear images with a still higher resolution can be achieved.

As in the display device 1300 shown in FIG. 35, the optical element 1100 may be pasted to the polarization plate/phase difference plate 1031a of the optical control element 1800 by using the transparent adhesive layer 1060. With such structure, surface reflection loss at the interface between the optical element 1100 and the polarization plate/phase difference plate 1031a can be decreased. Therefore, it is possible to achieve a display device with a still higher luminance.

Figure 46A:
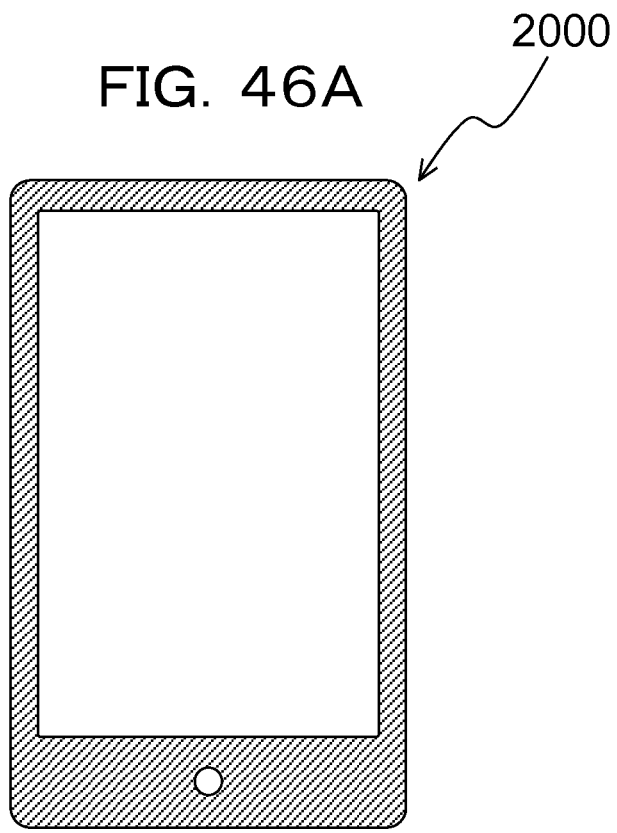
Figure 46B:
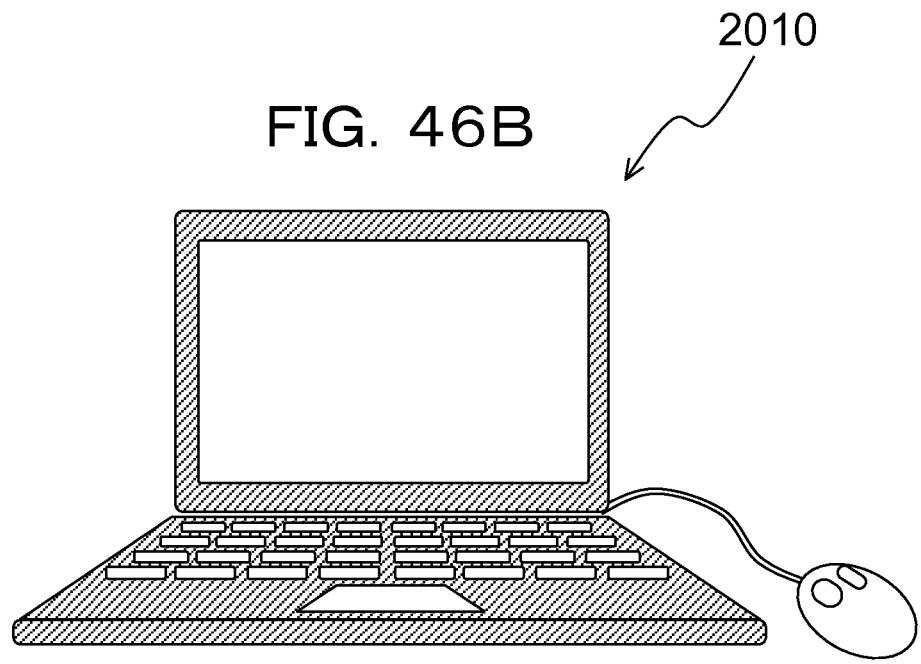

As examples of the case where the present invention is applied to mobile information processing terminals as other electric apparatuses such as a mobile phone, a notebook personal computer, a feature phone, a smartphone, a tablet PC, or PDA, there are devices which include one of the above-described display devices 1200, 1300, 1400, and 1500 loaded as a display module in a main body of the electronic apparatus as in an electronic apparatus 2000 shown in FIG. 46A or an electronic apparatus 2010 shown in FIG. 46B, for example. Further, the optical element of the present invention may be applied to various kinds of plasma type display devices.

In that case, on the information processing terminals side, the control device thereof receives input from an input device such as a mouse, a keyboard, or a touch panel and performs a control for displaying necessary information on the display device loaded as the display module.

Figure 38:
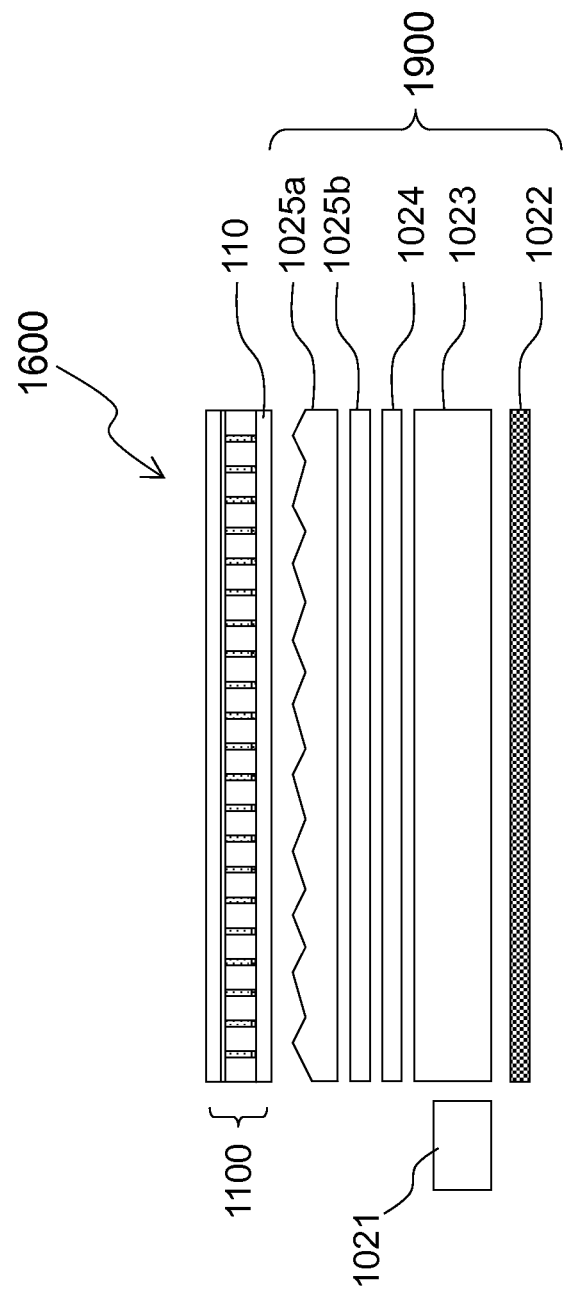
FIG. 38 is a sectional view showing the structure of a lighting device to which an optical element according to another exemplary embodiment is loaded.
Figure 39A:
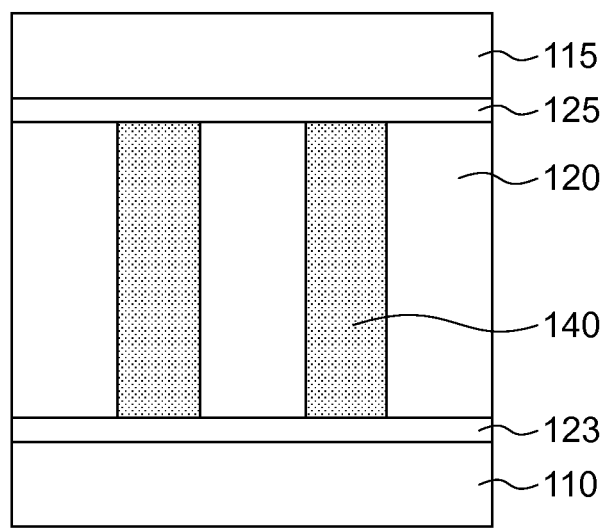
Figure 39B:
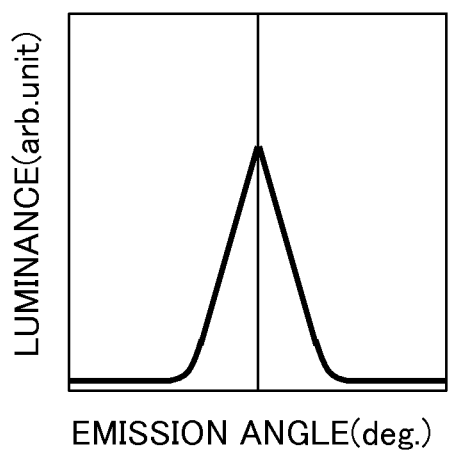

Next, FIG. 38 shows a structural example of a lighting device 1600 to which the optical element of the present invention is loaded.

Referring to FIG. 38, the lighting device 1600 is constituted with a surface light source 1900 and the optical element 1100. The surface light source is constituted with: the light source 1021 typically a cold cathode tube; the reflection sheet 1022; the light guiding plate 1023; the diffusing plate 1024; the prism sheet 1025*a*; and the prism sheet 1025*b*. The optical element 1100 is constituted with one of the micro-louvers according to the first to third exemplary embodiments.

The light guiding plate 1023 is formed with an acryl resin or the like, and it is structured in such a manner that light from the light source 1021 makes incident on one end face and the incident light propagates within the light guiding plate and exits uniformly from the surface (a prescribed side face) side.

On the back face side of the light guiding plate 1023, the reflection sheet 1022 which reflects the light emitted from the back face towards the surface direction is provided. Although not shown, a reflection module is also provided to the other end face and the side face of the light guiding plate 1023.

The light emitted from the surface of the light guiding plate 1023 makes incident on the optical element 1100 via the diffusing plate 1024 and the prism sheets 1025*a*, 1025*b*. The diffusing plate 1024 is for diffusing the light that makes incident from the light guiding plate 1023. The luminance of the emitted light varies between the left and right ends of the light guiding plate 1023 because of its structure. Therefore, the light from the light guiding plate 1023 is diffused by the light guiding plate 1023.

The prism sheets 1025*a* and 1025*b* improve the luminance of the light that makes incident from the light guiding plate 1023 via the diffusing plate 1024.

In the lighting device 1600, the light emitted from the surface side of the light guiding plate 1023 makes incident on the optical element 1100 via the prism sheets 1025*a* and 1025*b* after being diffused by the diffusing plate 1024.

With the above-described lighting device 1600, it is possible to converge or not to converge the light of the surface light source 1900 to the screen front face direction by the optical element 1100. Thus, it becomes possible to select a state with wide light emission angles where light can be irradiated in a wide range and a state with narrow light emission angles where the light can be irradiated only in the vicinity of directly under the lighting device 1600 depending on the preference of the observer.

Particularly with the lighting device 1600 that uses the optical elements of the first to fifth exemplary embodiments as the optical element 1100, the range of exit directions of the light transmitting through the light transmission regions 120 and the dispersion materials 142 is changed by changing the dispersion state of the electrophoretic particles 141 by a potential difference between each of the conducive patterns 220, 230, 250, 270, 290 and the transparent conductive film 125.

While the cold cathode-ray tube is used as the light source for describing the exemplary embodiment, the light source is not limited only to that. A white LED, a tricolor LED, or the like may also be used as the light source. Further, while a side-light type light source is used for describing the exemplary embodiment, the light source is not limited only to that. A direct type light source may be used as well. Furthermore, the surface light source 1900 is not limited only to the content described in the exemplary embodiment. Any types may be used as long as the light source for emitting light such as an LED light, an organic EL light, an inorganic EL light, a fluorescent light, a lightbulb, and the like are arranged in a planar form.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part of or a whole part of the exemplary embodiments disclosed above can be expressed properly by following Supplementary Notes. However, the modes for embodying the present invention and the technical spirit thereof are not limited only to those.

(Supplementary Note 1)

An optical element which includes:

a first transparent substrate (110);

a second transparent substrate (115) provided by opposing to the first transparent substrate (110);

a first conductive pattern (250) and a second conductive pattern (270) disposed on a face of the first transparent substrate (110) opposing to the second transparent substrate (115);

a light transmission region (120) disposed individually between the first conductive pattern (250) and the second conductive pattern (270) to reach a surface of the second transparent substrate (115) from a surface of the first transparent substrate (110), a pattern thereof transversely crossing an element region;

a transparent conductive film (125) disposed on a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIGS. 1A and 1B).

(Supplementary Note 2)

An optical element which includes:

a first transparent substrate (110);

a second transparent substrate (115) provided by opposing to the first transparent substrate (110);

a first conductive pattern (250) and a second conductive pattern (270) disposed in parallel and alternately on a face of the first transparent substrate (110) opposing to the second transparent substrate (115) in such a manner that the both transversely cross an element region;

a light transmission region (120) which is disposed between the first conductive pattern (250) and the second conductive pattern (270) to reach a surface of the second transparent substrate (115) from a surface of the first transparent substrate (110) and transversely cross the element region;

a transparent conductive film (125) disposed over an entire region of a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIGS. 1A and 1B).

(Supplementary Note 3)

The optical element as depicted in Supplementary Note 1 or 2, which includes a resin (128) that is disposed to completely seal both ends of a space between the light transmission regions (120) neighboring to each other (see FIGS. 52A and 52B).

(Supplementary Note 4)

The optical element as depicted in Supplementary Note 2, wherein:

each of the first conductive patterns (250) and the second conductive patterns (270) includes main sections (250a, 270a) which transversely cross the element region and a plurality of subsidiary sections (250b, 270b) which are formed on both sides of the main sections (250a, 270a) with a specific pitch to line on a straight-line form along the extending directions of the main sections (250a, 270a) by shifting the pitch by being connected to the main sections (250a, 270a) orthogonally and extended from the main sections (250a, 270a) to the closest regions of the main sections (270a, 250a) adjacent to the main sections (250a, 270a); and the subsidiary section (250b) of the first conductive pattern (250) and the subsidiary section (270b) of the second conductive pattern (270) neighboring to each other are disposed to line on a straight-line form in parallel and alternately (see FIG. 49).

(Supplementary Note 5)

The optical element as depicted in Supplementary Note 2, wherein:

each of the first conductive patterns (250) and the second conductive patterns (270) includes main sections (250a, 270a) which transversely cross the element region and a plurality of subsidiary sections (250b, 270b) which are formed on both sides of the main sections (250a, 270a) with a specific pitch to line on a straight-line form along the extending directions of the main sections (250a, 270a) without shifting the pitch by being connected to the main sections (250a, 270a) orthogonally and extended from the main sections (250a, 270a) to the closest regions of the main sections (270a, 250a) adjacent to the main sections (250a, 270a); and the subsidiary section (250b) of the first conductive pattern (250) and the subsidiary section (270b) of the second conductive pattern (270) neighboring to each other are disposed to line on a straight-line form in parallel and alternately (see FIG. 50).

(Supplementary Note 6)

The optical element as depicted in Supplementary Note 2, wherein:

each of the first conductive patterns (250) and the second conductive patterns (270) is constituted with repetition of first straight-line sections (250c, 270c) which are extended to the direction that transversely crosses the element regions and second straight-line sections (250d, 270d) which are extended in a direction orthogonal to the first straight-line sections (250c, 270c); and the length of the first straight-line section (250c) of the first conductive pattern (250), the length of the first straight-line section (270c) of the second conductive pattern (270), the length of the second straight-line section (250d) of the first conductive pattern (250), the length of the second straight-line section (270d) of the second conductive pattern (270) are same (see FIG. 51).

(Supplementary Note 7)

The optical element as depicted in any one of Supplementary Notes 1 to 6, wherein the first conductive pattern (250), the second conductive pattern (270), and the transparent conductive film (125) are set to be in a same potential to disperse the electrophoretic particles (141) in the entire dispersion material (142) (see FIG. 1A, FIG. 45A).

(Supplementary Note 8)

The optical element as depicted in any one of Supplementary Notes 1 to 6, wherein a relative potential of the transparent conductive film (125) with respect to the first conductive pattern (250) is set to be in a same polarity as that of a surface charge of the electrophoretic particles (141) to gather the electrophoretic particles (141) in vicinity of the surface of the first conductive pattern (250) in the electrophoretic element (140) between the first conductive pattern (250) and the transparent conductive film (125); and the second conductive pattern (270) and the transparent conductive film (125) are set to be in a same potential to disperse the electrophoretic particles (141) in the entire dispersion material (142) in the electrophoretic element (140) between the second conductive pattern (270) and the transparent conductive film (125) (see FIG. 2A, FIG. 45B).

(Supplementary Note 9)

The optical element as depicted in any one of Supplementary Notes 1 to 6, wherein the first conductive pattern (250) and the second conductive pattern (270) are set to be in a same potential and a relative potential of the transparent conductive film (125) with respect to the first conductive pattern (250) and the second conductive pattern (270) is set to be in a same polarity as that of the surface charge of the electrophoretic particles (141) to gather the electrophoretic particles (141) in vicinity of the surfaces of the first conductive pattern (250) and the second conductive pattern (270) in the electrophoretic elements (140) between the first conductive pattern (250) and the transparent conductive film (125) and between the second conductive pattern (270) and the transparent conductive film (125), respectively (see FIG. 3A, FIG. 45C).

(Supplementary Note 10)

The optical element as depicted in any one of Supplementary Notes 1 to 9, wherein a protection cover film (130) is formed to cover the first conductive pattern (250) and the second conductive pattern (270) (see FIG. 7A).

(Supplementary Note 11)

The optical element as depicted in any one of Supplementary Notes 1 to 10, wherein a second protection cover film (135) is formed to cover the transparent conductive film (125) (see FIG. 8A).

(Supplementary Note 12)

An optical element which includes:

a first transparent substrate (110);

a second transparent substrate (115) provided by opposing to the first transparent substrate (110);

a first conductive pattern (250), a second conductive pattern (270), and a third conductive pattern (290) disposed on a face of the first transparent substrate (110) opposing to the second transparent substrate (115);

a light transmission region (120) disposed individually between the first conductive pattern (250), the second conductive pattern (270), and the third conductive pattern (290) to reach a surface of the second transparent substrate (115) from a surface of the first transparent substrate (110), a pattern thereof transversely crossing an element region;

a transparent conductive film (125) disposed on a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIG. 15).

(Supplementary Note 13)

An optical element which includes:

a first transparent substrate (110);

a second transparent substrate (115) provided by opposing to the first transparent substrate (110) with a space provided therebetween;

a first conductive pattern (250), a second conductive pattern (270), and a third conductive pattern (290) which are disposed in parallel and repeatedly with a specific interval in an orderly manner on the face of the first transparent substrate (110) opposing to the second transparent substrate (115) to transversely cross the element regions;

a light transmission region (120) disposed between the first conductive pattern (250) and the second conductive pattern (270), between the second conductive pattern (270) and the third conductive pattern (290), and between the third conductive pattern (290) and the first conductive pattern (250) to reach the surface of the second transparent substrate (115) from the surface of the first transparent substrate (110) to transversely cross the element region;

a transparent conductive film (125) disposed over the entire region of the face of the second transparent substrate (115) opposing to the first transparent substrate (110); and an electrophoretic element (140) disposed between the neighboring light transmission regions (120), which is a mixture of light-shielding electrophoretic particles (141) of a specific electric charge and a transmissive dispersion material (142) (see FIG. 15).

(Supplementary Note 14)

The optical element as depicted in Supplementary Note 12 or 13, wherein the first conductive pattern (250), the second conductive pattern (270), the third conductive pattern (290), and the transparent conductive film (125) are set to be in a same potential to disperse the electrophoretic particles (141) in the entire dispersion material (142) (see FIG. 15, FIG. 48A).

(Supplementary Note 15)

Figure 48B:
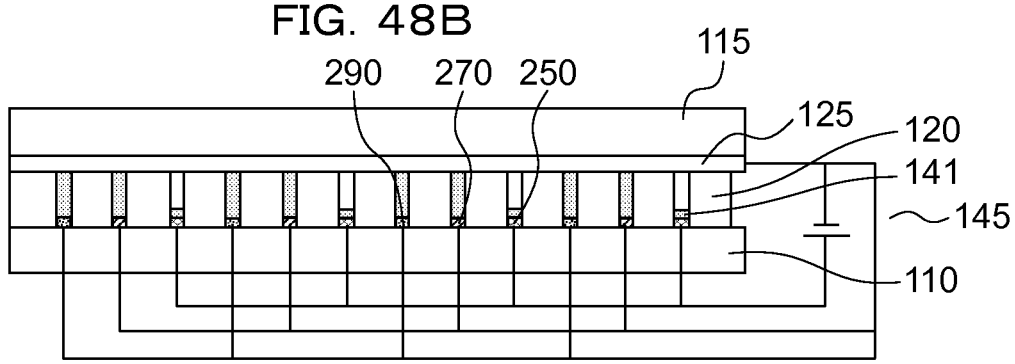

The optical element as depicted in Supplementary Note 12 or 13, wherein a relative potential of the transparent conductive film (125) with respect to the first conductive pattern (250) is set to be in a same polarity as that of a surface charge of the electrophoretic particles (141) to gather the electrophoretic particles (141) in vicinity of the surface of the first conductive pattern (250) in the electrophoretic element (140) between the first conductive pattern (250) and the transparent conductive film (125); and the second conductive pattern (270), the third conductive pattern (290), and the transparent conductive film (125) are set to be in a same potential to disperse the electrophoretic particles (141) in the entire dispersion material (142) in the electrophoretic element (140) between the second conductive pattern (270) as well as the third conductive pattern (290) and the transparent conductive film (125) (see FIG. 16, FIG. 48B).

(Supplementary Note 16)

Figure 48C:
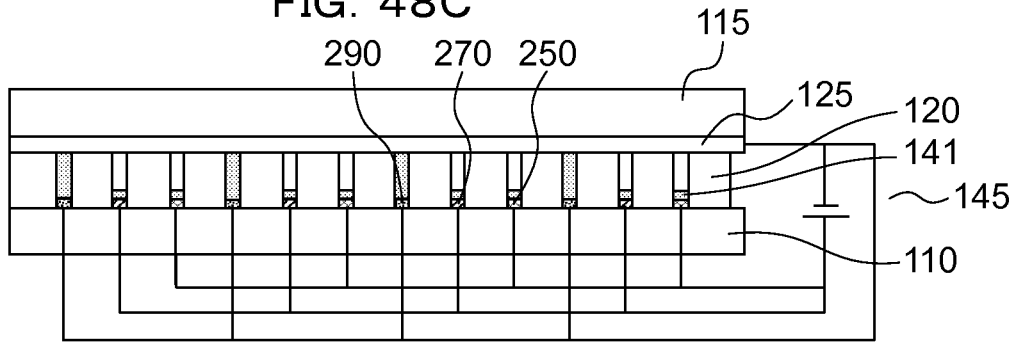

The optical element as depicted in Supplementary Note 12 or 13, wherein:

the first conductive pattern (250) and the second conductive pattern (270) are set to be in a same potential and a relative potential of the transparent conductive film (125) with respect to the first conductive pattern (250) and the second conductive pattern (270) is set to be in a same polarity as that of the surface charge of the electrophoretic particles (141) to gather the electrophoretic particles (141) in vicinity of the surfaces of the first conductive pattern (250) and the second conductive pattern (270) in the electrophoretic element (140) between the first conductive pattern (250) as well as the second conductive pattern (270) and the transparent conductive film (125); and the third conductive pattern (290) and the transparent conductive film (125) are set to be in a same potential to disperse the electrophoretic particles (141) in the entire dispersion material (142) in the electrophoretic element (140) between the third conductive pattern (290) and the transparent conductive film (125) (see FIG. 17, FIG. 48C).

(Supplementary Note 17)

Figure 48D:
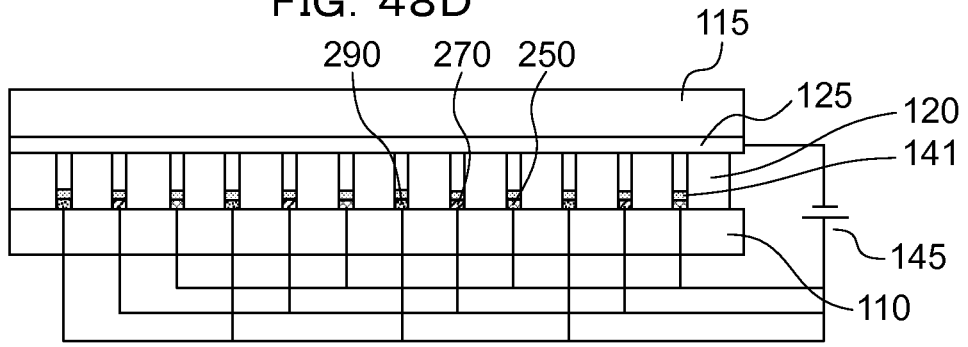

The optical element as depicted in Supplementary Note 12 or 13, wherein:

the first conductive pattern (250), the second conductive pattern (270), and the third conductive pattern (290) are set to be in a same potential and a relative potential of the transparent conductive film (125) with respect to the first conductive pattern (250), the second conductive pattern (270), and the third conductive pattern (290) is set to be in a same polarity as that of the surface charge of the electrophoretic particles (141) to gather the electrophoretic particles (141) in vicinity of the surfaces of the first conductive pattern (250), the second conductive pattern (270), and the third conductive pattern (290) in the electrophoretic element (140) between the first conductive pattern (250), the second conductive pattern (270), as well as the third conductive pattern (290) and the transparent conductive film (125), respectively (see FIG. 18, FIG. 48D).

(Supplementary Note 18)

Figure 24:
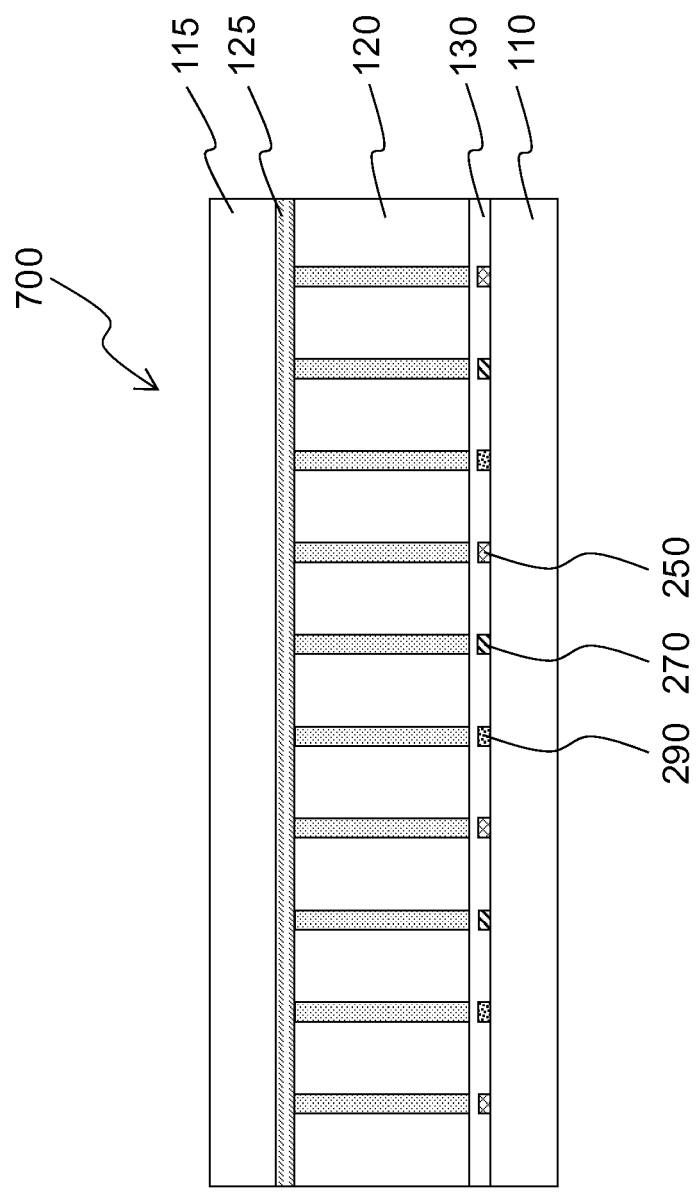
FIG. 24 is a longitudinal sectional view showing a structural example of a case where a protection cover film is provided in the optical element of the fifth exemplary embodiment in a state where the narrow viewing field mode is selected.
Figure 25:
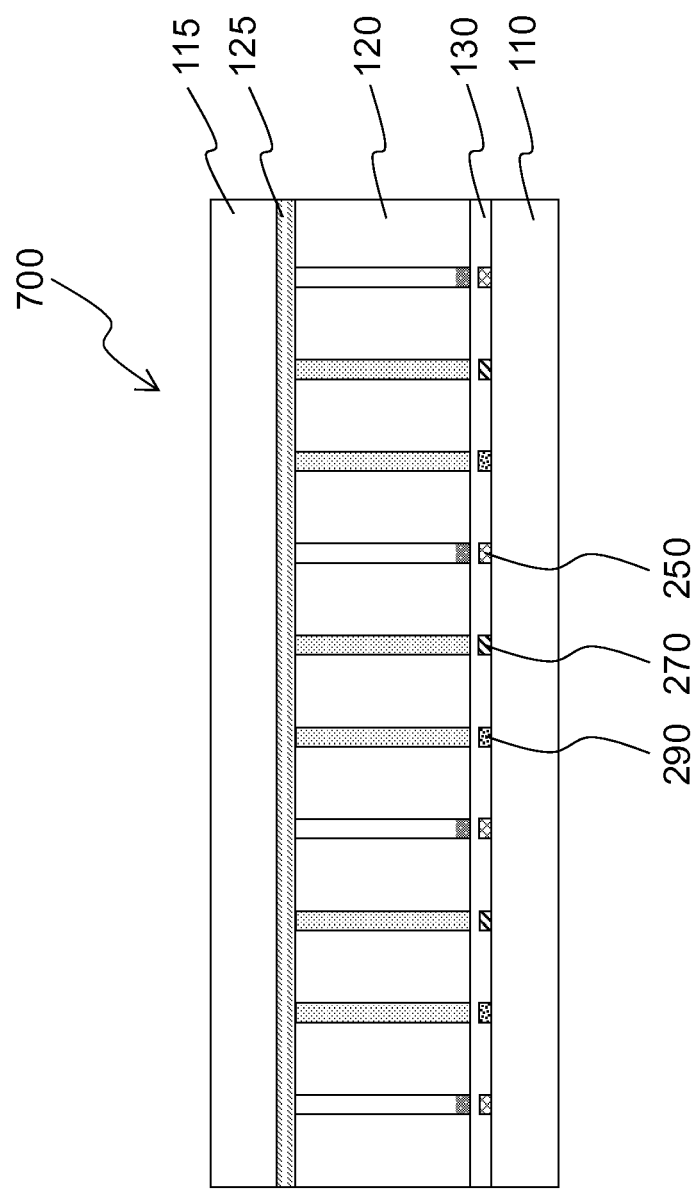
FIG. 25 is a longitudinal sectional view showing a structural example of a case where a protection cover film is provided in the optical element of the fifth exemplary embodiment in a state where the first intermediate mode is selected.
Figure 26:
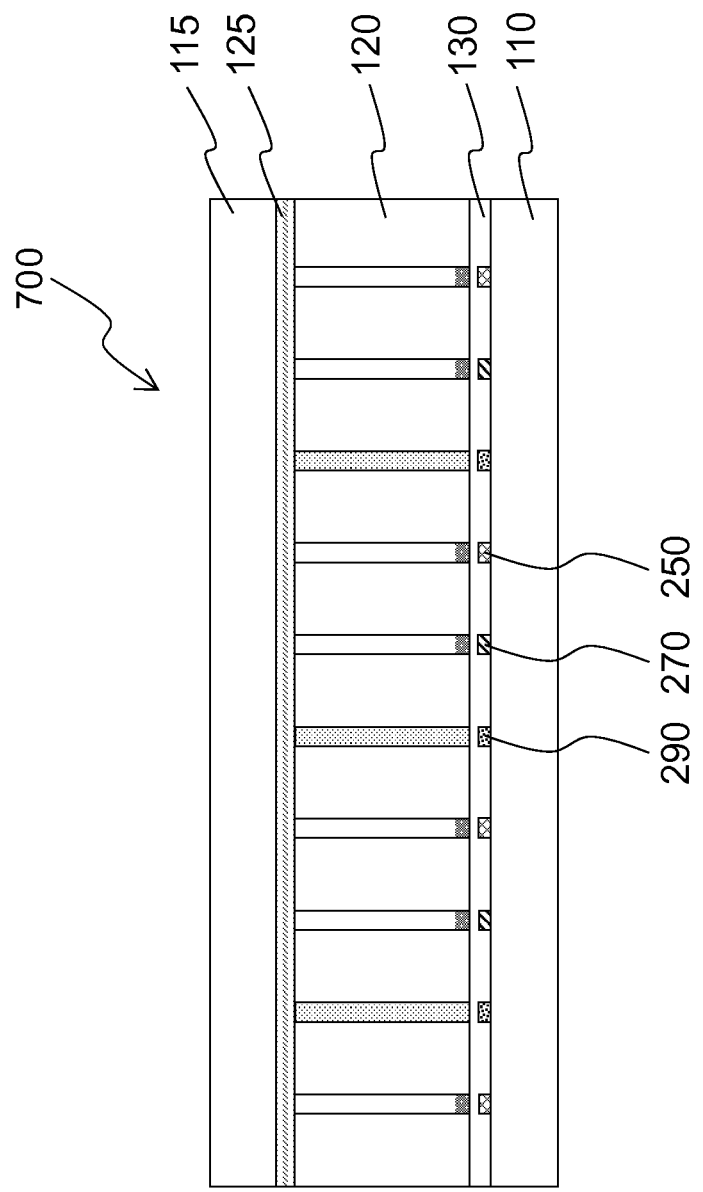
FIG. 26 is a longitudinal sectional view showing a structural example of a case where a protection cover film is provided in the optical element of the fifth exemplary embodiment in a state where the second intermediate mode is selected.
Figure 27:
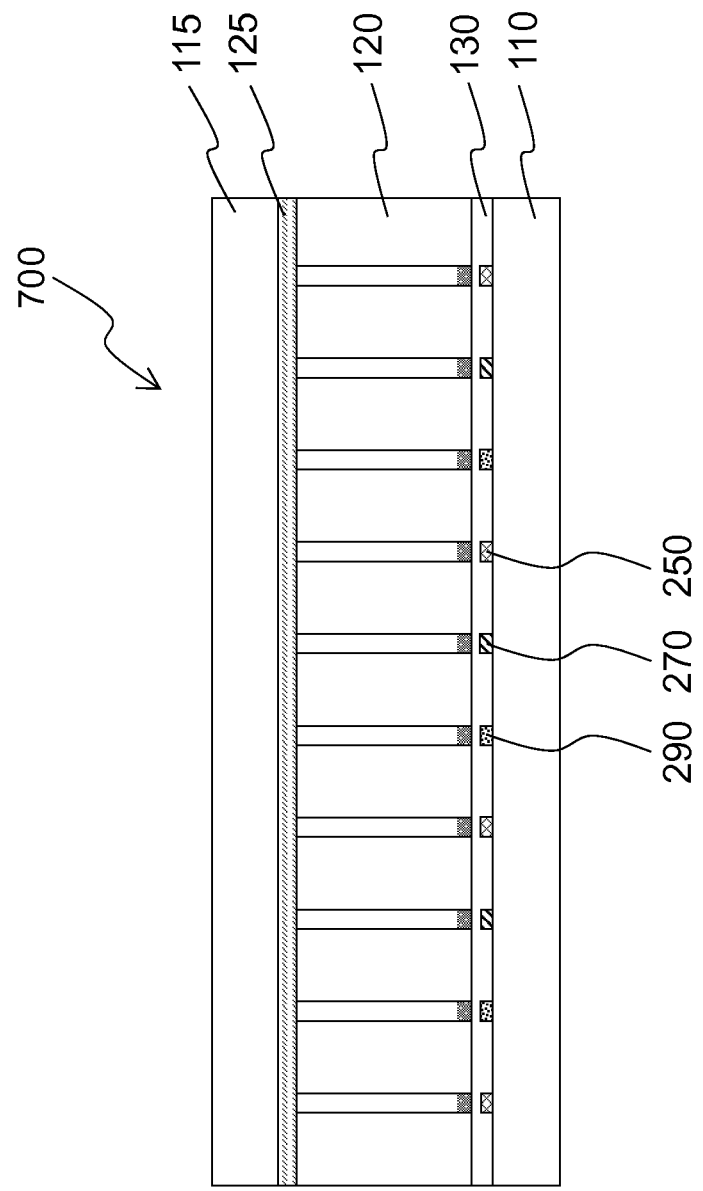
FIG. 27 is a longitudinal sectional view showing a structural example of a case where a protection cover film is provided in the optical element of the fifth exemplary embodiment in a state where the wide viewing field mode is selected.

The optical element depicted in Supplementary Note 12 or 13, wherein a protection cover film (130) is formed to cover the first conductive pattern (250), the second conductive pattern (270), and the third conductive pattern (290) (see FIG. 24).

(Supplementary Note 19)

Figure 28:
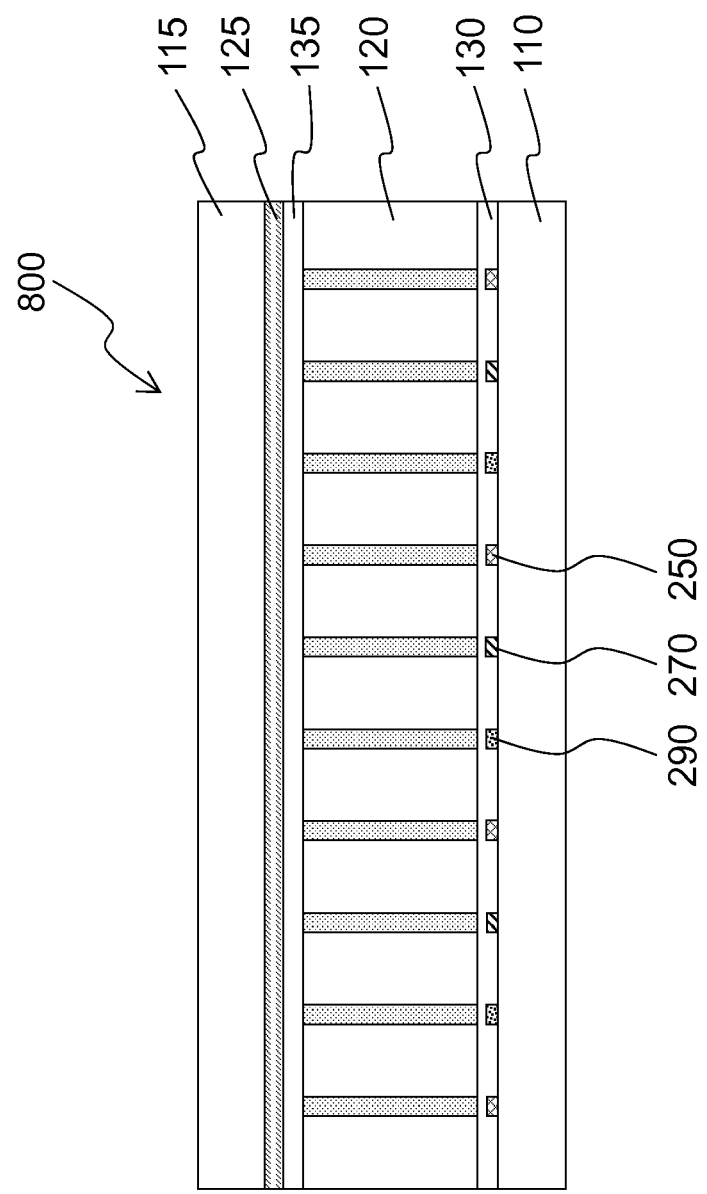
FIG. 28 is a longitudinal sectional view showing a structural example of a case where the protection cover film and a second protection cover film are provided in the optical element of the fifth exemplary embodiment in a state where the narrow viewing field mode is selected.
Figure 29:
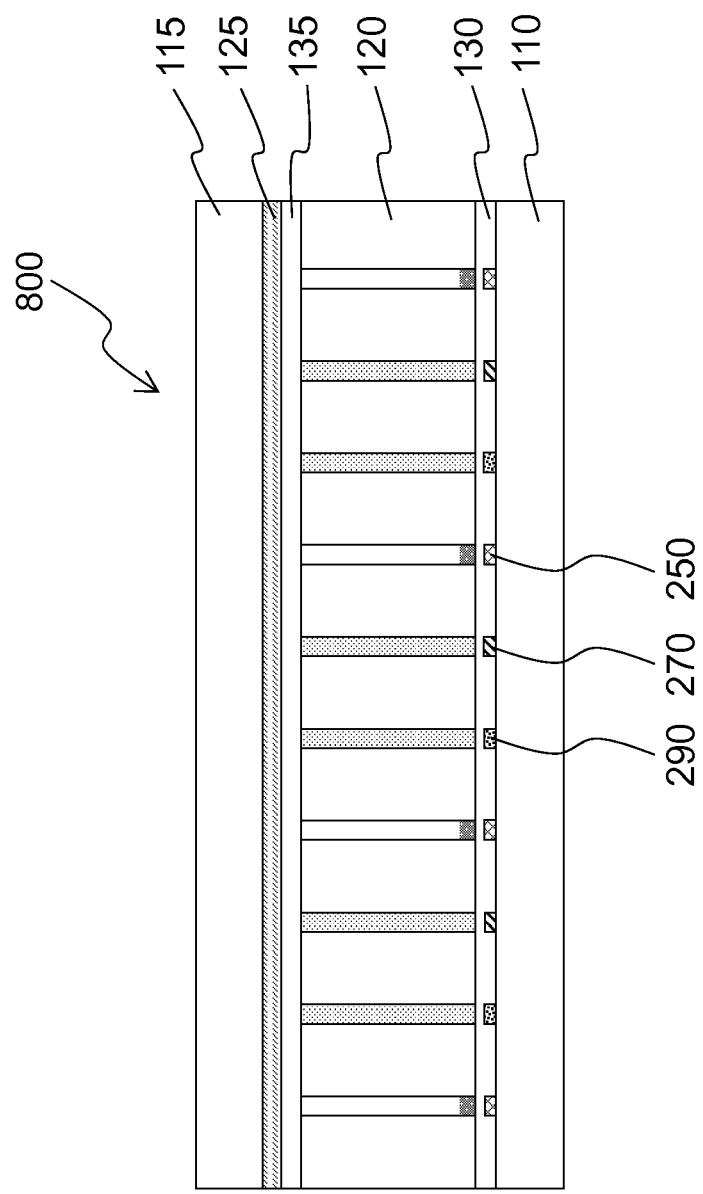
FIG. 29 is a longitudinal sectional view showing a structural example of a case where the protection cover film and the second cover protection film are provided in the optical element of the fifth exemplary embodiment in a state where the first intermediate mode is selected.
Figure 30:
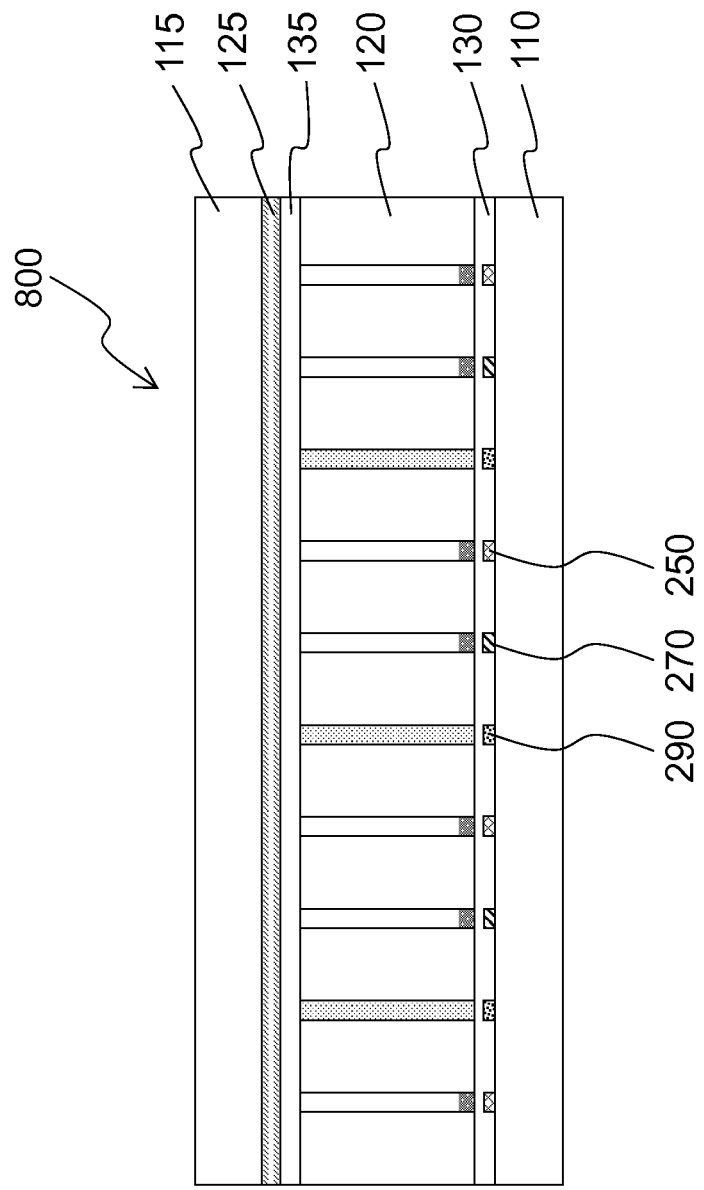
FIG. 30 is a longitudinal sectional view showing a structural example of a case where the protection cover film and the second cover protection film are provided in the optical element of the fifth exemplary embodiment in a state where the second intermediate mode is selected.
Figure 31:
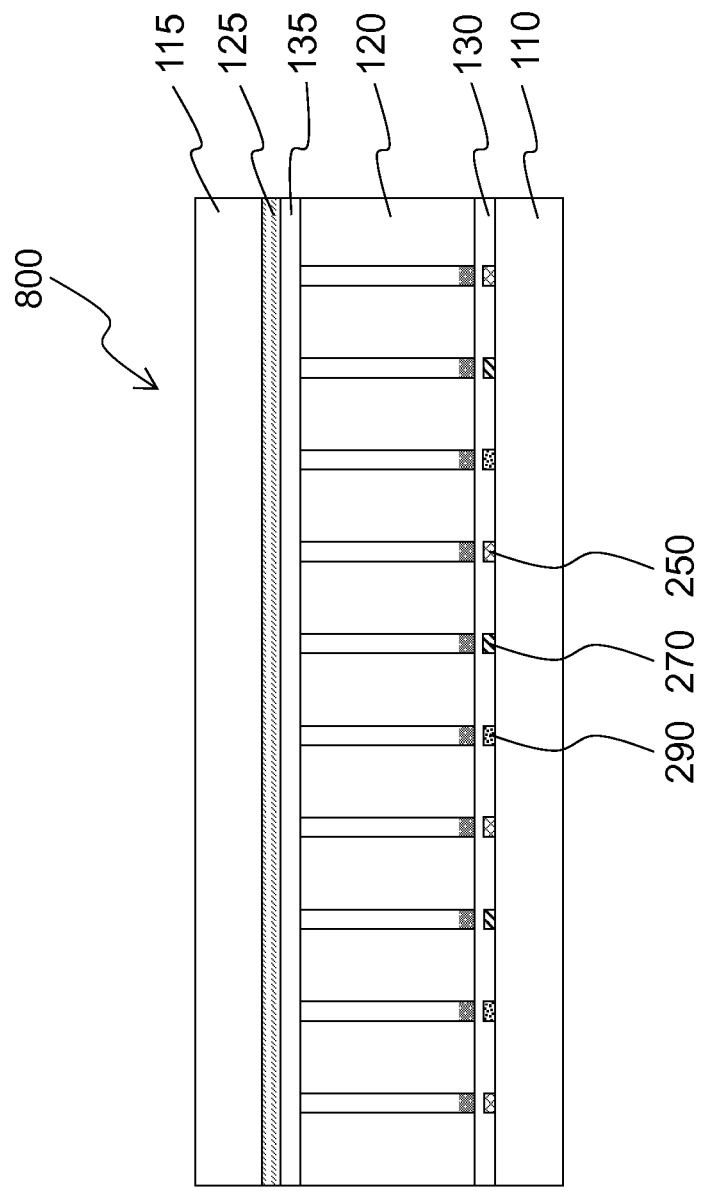
FIG. 31 is a longitudinal sectional view showing a structural example of a case where the protection cover film and the second cover protection film are provided in the optical element of the fifth exemplary embodiment in a state where the wide viewing field mode is selected.
Figure 32A:
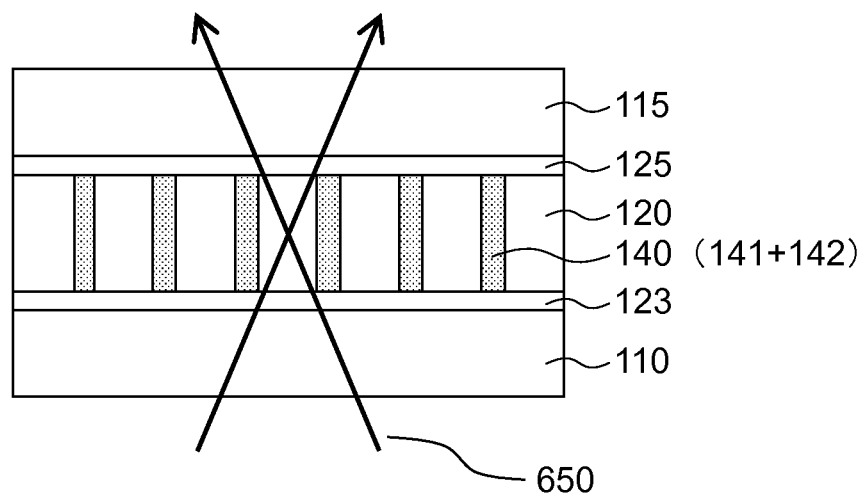
Figure 32B:
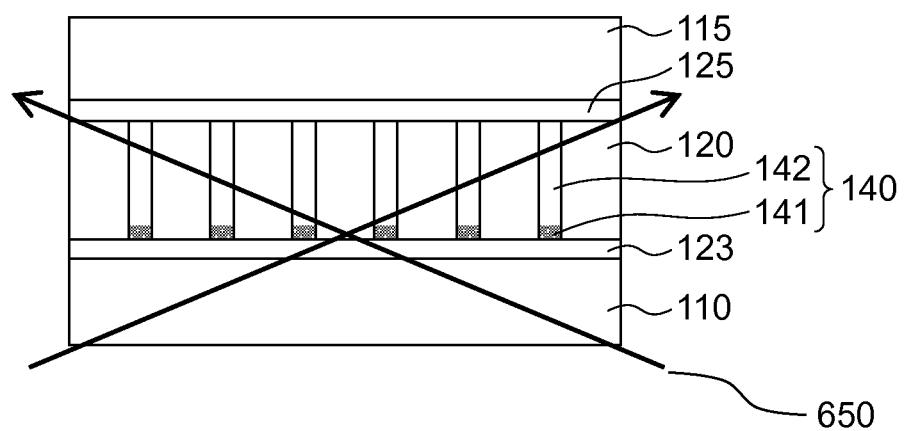

The optical element depicted in Supplementary Note 12 or 13, wherein a second protection cover film (135) is formed to cover the transparent conductive film (125) (see FIG. 28).

(Supplementary Note 20)

An optical element which includes:

a first transparent substrate (110);

a second transparent substrate (115) provided by opposing to the first transparent substrate (110);

a first conductive pattern (250) and a second conductive pattern (270) disposed with a space provided therebetween on a face of the first transparent substrate (110) opposing to the second transparent substrate (115);

a light transmission region (120) disposed to reach a surface of the second transparent substrate (115) from a surface of the first transparent substrate (110) in a part of an entire element region where the first conductive pattern (250) and the second conductive pattern (270) are not disposed;

a transparent conductive film (125) disposed on a face of the second transparent substrate (115) opposing to the first transparent substrate (110); and an electrophoretic element (140) disposed between the neighboring light transmission regions (120), which is constituted with light-shielding electrophoretic particles (141) of a specific electric charge and a transmissive dispersion material (142) (see FIGS. 54A, 54B).

(Supplementary Note 21)

The optical element as depicted in Supplementary Note 20, wherein a resin (128) is disposed to seal a part where the light transmission region (120) is not formed in a part of the first conductive pattern (250) and the second conductive pattern (270) extruded from the element regions (see FIGS. 54A, 54B)

(Supplementary Note 22)

A display device which includes:

a display (1800) which includes a display face for displaying videos; and the optical element (1100) as depicted in any one of Supplementary Note 1 to 21 disposed on the display face of the display (1800) (see FIG. 34).

(Supplementary Note 23)

The display device as depicted in Supplementary Note 22, wherein the display (1800) and the optical element (1100) are fixed via a transparent adhesive layer (1060) (see FIG. 35).

(Supplementary Note 24)

The display device as depicted in Supplementary Note 22 or 23, wherein the display (1800) is a liquid crystal display, a plasma display, an organic EL display, an inorganic EL display, an LED display, a field emission display, a cathode-ray tube, or a fluorescent display tube (see paragraph 0061).

(Supplementary Note 25)

A display device which includes:

a liquid crystal display (1800) which includes a display face for displaying videos;

a backlight (1700) which irradiates light to the liquid crystal display (1800) by being disposed on a back face side of the liquid crystal display (1800); and the optical element (1100) as depicted in any one of Supplementary Notes 1 to 21 disposed between the liquid crystal display (1800) and the backlight (1700) (see explanation of FIG. 4E).

(Supplementary Note 26)

Figure 37:
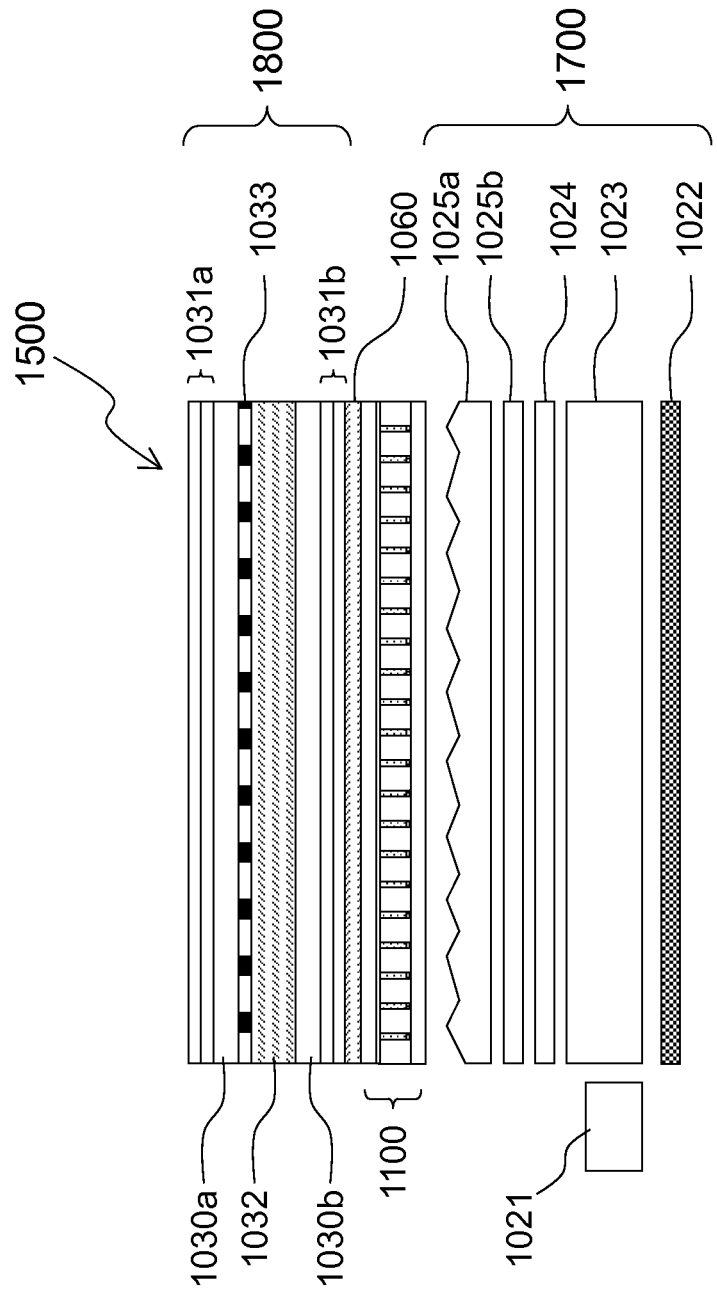
FIG. 37 is a sectional view showing the structure of a display device which includes the optical element according to another exemplary embodiment being fixed to the inside thereof.

The display device as depicted in Supplementary Note 25, wherein the liquid crystal display (1800) and the optical element (1100) are fixed via a transparent adhesive layer (1060) (see FIG. 37).

(Supplementary Note 27)

An electronic apparatus which includes the display device (1200, 1300, 1400, or 1500) as depicted in any one of Supplementary Notes 22 to 26 loaded as a display module of a main body of the electronic apparatus (2000 or 2010) (see FIGS. 46A, 46B).

(Supplementary Note 28)

A lighting device which includes:

the optical element (1100) as depicted in any one of Supplementary Notes 1 to 21; and a light source (1900) provided on a back face of the first transparent substrate (110) of the optical element (1100) (see FIG. 38).

(Supplementary Note 29)

The lighting device as depicted in Supplementary Note 28, wherein in the optical element, a dispersion state of the electrophoretic particles (141) is changed by a potential difference between each of the conductive patterns (250, 270, (290)) and the transparent conductive film (125) to change a range of exit directions of light which transmits through the light transmission region (120) and the dispersion material (142) (see FIG. 45, FIG. 48).

INDUSTRIAL APPLICABILITY

The present invention can be utilized for any types of optical elements which control the range of exit directions of transmission light. Examples of such optical element are the optical elements used in a liquid crystal display device, an EL display, a plasma display, FED, a lighting device, and the like.

What is claimed is:

1. An optical element, comprising:
a first transparent substrate;
a second transparent substrate provided by opposing to the first transparent substrate;
a first conductive pattern and a second conductive pattern disposed on a face of the first transparent substrate opposing to the second transparent substrate;
a light transmission region disposed individually between the first conductive pattern and the second conductive pattern to reach a surface of the second transparent substrate from a surface of the first transparent substrate, a pattern thereof transversely crossing an element region;
a transparent conductive film disposed on a face of the second transparent substrate opposing to the first transparent substrate; and
an electrophoretic element disposed between neighboring light transmission regions, which is constituted with light-shielding electrophoretic particles of a specific electric charge and a transmissive dispersion material, wherein
a region in which the electrophoretic element is disposed and sandwiched by the transparent conductive film and the first conductive pattern and a region in which the electrophoretic element is disposed and sandwiched by the transparent conductive film and the second conductive pattern are alternately disposed in a gap between the neighboring light transmission regions, and
light-transmission or light-shielding in the gap is controlled by controlling potentials of the first conductive pattern, the second conductive pattern, and the transparent conductive film.

2. The optical element as claimed in claim 1, comprising
a resin that is disposed to completely seal both ends of a space between the light transmission regions neighboring to each other.

3. The optical element as claimed in claim 1, wherein
the first conductive pattern, the second conductive pattern, and the transparent conductive film are set to be in a same potential to disperse the electrophoretic particles in the entire dispersion material.

4. The optical element as claimed in claim 1, wherein
a relative potential of the transparent conductive film with respect to the first conductive pattern is set to be in a same polarity as that of a surface charge of the electrophoretic particles to gather the electrophoretic particles in vicinity of the surface of the first conductive pattern in the electrophoretic element between the first conductive pattern and the transparent conductive film; and
the second conductive pattern and the transparent conductive film are set to be in a same potential to disperse the electrophoretic particles in the entire dispersion material in the electrophoretic element between the second conductive pattern and the transparent conductive film.

5. The optical element as claimed in claim 1, wherein
the first conductive pattern and the second conductive pattern are set to be in a same potential and a relative potential of the transparent conductive film with respect to the first conductive pattern and the second conductive pattern is set to be in a same polarity as that of a surface charge of the electrophoretic particles to gather the electrophoretic particles in vicinity of the surfaces of the first conductive pattern and the second conductive pattern in the electrophoretic elements between the first conductive pattern and the transparent conductive film and between the second conductive pattern and the transparent conductive film, respectively.

6. The optical element as claimed in claim 1, wherein
a protection cover film is formed to cover the first conductive pattern and the second conductive pattern.

7. The optical element as claimed in claim 1, wherein
a second protection cover film is formed to cover the transparent conductive film.

8. An optical element, comprising:
a first transparent substrate;
a second transparent substrate provided by opposing to the first transparent substrate;
a first conductive pattern, a second conductive pattern, and a third conductive pattern disposed on a face of the first transparent substrate opposing to the second transparent substrate;
a light transmission region disposed individually between the first conductive pattern, the second conductive pattern, and the third conductive pattern to reach a surface of the second transparent substrate from a surface of the first transparent substrate, a pattern thereof transversely crossing an element region;
a transparent conductive film disposed on a face of the second transparent substrate opposing to the first transparent substrate; and
an electrophoretic element disposed between neighboring light transmission regions, which is constituted with light-shielding electrophoretic particles of a specific electric charge and a transmissive dispersion material, wherein
a region in which the electrophoretic element is disposed and sandwiched by the transparent conductive film and the first conductive pattern, a region in which the electrophoretic element is disposed and sandwiched by the transparent conductive film and the second conductive pattern, and a region in which the electrophoretic element is disposed and sandwiched by the transparent conductive film and the third conductive pattern are periodically disposed in a gap between the neighboring light transmission regions, and
light-transmission or light-shielding in the gap is controlled by controlling potentials of the first conductive pattern, the second conductive pattern, the third conductive pattern, and the transparent conductive film.

9. The optical element as claimed in claim 8, wherein
the first conductive pattern, the second conductive pattern, the third conductive pattern, and the transparent conductive film are set to be in a same potential to disperse the electrophoretic particles in the entire dispersion material.

10. The optical element as claimed in claim 8, wherein
a relative potential of the transparent conductive film with respect to the first conductive pattern is set to be in a same polarity as that of a surface charge of the electrophoretic particles to gather the electrophoretic particles in vicinity of the surface of the first conductive pattern in the electrophoretic element between the first conductive pattern and the transparent conductive film; and
the second conductive pattern, the third conductive pattern, and the transparent conductive film are set to be in a same potential to disperse the electrophoretic particles in the entire dispersion material in the electrophoretic element between the second conductive pattern as well as the third conductive pattern and the transparent conductive film.

11. The optical element as claimed in claim 8, wherein:
the first conductive pattern and the second conductive pattern are set to be in a same potential and a relative potential of the transparent conductive film with respect to the first conductive pattern and the second conductive pattern is set to be in a same polarity as that of a surface charge of the electrophoretic particles to gather the electrophoretic particles in vicinity of the surfaces of the first conductive pattern and the second conductive pattern in the electrophoretic element between the first conductive pattern as well as the second conductive pattern and the transparent conductive film; and
the third conductive pattern and the transparent conductive film are set to be in a same potential to disperse the electrophoretic particles in the entire dispersion material in the electrophoretic element between the third conductive pattern and the transparent conductive film.

12. The optical element as claimed in claim 8, wherein:
the first conductive pattern, the second conductive pattern, and the third conductive pattern are set to be in a same potential and a relative potential of the transparent conductive film with respect to the first conductive pattern, the second conductive pattern, and the third conductive pattern is set to be in a same polarity as that of a surface charge of the electrophoretic particles to gather the electrophoretic particles in vicinity of the surfaces of the first conductive pattern, the second conductive pattern, and the third conductive pattern in the electrophoretic element between the first conductive pattern, the second conductive pattern, as well as the third conductive pattern and the transparent conductive film, respectively.

13. An optical element, comprising:
a first transparent substrate;
a second transparent substrate provided by opposing to the first transparent substrate;
a first conductive pattern and a second conductive pattern disposed on a face of the first transparent substrate opposing to the second transparent substrate;
a light transmission region disposed to reach a surface of the second transparent substrate from a surface of the first transparent substrate in a part of an entire element region where the first conductive pattern and the second conductive pattern are not disposed;
a transparent conductive film disposed on a face of the second transparent substrate opposing to the first transparent substrate; and
an electrophoretic element disposed between neighboring light transmission regions, which is constituted with light-shielding electrophoretic particles of a specific electric charge and a transmissive dispersion material, wherein
a region in which the electrophoretic element is disposed and sandwiched by the transparent conductive film and the first conductive pattern and a region in which the electrophoretic element is disposed and sandwiched by the transparent conductive film and the second conductive pattern are alternately disposed in a gap between the neighboring light transmission regions, and
light-transmission or light-shielding in the gap is controlled by controlling potentials of the first conductive pattern, the second conductive pattern, and the transparent conductive film.

14. The optical element as claimed in claim 13, wherein a resin is disposed to seal a part where the light transmission region is not formed in a part of the first conductive pattern and the second conductive pattern extruded from the element regions.

15. A display device, comprising:
a display which includes a display face for displaying videos; and
the optical element as claimed in claim 1 disposed on the display face of the display.

16. The display device as claimed in claim 15, wherein the display and the optical element are fixed via a transparent adhesive layer.

17. The display device as claimed in claim 15, wherein the display is a liquid crystal display, a plasma display, an organic EL display, an inorganic EL display, an LED display, a field emission display, a cathode-ray tube, or a fluorescent display tube.

18. A display device, comprising:
a liquid crystal display which includes a display face for displaying videos;
a backlight which irradiates light to the liquid crystal display by being disposed on a back face side of the liquid crystal display; and
the optical element as claimed in claim 1 disposed between the liquid crystal display and the backlight.

19. The display device as claimed in claim 18, wherein the liquid crystal display and the optical element are fixed via a transparent adhesive layer.

20. An electronic apparatus, comprising the display device as claimed in claim 15 loaded as a display module of a main body of the electronic apparatus.

21. A lighting device, comprising:
the optical element as claimed in claim 1; and a light source provided on a back face of the first transparent substrate of the optical element.

22. The lighting device as claimed in claim 21, wherein in the optical element, a dispersion state of the electrophoretic particles is changed by a potential difference between each of the conductive patterns and the transparent conductive film to change a range of exit directions of light which transmits through the light transmission region and the dispersion material.

* * * * *